(12) United States Patent
Suchan et al.

(10) Patent No.: US 12,554,815 B2
(45) Date of Patent: Feb. 17, 2026

(54) DEVICES, METHODS, AND GRAPHICAL USER INTERFACES FOR AUTHORIZING A SECURE OPERATION

(71) Applicant: Apple Inc., Cupertino, CA (US)

(72) Inventors: Tomislav Suchan, Sunnyvale, CA (US); Jay Moon, San Francisco, CA (US); Jonathan R. Dascola, San Francisco, CA (US); Vitalii Kramar, Woodinville, CA (US); Gianpaolo Fasoli, Burlingame, CA (US); Anton K. Diederich, Mountain View, CA (US); Luojie Xiang, San Jose, CA (US); Lucie Kucerova, Zdice (CZ); Martin Haller, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 18/167,767

(22) Filed: Feb. 10, 2023

(65) Prior Publication Data
US 2023/0273985 A1 Aug. 31, 2023

Related U.S. Application Data

(60) Provisional application No. 63/314,900, filed on Feb. 28, 2022.

(51) Int. Cl.
G06F 21/32 (2013.01)
G06F 9/451 (2018.01)

(52) U.S. Cl.
CPC ............ G06F 21/32 (2013.01); G06F 9/451 (2018.02)

(58) Field of Classification Search
CPC .......... G06F 3/011; G06F 3/012; G06F 3/013; G06F 3/017; G06F 3/0482;
(Continued)

(56) References Cited

U.S. PATENT DOCUMENTS 7,057,625 B2 * 6/2006 Kamata .................. G06T 15/40
345/592
8,418,075 B2 4/2013 Gallo et al.
(Continued)

FOREIGN PATENT DOCUMENTS

CN 105874405 A 8/2016
CN 108574773 A 9/2018
(Continued)

OTHER PUBLICATIONS

Kxowls, "Face unlock not working" Uploaded to YouTube on Nov. 2, 2020 https://youtube.com/shorts/EF8WgD_9Oiw?si=i-4X8OAGPLHgMfvz (Year: 2020).*
(Continued)

Primary Examiner — Kee M Tung
Assistant Examiner — Thang Gia Huynh
(74) Attorney, Agent, or Firm — YHE Law LLP

(57) ABSTRACT

In some examples, a change in a current viewpoint of a user is detected while a three-dimensional environment is visible. In some examples, in accordance with a determination that at least a threshold amount of the object is visible from the viewpoint of the user, user authorization of the secure operation, using a virtual user interface object, is enabled. In some examples, the user is biometrically authenticated, at a first time, to perform a first type of biometric authentication. In some examples, a request to perform the secure operation is received at a second time. In some examples, in accordance with a determination that the user met respective criteria between the first time and the second time, the secure operation is performed without performing, after receiving the request, the first type of biometric authentication.

33 Claims, 24 Drawing Sheets

(58) Field of Classification Search
CPC ... G06F 3/04842; G06F 3/0488; H04L 63/08; H04L 63/083; H04L 63/0861; H04L 63/20

See application file for complete search history.

(56) References Cited

U.S. PATENT DOCUMENTS

| | | | |
|---|---|---|---|
| 8,594,374 | B1 | 11/2013 | Bozarth |
| 8,983,846 | B2 | 3/2015 | Di Profio et al. |
| 9,965,039 | B2 | 5/2018 | Kwon |
| 10,199,051 | B2 | 2/2019 | Binder et al. |
| 10,802,582 | B1 | 10/2020 | Clements |
| 11,106,280 | B1 | 8/2021 | Bigham et al. |
| 11,907,421 | B1 | 2/2024 | Clements |
| 2001/0030715 | A1 | 10/2001 | Tabata |
| 2006/0156228 | A1 | 7/2006 | Gallo et al. |
| 2007/0024579 | A1 | 2/2007 | Rosenberg |
| 2008/0030496 | A1 | 2/2008 | Lee et al. |
| 2008/0218641 | A1 | 9/2008 | Kjeldsen et al. |
| 2011/0032274 | A1 | 2/2011 | Miyata |
| 2012/0036433 | A1 | 2/2012 | Zimmer et al. |
| 2012/0081356 | A1 | 4/2012 | Filippov et al. |
| 2012/0105444 | A1 | 5/2012 | Tokuda |
| 2012/0105486 | A1 | 5/2012 | Lankford et al. |
| 2012/0189273 | A1 | 7/2012 | Folgner et al. |
| 2012/0200600 | A1* | 8/2012 | Demaine ............. G06F 3/04883 345/633 |
| 2012/0254989 | A1 | 10/2012 | Levien et al. |
| 2012/0295708 | A1 | 11/2012 | Hernandez-Abrego et al. |
| 2012/0316876 | A1 | 12/2012 | Jang et al. |
| 2013/0010093 | A1 | 1/2013 | Redmann et al. |
| 2013/0014052 | A1 | 1/2013 | Frey et al. |
| 2013/0036380 | A1 | 2/2013 | Symons |
| 2013/0114043 | A1 | 5/2013 | Balan et al. |
| 2013/0201185 | A1 | 8/2013 | Kochi |
| 2013/0227596 | A1 | 8/2013 | Pettis et al. |
| 2013/0304479 | A1 | 11/2013 | Teller et al. |
| 2013/0307771 | A1 | 11/2013 | Parker et al. |
| 2014/0195918 | A1 | 7/2014 | Friedlander |
| 2014/0222436 | A1 | 8/2014 | Binder et al. |
| 2014/0237393 | A1 | 8/2014 | Van Wie et al. |
| 2014/0350924 | A1 | 11/2014 | Zurek et al. |
| 2014/0354539 | A1 | 12/2014 | Skogo et al. |
| 2015/0109191 | A1 | 4/2015 | Johnson et al. |
| 2015/0130740 | A1 | 5/2015 | Cederlund et al. |
| 2015/0135309 | A1 | 5/2015 | Karmarkar et al. |
| 2015/0154001 | A1 | 6/2015 | Knox et al. |
| 2015/0169053 | A1 | 6/2015 | Bozarth et al. |
| 2015/0370323 | A1 | 12/2015 | Cieplinski et al. |
| 2016/0219262 | A1 | 7/2016 | Cole et al. |
| 2016/0253745 | A1* | 9/2016 | Lee ..................... G06T 19/006 705/27.2 |
| 2016/0306533 | A1 | 10/2016 | Agarwal et al. |
| 2016/0320838 | A1 | 11/2016 | Teller et al. |
| 2017/0004828 | A1 | 1/2017 | Lee et al. |
| 2017/0108924 | A1 | 4/2017 | Hurter |
| 2017/0195307 | A1* | 7/2017 | Jones-McFadden ........................ H04W 12/06 |
| 2017/0235361 | A1 | 8/2017 | Rigazio et al. |
| 2017/0332035 | A1 | 11/2017 | Shah et al. |
| 2017/0332045 | A1 | 11/2017 | Metter et al. |
| 2017/0336867 | A1 | 11/2017 | Wilairat et al. |
| 2017/0353423 | A1 | 12/2017 | Morrison et al. |
| 2018/0018514 | A1 | 1/2018 | Azam et al. |
| 2018/0024846 | A1 | 1/2018 | Wu et al. |
| 2018/0063249 | A1 | 3/2018 | Nguyen |
| 2018/0095635 | A1 | 4/2018 | Valdivia et al. |
| 2018/0096690 | A1 | 4/2018 | Mixter et al. |
| 2018/0233139 | A1 | 8/2018 | Finkelstein et al. |
| 2018/0262834 | A1 | 9/2018 | Cho et al. |
| 2018/0268747 | A1 | 9/2018 | Braun |
| 2018/0365898 | A1 | 12/2018 | Costa |
| 2019/0080066 | A1 | 3/2019 | Van Os et al. |
| 2019/0138092 | A1 | 5/2019 | Song |
| 2019/0155382 | A1 | 5/2019 | Ikuta et al. |
| 2019/0235247 | A1 | 8/2019 | Norden |
| 2019/0333508 | A1 | 10/2019 | Rao et al. |
| 2019/0371323 | A1 | 12/2019 | Kao et al. |
| 2020/0042083 | A1 | 2/2020 | Min |
| 2020/0075015 | A1 | 3/2020 | Taki et al. |
| 2020/0103963 | A1 | 4/2020 | Kelly et al. |
| 2020/0225746 | A1 | 7/2020 | Bar-Zeev et al. |
| 2020/0379560 | A1 | 12/2020 | Krasadakis |
| 2020/0401686 | A1 | 12/2020 | Duchastel |
| 2021/0027790 | A1 | 1/2021 | Choi et al. |
| 2021/0048883 | A1 | 2/2021 | Kelly et al. |
| 2021/0151008 | A1* | 5/2021 | Chrapek ................. G06F 3/011 |
| 2021/0255269 | A1 | 8/2021 | Lv et al. |
| 2021/0286502 | A1 | 9/2021 | Lemay et al. |
| 2021/0287416 | A1 | 9/2021 | O'hagan et al. |
| 2022/0074754 | A1 | 3/2022 | Elder et al. |
| 2022/0100270 | A1 | 3/2022 | Pastrana Vicente et al. |
| 2022/0100812 | A1 | 3/2022 | Anvaripour et al. |
| 2022/0121277 | A1 | 4/2022 | Azam et al. |
| 2022/0207840 | A1 | 6/2022 | Cansizoglu et al. |
| 2022/0214743 | A1 | 7/2022 | Dascola et al. |
| 2022/0237660 | A1 | 7/2022 | Balondona |
| 2022/0253136 | A1 | 8/2022 | Holder et al. |
| 2022/0413605 | A1 | 12/2022 | Liu et al. |
| 2023/0071037 | A1 | 3/2023 | Kim et al. |
| 2023/0185373 | A1 | 6/2023 | Kelly et al. |
| 2023/0254152 | A1* | 8/2023 | Ratnakaram ........... G06Q 20/30 726/7 |
| 2024/0028110 | A1 | 1/2024 | Aurongzeb et al. |
| 2024/0028177 | A1 | 1/2024 | Pastrana Vicente et al. |
| 2024/0085707 | A1 | 3/2024 | Schowengerdt |
| 2024/0103616 | A1 | 3/2024 | Yerkes et al. |
| 2024/0103617 | A1 | 3/2024 | Yerkes et al. |
| 2024/0103678 | A1 | 3/2024 | Dryer et al. |
| 2024/0104859 | A1 | 3/2024 | Chand et al. |
| 2024/0118746 | A1 | 4/2024 | Yerkes et al. |
| 2024/0427417 | A1 | 12/2024 | Kelly et al. |

FOREIGN PATENT DOCUMENTS

| | | |
|---|---|---|
| EP | 2801972 B1 | 1/2018 |
| EP | 3373132 A2 | 9/2018 |
| JP | 9-81309 A | 3/1997 |
| JP | 9-322199 A | 12/1997 |
| JP | 2006-293939 A | 10/2006 |
| JP | 2010-211742 A | 9/2010 |
| JP | 2011-159006 A | 8/2011 |
| JP | 2011-209787 A | 10/2011 |
| JP | 2013-537670 A | 10/2013 |
| JP | 2014-230061 A | 12/2014 |
| JP | 2015-514254 A | 5/2015 |
| JP | 2015-149634 A | 8/2015 |
| JP | 2016-508007 A | 3/2016 |
| JP | 2016-76799 A | 5/2016 |
| JP | 6112878 B2 | 4/2017 |
| JP | 6208151 B2 | 10/2017 |
| JP | 6238381 B1 | 11/2017 |
| JP | 2018-513515 A | 5/2018 |
| JP | 2019-155115 A | 9/2019 |
| JP | 2020-30853 A | 2/2020 |
| JP | 2020-504376 A | 2/2020 |
| JP | 2020-149336 A | 9/2020 |
| JP | 2021-533512 A | 12/2021 |
| JP | 2022-3545 A | 1/2022 |
| JP | 2022-23406 A | 2/2022 |
| JP | 2024-537657 A | 10/2024 |
| KR | 10-2015-0068013 A | 6/2015 |
| KR | 10-2017-0065563 A | 6/2017 |
| WO | 2009/125481 A1 | 10/2009 |
| WO | 2012/018513 A1 | 2/2012 |
| WO | 2014/124332 A2 | 8/2014 |
| WO | 2015/088141 A1 | 6/2015 |
| WO | 2016/189390 A2 | 12/2016 |
| WO | 2017/068422 A | 4/2017 |
| WO | 2018/109751 A1 | 6/2018 |
| WO | 2018/125563 B1 | 7/2018 |
| WO | 2018/226265 A1 | 12/2018 |
| WO | 2020/028236 A1 | 2/2020 |
| WO | 2021/188439 A1 | 9/2021 |

(56) References Cited

FOREIGN PATENT DOCUMENTS

| WO | 2022/086580 A1 | 4/2022 |
|---|---|---|
| WO | 2022/147146 A2 | 7/2022 |
| WO | 2023/049418 A2 | 3/2023 |

OTHER PUBLICATIONS

Applicant-Initiated Interview Summary received for U.S. Appl. No. 16/553,622, mailed on Aug. 3, 2020, 3 pages.
Applicant-Initiated Interview Summary received for U.S. Appl. No. 17/087,855, mailed on Feb. 28, 2022, 2 pages.
Applicant-Initiated Interview Summary received for U.S. Appl. No. 17/087,855, mailed on Jul. 5, 2022, 2 pages.
Applicant-Initiated Interview Summary received for U.S. Appl. No. 17/087,855, mailed on Nov. 5, 2021, 2 pages.
Corrected Notice of Allowance received for U.S. Appl. No. 16/553,622, mailed on Sep. 23, 2020, 5 pages.
Corrected Notice of Allowance received for U.S. Appl. No. 17/087,855, mailed on Jan. 12, 2023, 6 pages.
Corrected Notice of Allowance received for U.S. Appl. No. 17/087,855, mailed on Jan. 25, 2023, 4 pages.
Decision to Grant received for European Patent Application No. 19769336.9, mailed on Oct. 7, 2022, 2 pages.
Extended European Search Report received for European Patent Application No. 22198902.3, mailed on Jan. 20, 2023, 9 pages.
Final Office Action received for U.S. Appl. No. 17/087,855, mailed on Mar. 31, 2022, 23 pages.
Intention to Grant received for European Patent Application No. 19769336.9, mailed on May 31, 2022, 13 pages.
International Preliminary Report on Patentability received for PCT Patent Application No. PCT/US2019/049239, mailed on Apr. 8, 2021, 12 pages.
International Search Report and Written Opinion received for PCT Patent Application No. PCT/US2019/049239, mailed on Jan. 22, 2020, 18 pages.
Invitation to Pay Additional Fees received for PCT Patent Application No. PCT/US2019/049239, mailed on Dec. 4, 2019, 10 pages.
Non-Final Office Action received for U.S. Appl. No. 16/553,622, mailed on May 29, 2020, 11 pages.
Non-Final Office Action received for U.S. Appl. No. 17/087,855, mailed on Dec. 24, 2021, 21 pages.
Non-Final Office Action received for U.S. Appl. No. 17/087,855, mailed on Jul. 12, 2021, 17 pages.
Non-Final Office Action received for U.S. Appl. No. 17/087,855, mailed on Jul. 21, 2022, 23 pages.
Notice of Acceptance received for Australian Patent Application No. 2019346842, mailed on Jan. 21, 2021, 3 pages.
Notice of Acceptance received for Australian Patent Application No. 2021202352, mailed on Jun. 6, 2022, 3 pages.
Notice of Allowance received for Chinese Patent Application No. 201980041865.3, mailed on Aug. 16, 2022, 6 pages (3 pages of English Translation and 3 pages of Official Copy).
Notice of Allowance received for Japanese Patent Application No. 2020-569806, mailed on Jul. 12, 2021, 4 pages (1 page of English Translation and 3 pages of Official Copy).
Notice of Allowance received for Japanese Patent Application No. 2021-131310, mailed on Dec. 9, 2022, 4 pages (1 pages of English Translation and 3 pages of Official Copy).
Notice of Allowance received for Korean Patent Application No. 10-2020-7036748, mailed on Jan. 25, 2021, 3 pages (1 page of English Translation and 2 pages of Official Copy).
Notice of Allowance received for U.S. Appl. No. 16/553,622, mailed on Sep. 11, 2020, 8 pages.
Notice of Allowance received for U.S. Appl. No. 17/087,855, mailed on Nov. 25, 2022, 8 pages.
Office Action received for Australian Patent Application No. 2021202352, mailed on Mar. 15, 2022, 3 pages.
Office Action received for Chinese Patent Application No. 201980041865.3, mailed on Apr. 13, 2022, 12 pages (6 pages of English Translation and 6 pages of Official Copy).
Office Action received for Chinese Patent Application No. 201980041865.3, mailed on May 24, 2021, 14 pages (8 pages of English Translation and 6 pages of Official Copy).
Office Action received for European Patent Application No. 19769336.9, mailed on Nov. 4, 2021, 6 pages.
Office Action received for Japanese Patent Application No. 2021-131310, mailed on Sep. 2, 2022, 9 pages (5 pages of English Translation and 4 pages of Official Copy).
Office Action received for Korean Patent Application No. 10-2021-7010306, mailed on Feb. 15, 2023, 10 pages (5 pages of English Translation and 5 pages of Official Copy).
Fono et al., "EyeWindows: Evaluation of Eye-Controlled Zooming Windows for Focus Selection", CHI 2005, Conference Proceedings, Conference on Human Factors in Computing Systems, Apr. 2-7, 2005, pp. 151-160.
Corrected Notice of Allowance received for U.S. Appl. No. 18/105,191, mailed on Aug. 6, 2024, 5 pages.
Notice of Allowance received for U.S. Appl. No. 18/105,191, mailed on May 22, 2024, 8 pages.
Notice of Allowance received for Japanese Patent Application No. 2023-001790, mailed on Jul. 5, 2024, 4 pages (1 page of English Translation and 3 pages of Official Copy).
International Preliminary Report on Patentability received for PCT Patent Application No. PCT/US2023/014067, mailed on Sep. 12, 2024, 12 pages.
Applicant-Initiated Interview Summary received for U.S. Appl. No. 18/105,191, mailed on Jan. 17, 2024, 2 pages.
Final Office Action received for U.S. Appl. No. 18/105,191, mailed on Feb. 20, 2024, 20 pages.
International Search Report and Written Opinion received for PCT Patent Application No. PCT/US2022/044637, mailed on Mar. 15, 2023, 19 pages.
International Search Report and Written Opinion received for PCT Patent Application No. PCT/US2023/14067, mailed on Aug. 4, 2023, 17 pages.
Invitation to Pay Additional Fees and Partial International Search Report received for PCT Patent Application No. PCT/US2022/044637, mailed on Jan. 20, 2023, 12 pages.
Invitation to Pay Additional Fees and Partial International Search Report received for PCT Patent Application No. PCT/US2023/14067, mailed on Jun. 14, 2023, 16 pages.
Krumm, et al., "Multi-Camera Multi-Person Tracking for Easyliving", Third IEEE International Workshop on Visual Surveillance, Jul. 1, 2000, 8 pages.
Non-Final Office Action received for U.S. Appl. No. 18/105,191, mailed on Oct. 13, 2023, 23 pages.
Notice of Acceptance received for Australian Patent Application No. 2022231779, mailed on Feb. 5, 2024, 3 pages.
Notice of Allowance received for Korean Patent Application No. 10-2021-7010306, mailed on Aug. 14, 2023, 7 pages (2 pages of English Translation and 5 pages of Official Copy).
Office Action received for Australian Patent Application No. 2022231779, mailed on Aug. 7, 2023, 5 pages.
Office Action received for Australian Patent Application No. 2022231779, mailed on Nov. 6, 2023, 3 pages.
Applicant-Initiated Interview Summary received for U.S. Appl. No. 18/105,191, mailed on Apr. 30, 2024, 2 pages.
International Preliminary Report on Patentability received for PCT Patent Application No. PCT/US2022/044637, mailed on Apr. 4, 2024, 12 pages.
International Search Report and Written Opinion received for PCT Patent Application No. PCT/US2023/033372, mailed on Jan. 12, 2024, 21 pages.
International Search Report and Written Opinion received for PCT Patent Application No. PCT/US2023/033376, mailed on Mar. 18, 2024, 21 pages.
International Search Report and Written Opinion received for PCT Patent Application No. PCT/US2023/033540, mailed on Feb. 6, 2024, 25 pages.

(56) References Cited

OTHER PUBLICATIONS

Invitation to Pay Additional Fees and Partial International Search Report received for PCT Patent Application No. PCT/US2023/033372, mailed on Nov. 22, 2023, 13 pages.
Invitation to Pay Additional Fees and Partial International Search Report received for PCT Patent Application No. PCT/US2023/033376, mailed on Jan. 24, 2024, 13 pages.
Invitation to Pay Additional Fees and Partial International Search Report received for PCT Patent Application No. PCT/US2023/033540, mailed on Dec. 12, 2023, 17 pages.
Office Action received for Japanese Patent Application No. 2023-001790, mailed on Mar. 4, 2024, 10 pages (5 pages of English Translation and 5 pages of Official Copy).
Office Action received for Japanese Patent Application No. 2024-515963, mailed on Mar. 7, 2025, 15 pages (7 pages of English Translation and 8 pages of Official Copy).
Office Action received for European Patent Application No. 22198902.3, mailed on Dec. 12, 2024, 8 pages.
International Preliminary Report on Patentability received for PCT Patent Application No. PCT/US2023/033372, mailed on Apr. 3, 2025, 15 pages.
International Preliminary Report on Patentability received for PCT Patent Application No. PCT/US2023/033376, mailed on Apr. 3, 2025, 15 pages.
International Preliminary Report on Patentability received for PCT Patent Application No. PCT/US2023/033540, mailed on Apr. 3, 2025, 18 pages.
Office Action received for Korean Patent Application No. 10-2023-7039602, mailed on Nov. 14, 2024, 12 pages (5 pages of English Translation and 7 pages of Official Copy).
Applicant-Initiated Interview Summary received for U.S. Appl. No. 18/374,562, mailed on Jul. 22, 2025, 2 pages.
Corrected Notice of Allowance received for U.S. Appl. No. 18/367,418, mailed on Jul. 8, 2025, 12 pages.
Non-Final Office Action received for U.S. Appl. No. 18/371,403, mailed on Jul. 21, 2025, 23 pages.
Non-Final Office Action received for U.S. Appl. No. 18/371,406, mailed on Jul. 15, 2025, 15 pages.
Non-Final Office Action received for U.S. Appl. No. 18/829,038, mailed on Jun. 23, 2025, 12 pages.
Notice of Allowance received for U.S. Appl. No. 18/367,418, mailed on Aug. 15, 2025, 14 pages.
Notice of Allowance received for U.S. Appl. No. 18/367,418, mailed on Jun. 24, 2025, 18 pages.
Office Action received for Australian Patent Application No. 2022352756, mailed on Aug. 8, 2025, 4 pages.
Office Action received for Australian Patent Application No. 2024203238, mailed on Jun. 25, 2025, 5 pages.
Office Action received for European Patent Application No. 22198902.3, mailed on Jul. 9, 2025, 7 pages.
Office Action received for Japanese Patent Application No. 2024-127947, mailed on Aug. 1, 2025, 6 pages (3 pages of English Translation and 3 pages of Official Copy).
Office Action received for Japanese Patent Application No. 2024-515963, mailed on Sep. 1, 2025, 17 pages (8 pages of English Translation and 9 pages of Official Copy).
Office Action received for Japanese Patent Application No. 2024-550636, mailed on Jun. 20, 2025, 10 pages (5 pages of English Translation and 5 pages of Official Copy).
Office Action received for Korean Patent Application No. 10-2023-7039602, mailed on May 28, 2025, 9 pages (4 pages of English Translation and 5 pages of Official Copy).
Non-Final Office Action received for U.S. Appl. No. 18/374,562, mailed on May 19, 2025, 29 pages.
Office Action received for Australian Patent Application No. 2022352756, mailed on May 14, 2025, 4 pages.
Applicant-Initiated Interview Summary received for U.S. Appl. No. 18/371,403, mailed on Sep. 18, 2025, 4 pages.
Applicant-Initiated Interview Summary received for U.S. Appl. No. 18/371,406, mailed on Sep. 19, 2025, 2 pages.
Applicant-Initiated Interview Summary received for U.S. Appl. No. 18/829,038, mailed on Sep. 18, 2025, 2 pages.
Final Office Action received for U.S. Appl. No. 18/374,562, mailed on Sep. 11, 2025, 45 pages.
Notice of Allowance received for Japanese Patent Application No. 2024-550636, mailed on Nov. 25, 2025, 4 pages (1 page of English Translation and 3 pages of Official Copy).
Intention to Grant received for European Patent Application No. 23714389.6, mailed on Dec. 15, 2025, 9 pages.

\* cited by examiner

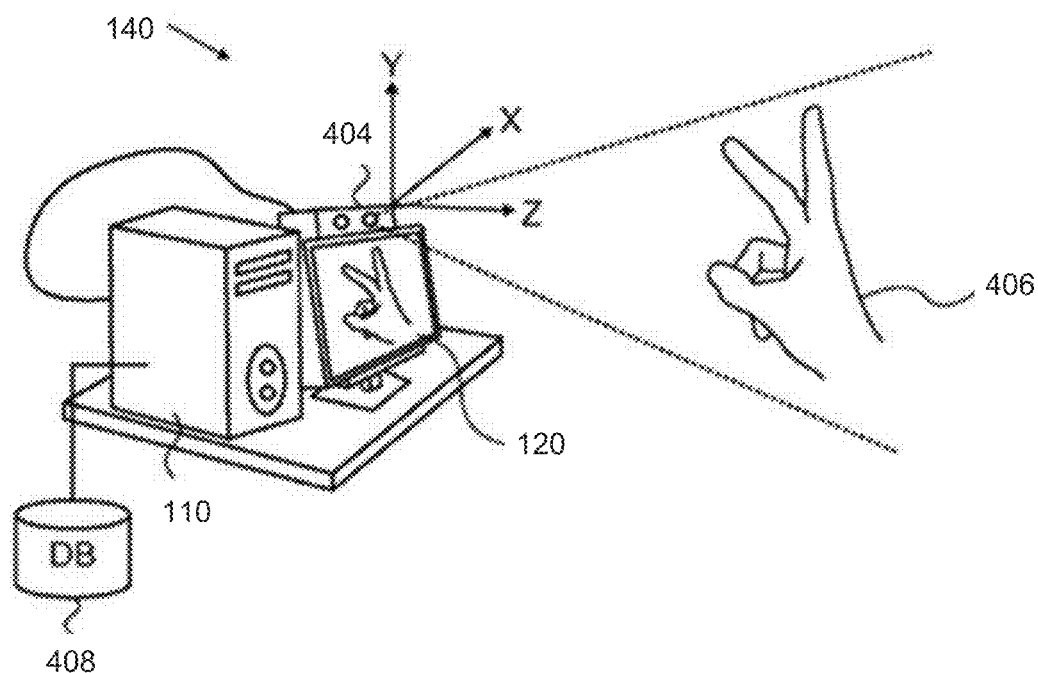
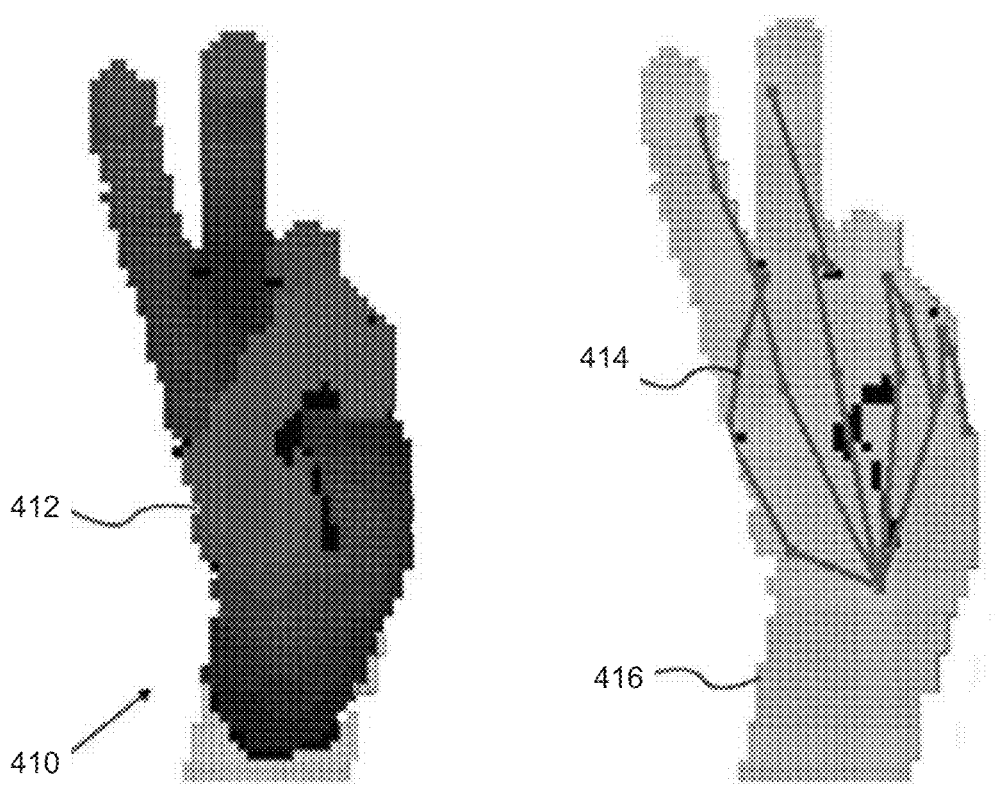
*Figure 4*

800 ↘

802
While a three-dimensional environment is visible via the display generation component, wherein the three-dimensional environment includes a virtual user interface object that includes information about a secure operation, detect, via the one or more input devices, a change in a current viewpoint of the user.

↓

804
In response to detecting the change in the viewpoint of the user, in accordance with a determination that at least a threshold amount of the virtual user interface object is visible from the viewpoint of the user, and that the user is authorized to perform the secure operation, enable user authorization of the secure operation using the virtual user interface object.

↓

806
In accordance with a determination that less than the threshold amount of the virtual user interface object is visible from the viewpoint of the user, forgo enabling user authorization of the secure operation using the virtual user interface object.

902
At a first time, biometrically authenticating a user of the device using the biometric sensor to perform a first type of biometric authentication.

904
At a second time, after the first time, receiving a request to perform a secure operation.

906
In response to receiving the request to perform the secure operation:

908
In accordance with a determination that a user of the device met respective criteria between the first time and the second time, performing the secure operation without performing, after receiving the request to perform the secure operation, the first type of biometric authentication, wherein the respective criteria is based on sensor measurements taken at a plurality of intermediate times between the first time and the second time, including sensor measurements taken at a first intermediate time and sensor measurements taken at a second intermediate time that detect that a same user was using the device between the first time and the second time.

910
In accordance with a determination that the user of the device did not meet respective criteria between the first time and the second time, forgoing performing the secure operation.

*Figure 9*

DEVICES, METHODS, AND GRAPHICAL USER INTERFACES FOR AUTHORIZING A SECURE OPERATION

CROSS-REFERENCE TO RELATED APPLICATIONS

This application claims priority to U.S. Provisional Patent Application No. 63/314,900, entitled "DEVICES, METHODS, AND GRAPHICAL USER INTERFACES FOR AUTHORIZING A SECURE OPERATION," filed on Feb. 28, 2022, the contents of which is hereby incorporated by reference in its entirety.

TECHNICAL FIELD

The present disclosure relates generally to computer systems that are in communication with a display generation component, one or more input devices, and (optionally) a biometric sensor, that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for authorizing a secure operation, within environments that include at least some virtual elements (e.g., augmented reality environments, mixed reality environments, and virtual reality environments), are cumbersome, inefficient, and limited. For example, systems that offer solutions to automatically populate various textual fields, systems that facilitate payment for items or other services, and systems that provide access to third party applications (e.g., social networking, gaming, business services, etc.) are complex, tedious, error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for authorizing a secure operation in order to make interaction with the computer systems more efficient and intuitive for a user. Such methods and interfaces optionally complement or replace conventional methods for authorizing a secure operation. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for authorizing a secure operation. Such methods and interfaces may complement or replace conventional methods for authorizing a secure operation. Such methods and interfaces reduce the number, extent, and/or the nature of the inputs from a user and produce a more efficient human-machine interface. For battery-operated computing devices, such methods and interfaces conserve power and increase the time between battery charges. Moreover, these methods and interfaces help reduce the number of repetitive inputs from a user by automatically populating or otherwise entering sensitive or confidential information, such as passwords or payment information. Such methods and interfaces also reduce processing power and reduce display usage by decreasing the amount of time a user spends interacting with the device when authorizing the secure operation.

In accordance with some embodiments, a method is described. The method is performed at a computer system that is in communication with one or more input devices and a display generation component. The method comprises: while a three-dimensional environment is visible via the display generation component, wherein the three-dimensional environment includes a virtual user interface object that includes information about a secure operation, detecting, via the one or more input devices, a change in a current viewpoint of the user, and in response to detecting the change in the viewpoint of the user: in accordance with a determination that at least a threshold amount of the virtual user interface object is visible from the viewpoint of the user, and that the user is authorized to perform the secure operation, enabling user authorization of the secure operation using the virtual user interface object, and in accordance with a determination that less than the threshold amount of the virtual user interface object is visible from the viewpoint of the user, forgoing enabling user authorization of the secure operation using the virtual user interface object.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: while a three-dimensional environment is visible via the display generation component, wherein the three-dimensional environment includes a virtual user interface object that includes information about a secure operation, detecting, via the one or more input devices, a change in a current viewpoint of the user, and in response to detecting the change in the viewpoint of the user: in accordance with a determination that at least a threshold amount of the virtual user interface object is visible from the viewpoint of the user, and that the user is authorized to perform the secure operation, enabling user authorization of the secure operation using the virtual user interface object, and in accordance with a determination that less than the threshold amount of the virtual user interface object is visible from the viewpoint of the user, forgoing enabling user authorization of the secure operation using the virtual user interface object.

In accordance with some embodiments, a computer system is described. The computer system is in communication with one or more input devices and a display generation component. The computer system comprises: one or more processors, and memory storing one or more programs configured to be executed by the one or more processors, the one or more programs including instructions for: while a three-dimensional environment is visible via the display generation component, wherein the three-dimensional environment includes a virtual user interface object that includes information about a secure operation, detecting, via the one or more input devices, a change in a current viewpoint of the user, and in response to detecting the change in the viewpoint of the user: in accordance with a determination that at least a threshold amount of the virtual user interface object is visible from the viewpoint of the user, and that the user is authorized to perform the secure operation, enabling user authorization of the secure operation using the virtual user interface object, and in accordance with a determination that less than the threshold amount of the virtual user interface object is visible from the viewpoint of the user, forgoing enabling user authorization of the secure operation using the virtual user interface object.

In accordance with some embodiments, a computer system is described. The computer system is in communication with one or more input devices and a display generation component. The computer system comprises: while a three-dimensional environment is visible via the display generation component, wherein the three-dimensional environment includes a virtual user interface object that includes information about a secure operation, means for detecting, via the one or more input devices, a change in a current viewpoint of the user, and in response to detecting the change in the viewpoint of the user: in accordance with a determination that at least a threshold amount of the virtual user interface object is visible from the viewpoint of the user, and that the user is authorized to perform the secure operation, means for enabling user authorization of the secure operation using the virtual user interface object, and in accordance with a determination that less than the threshold amount of the virtual user interface object is visible from the viewpoint of the user, means for forgoing enabling user authorization of the secure operation using the virtual user interface object.

In accordance with some embodiments, a method is described. The method is performed at a computer system that is in communication with one or more input devices, a display generation component, and a biometric sensor. The method comprises: at a first time, biometrically authenticating a user of the device using the biometric sensor to perform a first type of biometric authentication; and at a second time, after the first time, receiving a request to perform a secure operation; in response to receiving the request to perform the secure operation: in accordance with a determination that a user of the device met respective criteria between the first time and the second time, performing the secure operation without performing, after receiving the request to perform the secure operation, the first type of biometric authentication, wherein the respective criteria is based on sensor measurements taken at a plurality of intermediate times between the first time and the second time, including sensor measurements taken at a first intermediate time and sensor measurements taken at a second intermediate time that detect that a same user was using the device between the first time and the second time; and in accordance with a determination that the continuity criteria was not satisfied between the first time and the second time, forgoing performing the secure operation.

In accordance with some embodiments, a non-transitory computer-readable storage medium is described. The non-transitory computer-readable storage medium stores one or more programs configured to be executed by one or more processors of a computer system that is in communication with one or more input devices, a display generation component, and a biometric sensor, the one or more programs including instructions for: at a first time, biometrically authenticating a user of the device using the biometric sensor to perform a first type of biometric authentication; and at a second time, after the first time, receiving a request to perform a secure operation; in response to receiving the request to perform the secure operation: in accordance with a determination that a user of the device met respective criteria between the first time and the second time, performing the secure operation without performing, after receiving the request to perform the secure operation, the first type of biometric authentication, wherein the respective criteria is based on sensor measurements taken at a plurality of intermediate times between the first time and the second time, including sensor measurements taken at a first intermediate time and sensor measurements taken at a second intermediate time that detect that a same user was using the device between the first time and the second time; and in accordance with a determination that the continuity criteria was not satisfied between the first time and the second time, forgoing performing the secure operation.

In accordance with some embodiments, a computer system is described. The computer system is in communication with one or more input devices, a display generation component, and a biometric sensor. The computer system comprises: one or more processors, and memory storing one or more programs configured to be executed by the one or more processors, the one or more programs including instructions for: at a first time, biometrically authenticating a user of the device using the biometric sensor to perform a first type of biometric authentication; and at a second time, after the first time, receiving a request to perform a secure operation; in response to receiving the request to perform the secure operation: in accordance with a determination that a user of the device met respective criteria between the first time and the second time, performing the secure operation without performing, after receiving the request to perform the secure operation, the first type of biometric authentication, wherein the respective criteria is based on sensor measurements taken at a plurality of intermediate times between the first time and the second time, including sensor measurements taken at a first intermediate time and sensor measurements taken at a second intermediate time that detect that a same user was using the device between the first time and the second time; and in accordance with a determination that the continuity criteria was not satisfied between the first time and the second time, forgoing performing the secure operation.

In accordance with some embodiments, a computer system is described. The computer system is in communication with one or more input devices and a display generation component. The computer system comprises: at a first time, means for biometrically authenticating a user of the device using the biometric sensor to perform a first type of biometric authentication, and at a second time, after the first time, means for receiving a request to perform a secure operation, in response to receiving the request to perform the secure operation: in accordance with a determination that a user of the device met respective criteria between the first time and the second time, means for performing the secure operation without performing, after receiving the request to perform the secure operation, the first type of biometric authentication, wherein the respective criteria is based on sensor measurements taken at a plurality of intermediate times between the first time and the second time, including sensor measurements taken at a first intermediate time and sensor measurements taken at a second intermediate time that detect that a same user was using the device between the first time and the second time, and in accordance with a determination that the continuity criteria was not satisfied between the first time and the second time, means for forgoing performing the secure operation.

In accordance with some embodiments, a method is described. The method is performed at a computer system that is in communication with one or more input devices and a display generation component. The method comprises: receiving, via the one or more input devices, a request to display a user interface associated with performing a secure operation, and in response to the request to display the user interface associated with performing the secure operation, displaying, via the display generation component, a first user interface including a respective prompt to provide additional input to authorize the device to perform the secure operation, wherein: in accordance with a determination that the computer system is operating in a first mode, the respective prompt is a first prompt to provide a physical input to authorize the secure operation, and in accordance with a determination that the computer system is operating in a second mode different from the first mode, the respective prompt is a second prompt to display a second user interface, wherein the second user interface enables user authorization of the secure operation without using the physical input.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: receiving, via the one or more input devices, a request to display a user interface associated with performing a secure operation, and in response to the request to display the user interface associated with performing the secure operation, displaying, via the display generation component, a first user interface including a respective prompt to provide additional input to authorize the device to perform the secure operation, wherein: in accordance with a determination that the computer system is operating in a first mode, the respective prompt is a first prompt to provide a physical input to authorize the secure operation, and in accordance with a determination that the computer system is operating in a second mode different from the first mode, the respective prompt is a second prompt to display a second user interface, wherein the second user interface enables user authorization of the secure operation without using the physical input.

In accordance with some embodiments, a computer system is described. The computer system is in communication with one or more input devices and a display generation component. The computer system comprises: one or more processors, and memory storing one or more programs configured to be executed by the one or more processors, the one or more programs including instructions for: receiving, via the one or more input devices, a request to display a user interface associated with performing a secure operation, and in response to the request to display the user interface associated with performing the secure operation, displaying, via the display generation component, a first user interface including a respective prompt to provide additional input to authorize the device to perform the secure operation, wherein: in accordance with a determination that the computer system is operating in a first mode, the respective prompt is a first prompt to provide a physical input to authorize the secure operation, and in accordance with a determination that the computer system is operating in a second mode different from the first mode, the respective prompt is a second prompt to display a second user interface, wherein the second user interface enables user authorization of the secure operation without using the physical input.

In accordance with some embodiments, a computer system is described. The computer system is in communication with one or more input devices and a display generation component. The computer system comprises: means for receiving, via the one or more input devices, a request to display a user interface associated with performing a secure operation, and in response to the request to display the user interface associated with performing the secure operation, means for displaying, via the display generation component, a first user interface including a respective prompt to provide additional input to authorize the device to perform the secure operation, wherein: in accordance with a determination that the computer system is operating in a first mode, the respective prompt is a first prompt to provide a physical input to authorize the secure operation, and in accordance with a determination that the computer system is operating in a second mode different from the first mode, the respective prompt is a second prompt to display a second user interface, wherein the second user interface enables user authorization of the secure operation without using the physical input.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of methods of facilitating user consent for a secure operation, in accordance with various embodiments.

FIG. 9 is a flow diagram of methods of authentication continuity for a secure operation, in accordance with various embodiments.

DESCRIPTION OF EMBODIMENTS

The present disclosure relates to user interfaces for providing an extended reality (XR) experience to a user, in accordance with some embodiments.

Figure 10:
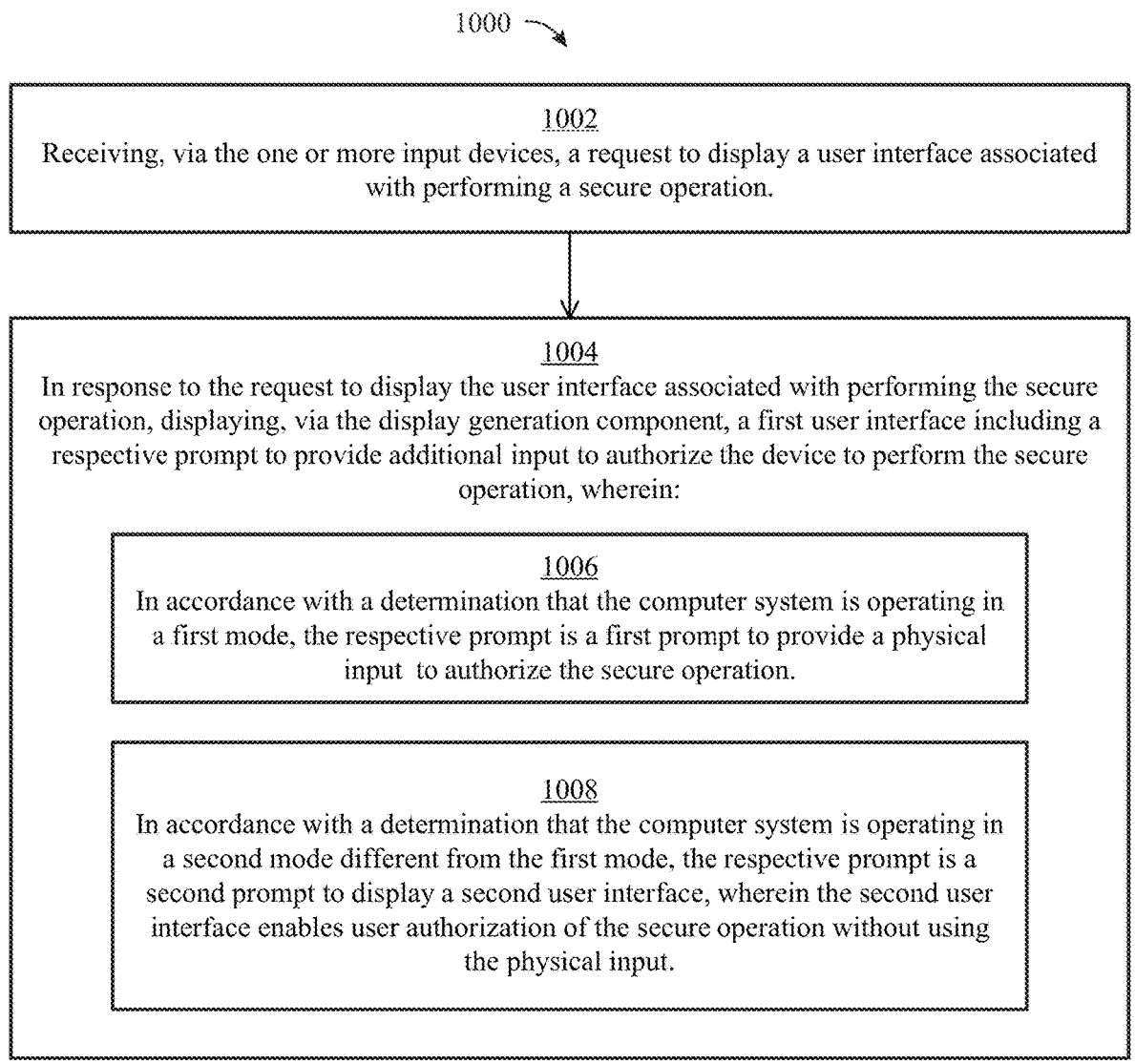
FIG. 10 is a flow diagram of methods of authorizing a secure operation via an accessibility interface, in accordance with various embodiments.

FIGS. 1-6 provide a description of example computer systems for providing XR experiences to users. FIGS. 7A-7N illustrate example techniques for authorizing a secure operation, in accordance with some embodiments. FIG. 8 is a flow diagram of methods of informed consent for a secure operation, in accordance with various embodiments. The user interfaces in FIGS. 7A-7N are used to illustrate the processes in FIG. 8. FIG. 9 is a flow diagram of methods of authentication continuity for a secure operation, in accordance with various embodiments. The user interfaces in FIGS. 7A-7N are used to illustrate the processes in FIG. 9. FIG. 10 is a flow diagram of methods of authorizing a secure operation via an accessibility interface, in accordance with various embodiments. The user interfaces in FIGS. 7A-7N are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
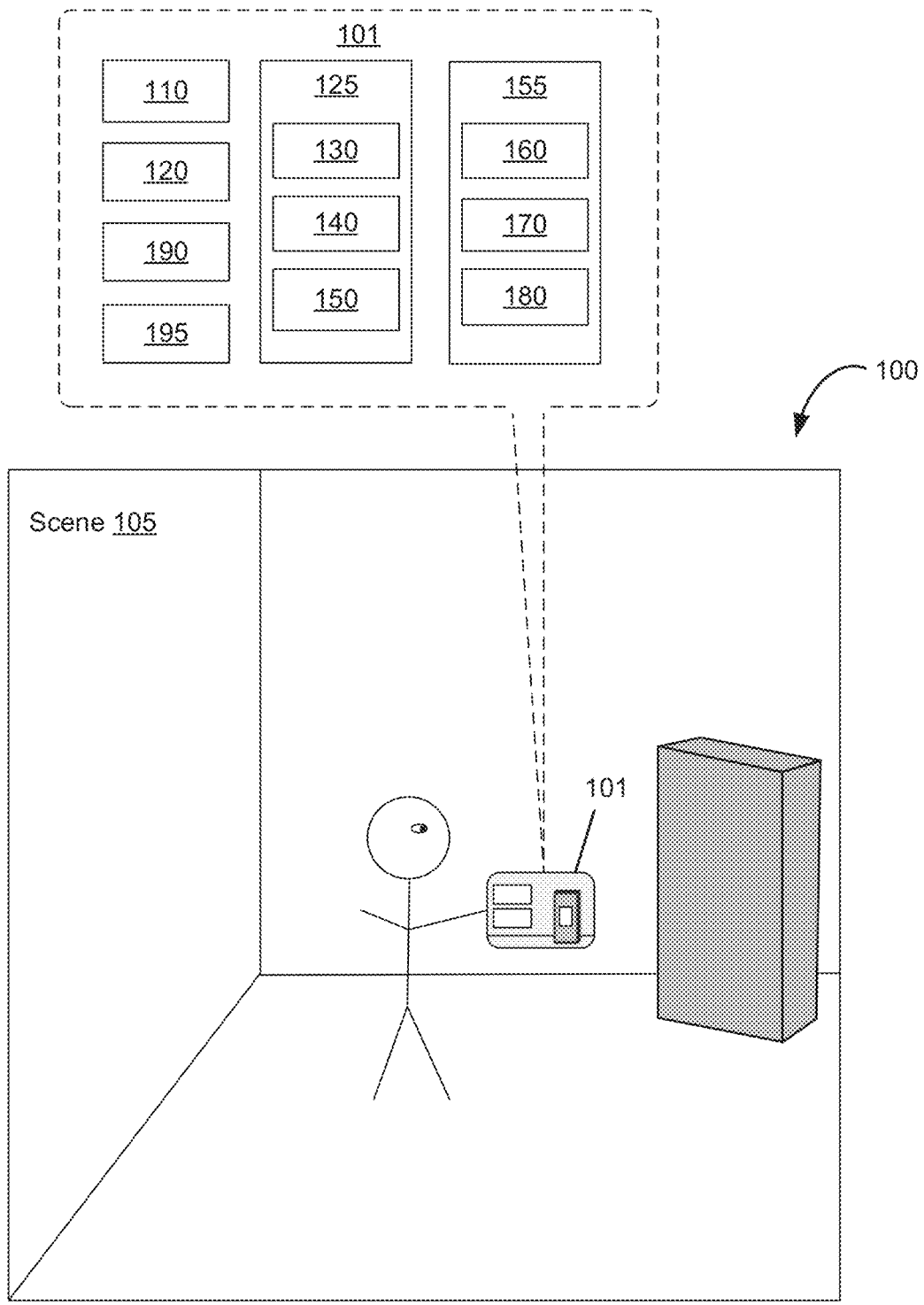
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
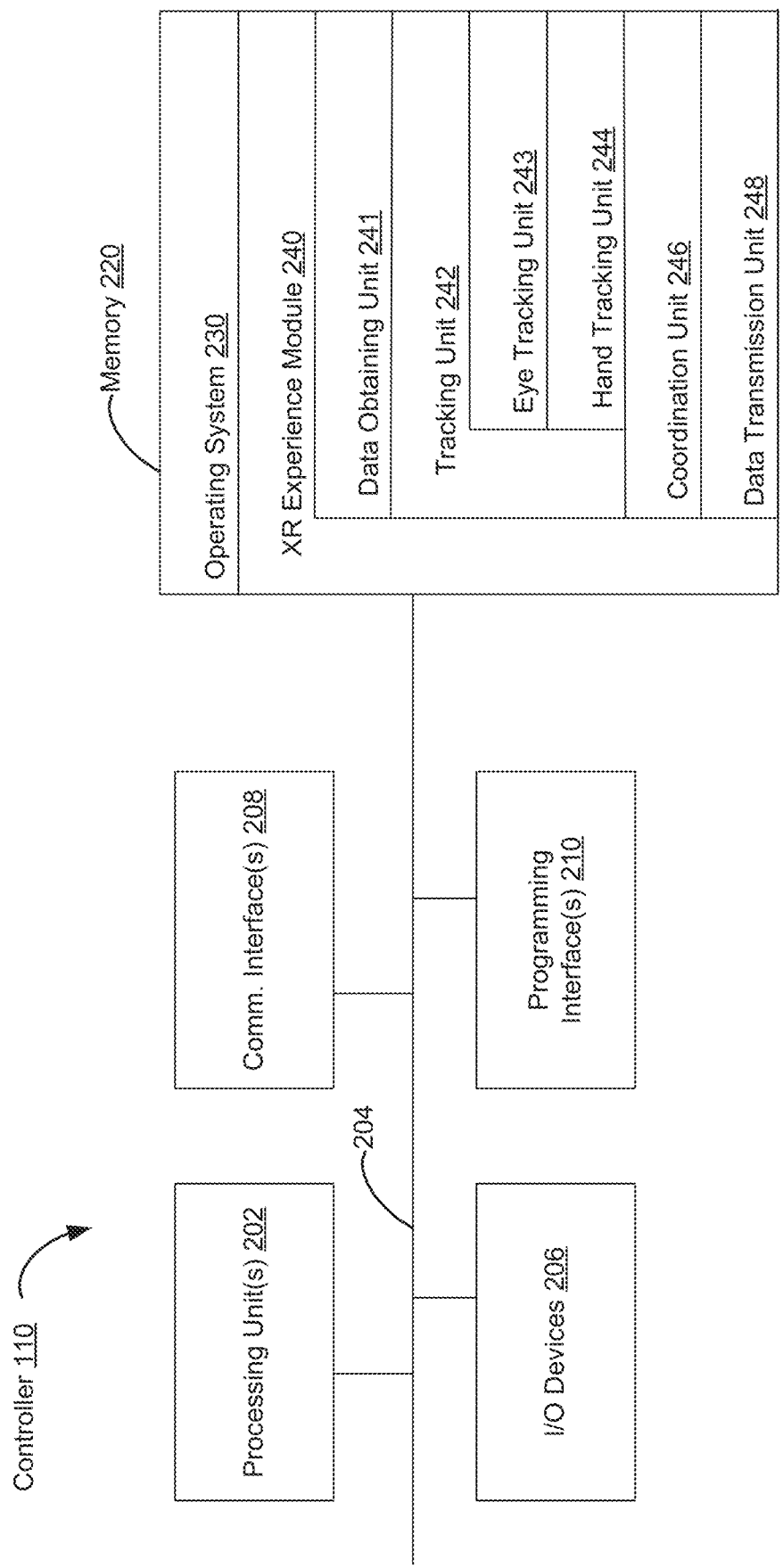
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU- ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
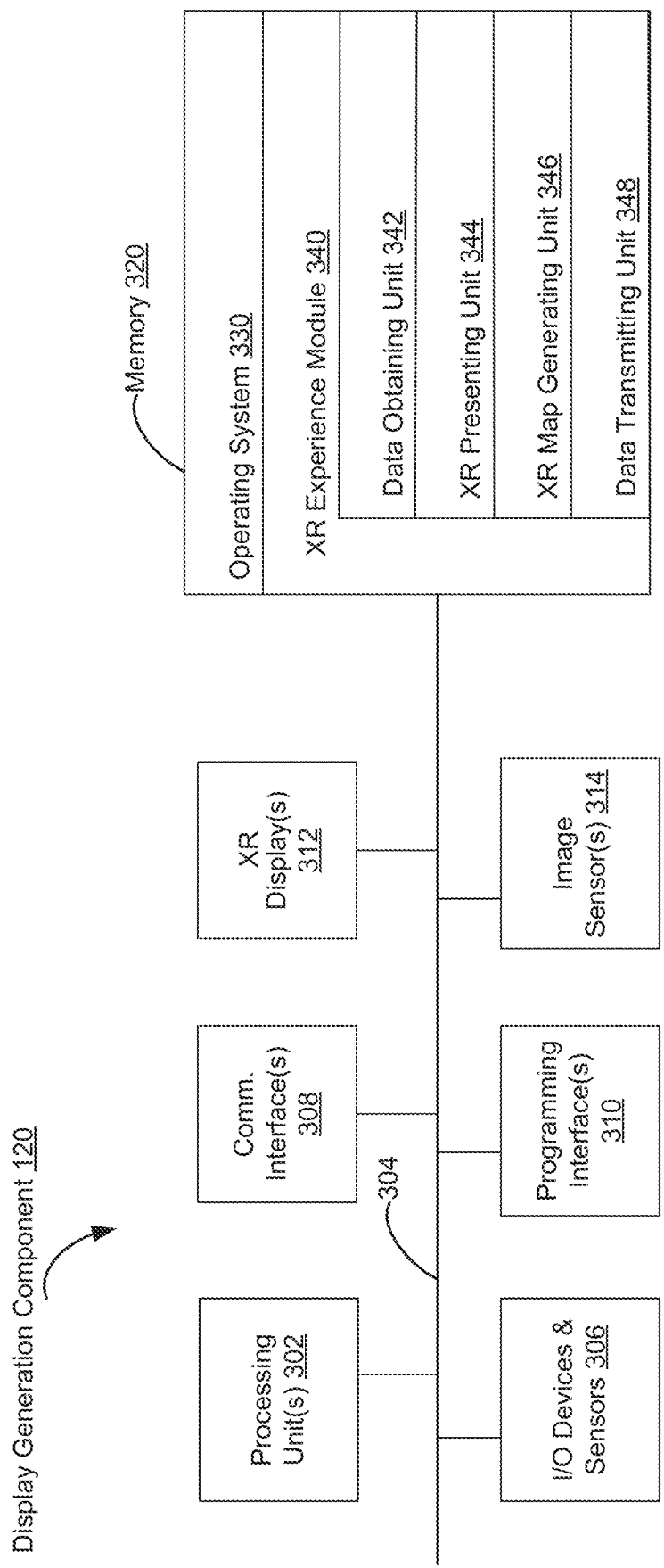
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
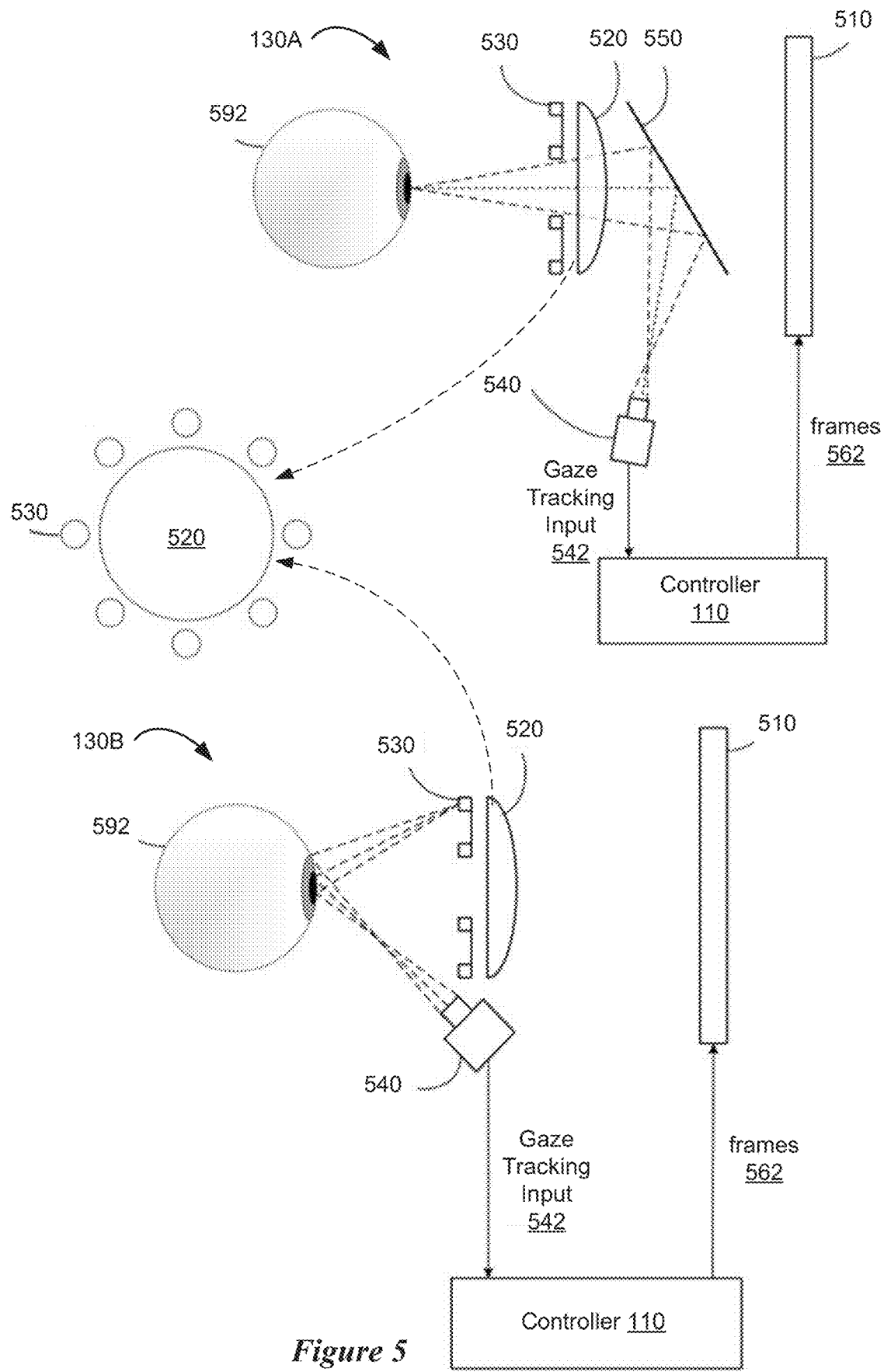
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or MR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
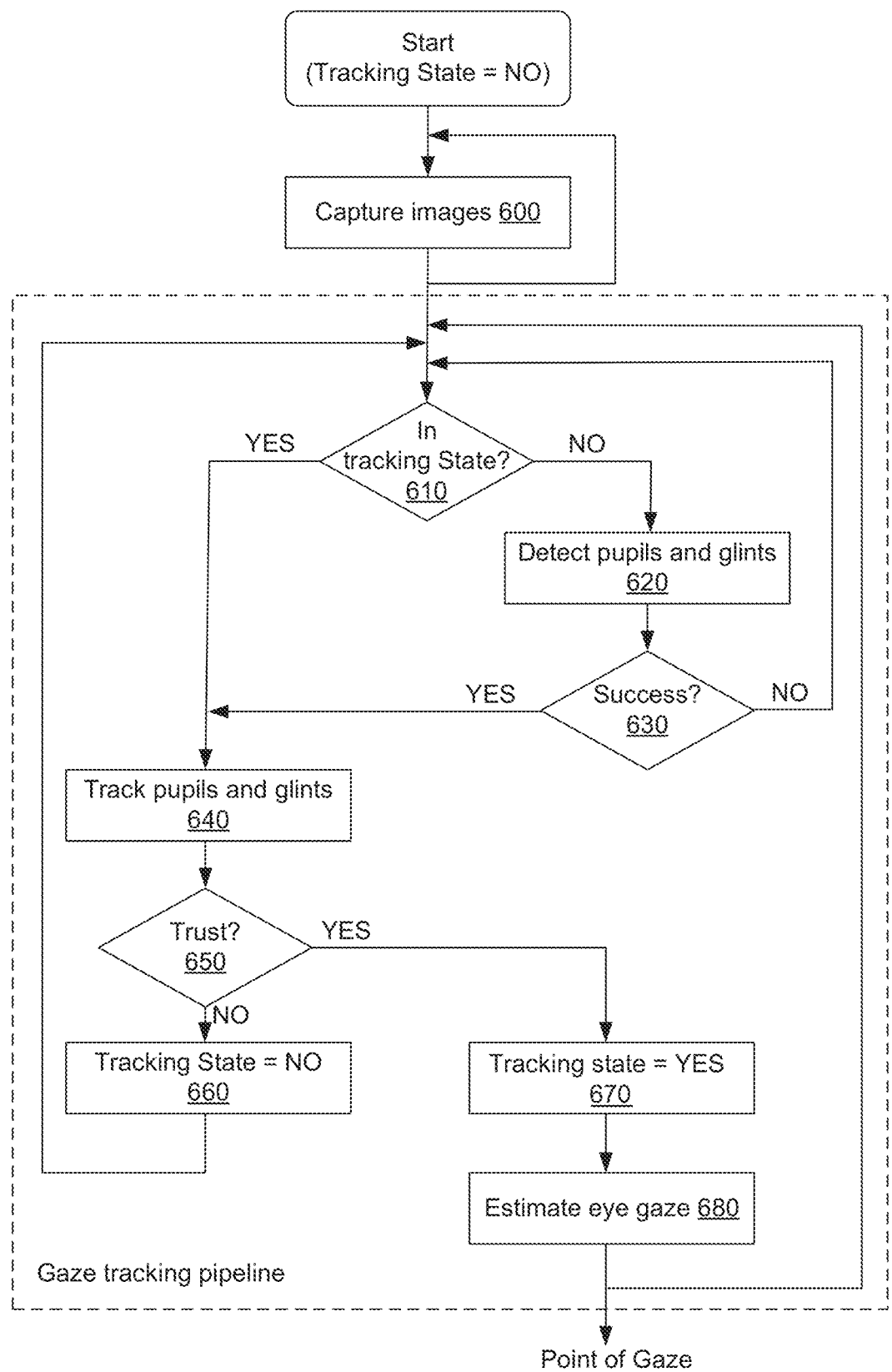
FIG. 6A is a flow diagram illustrating a glint-assisted gaze tracking pipeline in accordance with some embodiments.
Figure 7A:
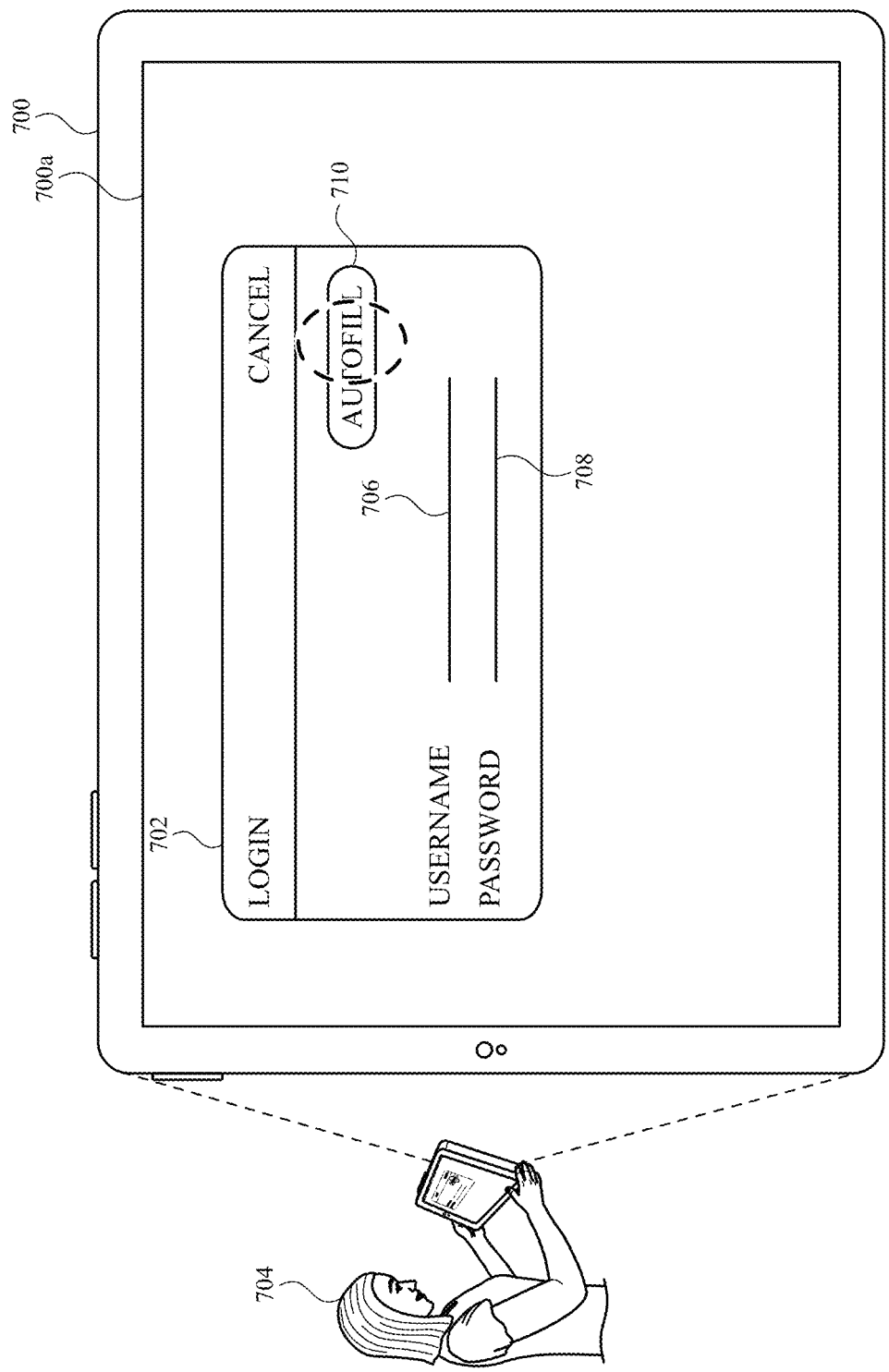
FIGS. 7A-7N illustrate example techniques for authorizing a secure operation, in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

Figure 6B:
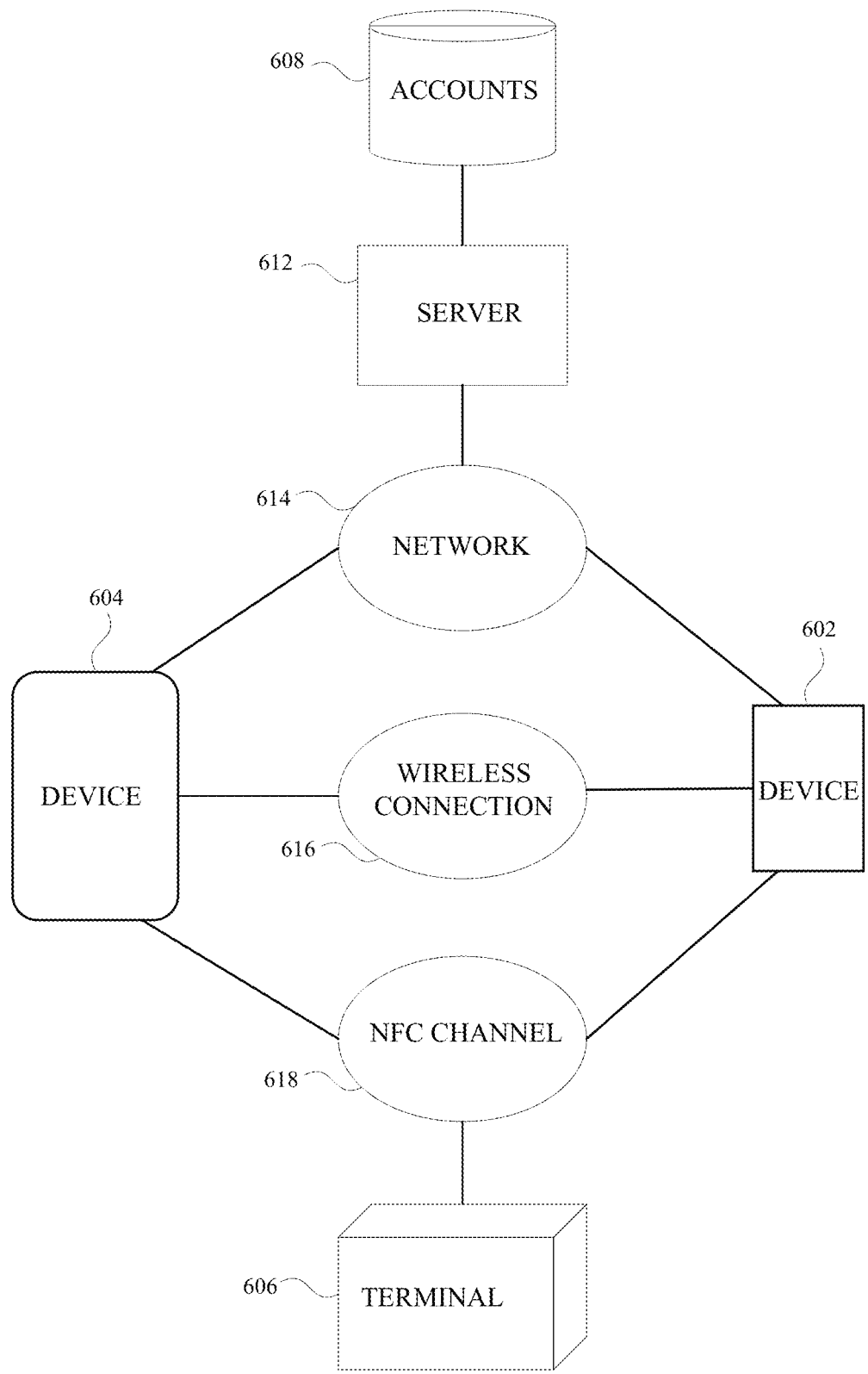
FIG. 6B illustrates exemplary devices connected via one or more communication channels, in accordance with some embodiments.

FIG. 6B illustrates exemplary devices connected via one or more communication channels to participate in a transaction in accordance with some embodiments. One or more exemplary electronic devices (e.g., devices 602 and 604) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 602 and 604) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 602 and 604), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 602 and 604 facilitates transactions (e.g., generally or specific transactions). For example, a first electronic device (e.g., 602) can serve as a provisioning or managing device, and can send notifications of new or updated payment account data (e.g., information for a new account, updated information for an existing account, and/or an alert pertaining to an existing account) to a second electronic device (e.g., 604). In another example, a first electronic device (e.g., 602) can send data to a second election device, wherein the data reflects information about payment transactions facilitated at the first electronic device. The information optionally includes one or more of: a payment amount, an account used, a time of purchase, and whether a default account was changed. The second device (e.g., 604) optionally uses such information to update a default payment account (e.g., based on a learning algorithm or explicit user input).

Electronic devices (e.g., 602, 604) are configured to communicate with each other over any of a variety of networks. For example, the devices communicate using a Bluetooth connection 616 (e.g., which includes a traditional Bluetooth connection or a Bluetooth Low Energy connection) or using a WiFi network 614. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 602, 604) is used to communicate with a point-of-sale (POS) payment terminal 606, which is optionally NFC-enabled. The communication optionally occurs using a variety of communication channels and/or technologies. In some embodiments, electronic device (e.g., 602, 604) communicates with payment terminal 606 using an NFC channel 618. In some embodiments, payment terminal 606 communicates with an electronic device (e.g., 602, 604) using a peer-to-peer NFC mode. Electronic device (e.g., 602, 604) is optionally configured transmit a signal to payment terminal 606 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 602, 604) to respond as a contactless payment card, such as an NFC-enabled contactless payment card, and then transmitting credentials of the account via NFC, such as to payment terminal 606. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 602, 604). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 606) is established within a defined time period from detection of the input, the secure element releases payment information to be transmitted to the other device (e.g., payment terminal 606). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 604) and a phone (e.g., device 602). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 602) and detection of a mechanical input (e.g., button press) on another device (e.g., device 604).

Payment terminal 606 optionally uses the payment information to generate a signal to transmit to a payment server 612 to determine whether the payment is authorized. Payment server 612 optionally includes any device or system configured to receive payment information associated with a payment account and to determine whether a proposed purchase is authorized. In some embodiments, payment server 612 includes a server of an issuing bank. Payment terminal 606 communicates with payment server 612 directly or indirectly via one or more other devices or systems (e.g., a server of an acquiring bank and/or a server of a card network).

Payment server 612 optionally uses at least some of the payment information to identify a user account from among a database of user accounts (e.g., 608). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 612) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 612 responds to POS payment terminal 606 with an indication as to whether a proposed purchase is authorized or denied. In some embodiments, POS payment terminal 606 transmits a signal to the electronic device (e.g., 602, 604) to identify the result. For example, POS payment terminal 606 sends a receipt to the electronic device (e.g., 602, 604) when a purchase is authorized (e.g., via a transaction-coordination server that manages a transaction app on the user device). In some instances, POS payment terminal 606 presents an output (e.g., a visual or audio output) indicative of the result. Payment can be sent to a merchant as part of the authorization process or can be subsequently sent.

In some embodiments, the electronic device (e.g., 602, 604) participates in a transaction that is completed without involvement of POS payment terminal 606. For example, upon detecting that a mechanical input has been received, a secure element in the electronic device (e.g., 602, 604) releases payment information to allow an application on the electronic device to access the information (e.g., and to transmit the information to a server associated with the application).

In some embodiments, the electronic device (e.g., 602, 604) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 602 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as a portable multifunction device or a head-mounted device, in communication with a display generation component, one or more input devices, and (optionally) a biometric sensor.

FIGS. 7A-7N illustrate examples of authorizing a secure operation. FIG. 8 is a flow diagram of an exemplary method 800 for facilitating user consent for a secure operation. FIG. 9 is a flow diagram of an exemplary method 900 for authentication continuity for a secure operation. FIG. 10 is a flow diagram of an exemplary method 1000 for authorizing a secure operation via an accessibility interface. The user interfaces in FIGS. 7A-7N are used to illustrate the processes described below, including the processes in FIGS. 8, 9, and 10.

FIG. 7A illustrates electronic device 700, including display 700a. At FIG. 7A, user 704 is interacting with electronic device 700. Electronic device 700 may correspond to a tablet device, a wearable device (e.g., a head-mounted display), a smart phone, and/or a smart watch. In addition, display 700a may include or be coupled to a display generation component (e.g., a display controller, a touch-sensitive display system, a display (e.g., integrated and/or connected), a 3D display, a transparent display, a projector, and/or a heads-up display). Electronic device 700 displays one or more interface objects, such as display login user interface 702, on display 700a. In some embodiments, login user interface 702 corresponds to a virtual interface object within an XR environment. Login user interface 702 optionally includes various displayed fields, such as username field 706 and a password field 708. Login user interface 702 also optionally includes affordance 710 for initiating a process for a secure operation, such as the authorization of the various displayed fields (e.g., an "autofill"). In some embodiments, the secure operation corresponds to payment such as, for example, providing payment information to a third party service in order to purchase an item, such as providing credit card information to an e-commerce website to purchase shoes (as described in more detail with respect to FIG. 7N). In some embodiments, the secure operation corresponds to providing access credentials for accessing an application. For example, the secure operation provides access credentials to an application associated with a third party service (e.g., a stock trading application) that requires user authentication prior to accessing the application. In some embodiments, electronic device 700 enables user 704 to manually enter (e.g., using a displayed keyboard and/or using voice commands) information into fields 706 and/or 708.

In some embodiments, as shown in FIG. 7A, electronic device 700 detects selection of affordance 710 by user 704 in order to initiate the autofill function to automatically populate information into fields 706 and/or 708. For example, display 700a is a touch sensitive display, such that electronic device 700 detects a touch input (e.g., tap or tap and hold) on affordance 710. In some embodiments, when device 700 is implemented in an XR environment, electronic device 700 optionally detects selection of affordance 710 using a controller communicatively coupled to electronic device 700. In addition, electronic device 700 detects selection of affordance 710 using gaze, for example, by detecting user 704 looking at affordance 710 for a predetermined period of time, and/or (optionally) while detecting one or more gestures. For example, electronic device 700 optionally corresponds to a head-mounted display, such that electronic device 700 detects user 704 performing one or more gestures to activate affordance 710, such as an air gesture. Electronic device 700 optionally displays additional/other elements on display 700a, such as additional user interfaces (e.g., an e-mail application), representations of other users (e.g., via a video call, another user's avatar in an XR environment), and/or a representation of a physical environment, such as the physical environment of user 704.

Figure 7B:
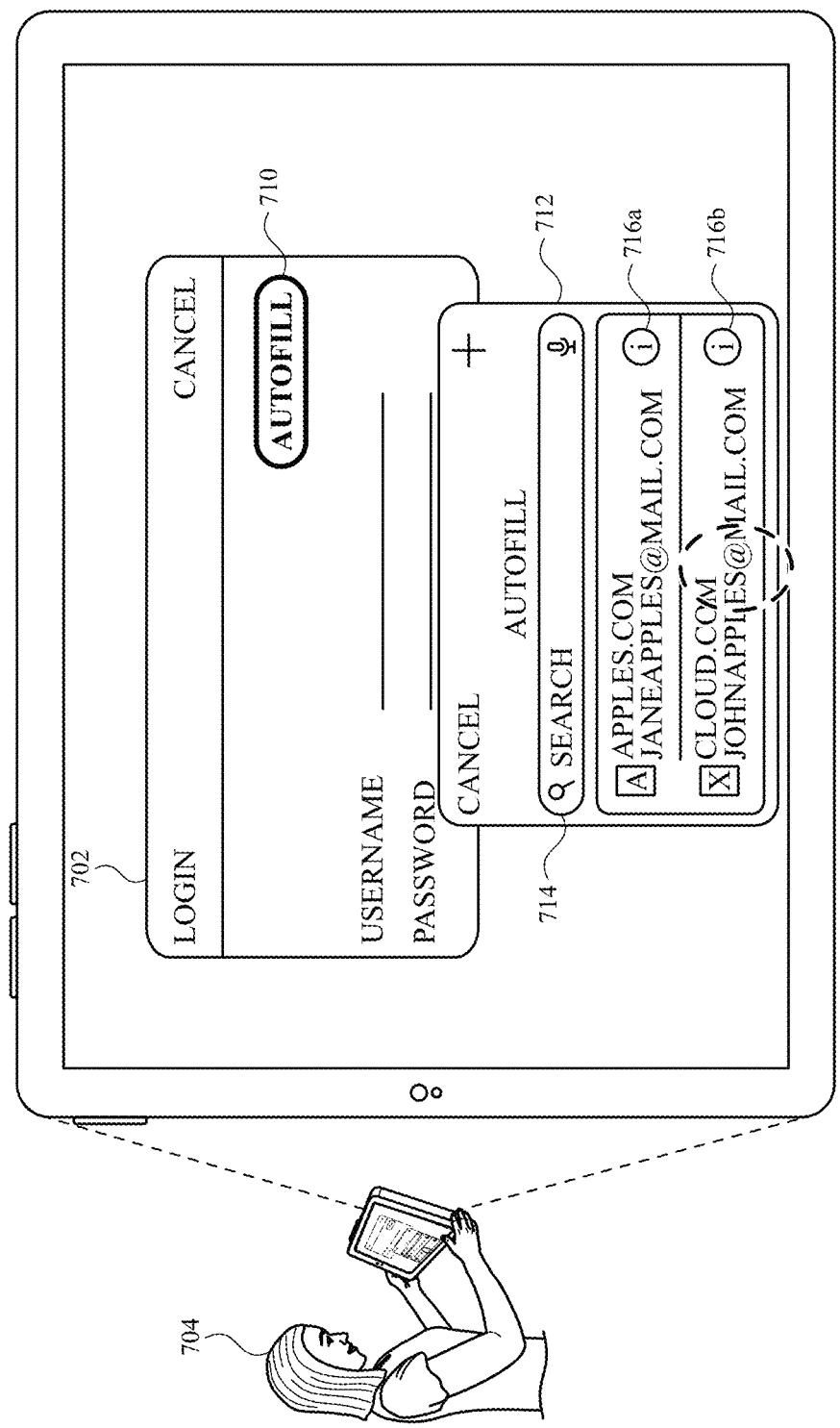

At FIG. 7B, in response to activation of affordance 710, electronic device 700 displays an authorization interface 712. In some embodiments, authorization interface 712 corresponds to a displayed virtual interface object within an XR environment. Authorization interface 712 includes search function 714 and one or more credential options 716a and 716b. Credential option 716a is associated with (e.g., used to select) information for logging into a website "abc.com," such as a username "janeapples@mail.com," for example. In some embodiments, electronic device 700 detects selection of a credential option, such as credential option 716b (as depicted in FIG. 7B). Credential option 716b is associated with information for logging into a website "xyz.com," such as a username "janeapples@mail.com," for example. In some embodiments, the credential options are associated with a respective password, which may be displayed, or alternatively, may not be displayed as part of authorization interface 712 to preserve privacy. In some embodiments, electronic device 700 receives information (e.g., text and/or audio), via search function 714, and, in response, displays one or more retrieved result options corresponding to the received information for use with the autofill function.

In some embodiments, various requirements (a set of one or more criteria), including a visibility criterion and/or a user authentication criterion, must be satisfied for electronic device 700 to enable user authorization of a secure operation. For example, the visibility criterion is met when a threshold amount of one or more interface objects, such as login user interface 702 and/or authorization interface 712, is visible from a viewpoint of user 704 (e.g., the threshold amount may correspond to any portion of the interface object, a non-zero amount of the interface object, or the entire interface object). In addition, the user authentication criterion is met when electronic device 700 receives a request to perform the secure operation. For example, electronic device 700 detects selection of a respective displayed credential option, such as credential option 716b (as shown in FIG. 7B), by user 704. Once a credential option is selected, user 704 may then provide an input to authorize performance of the secure operation (e.g., a double press of a hardware button), as discussed in more detail with respect to FIG. 7D. In accordance with a determination that the input to authorize performance of the secure operation is receive, electronic device 700 causes the respective credential option to be used to automatically populate respective credential information into the displayed fields, such as username field 706 and a password field 708, subject to the set of one or more criteria being satisfied. At FIG. 7B, electronic device 700 receives selection of credential option 716b.

Figure 7C:
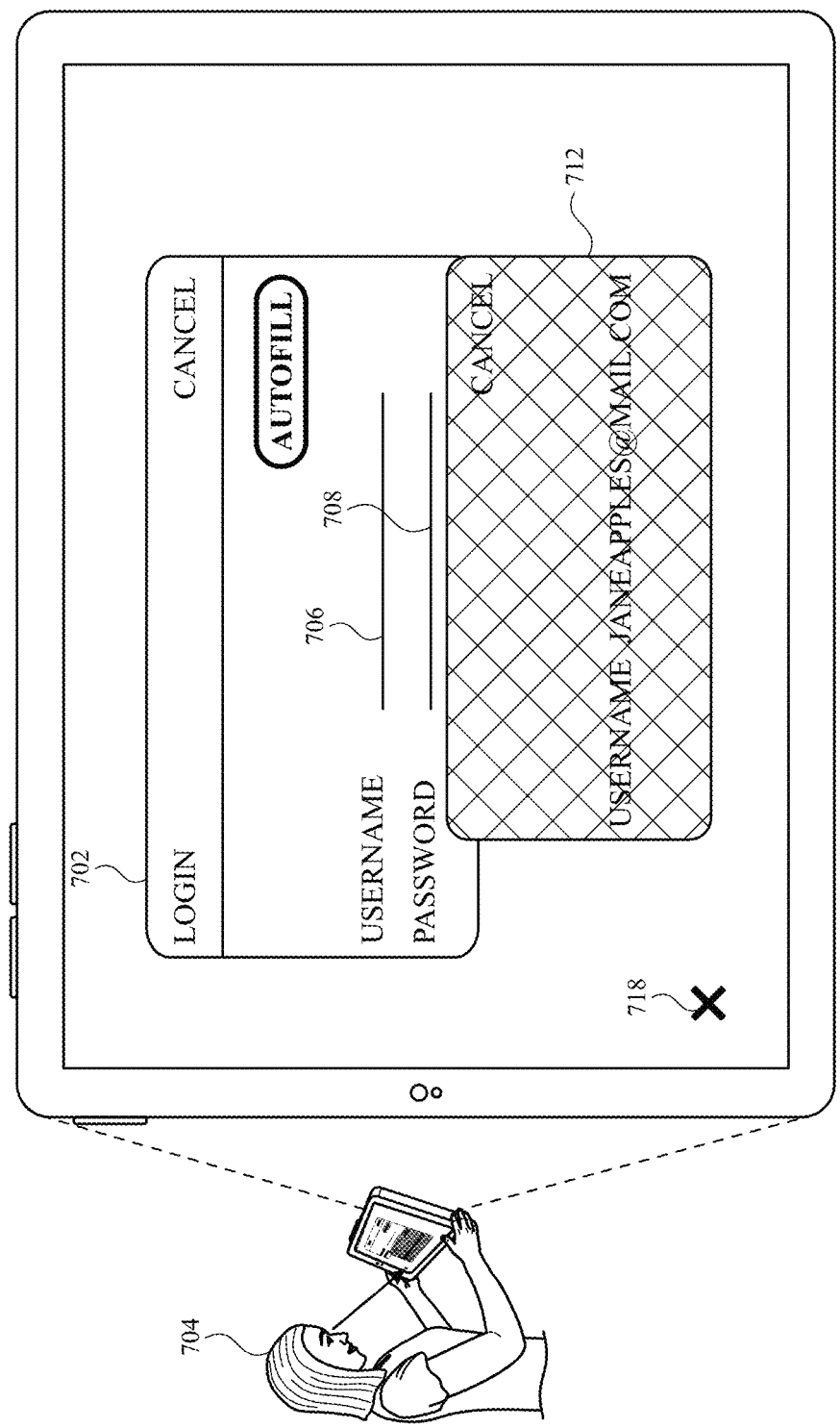

At FIG. 7C, in response to receiving selection of credential option 716b, electronic device 700 updates authorization interface, as shown in FIG. 7C. At FIG. 7C, electronic device 700 detects a user gaze direction 718, associated with (e.g., corresponding to) user 704's gaze direction. Generally, user gaze direction 718 is not part of the displayed user interface of electronic device 700 and is provided to aid the discussion of the technique. During user 704's interaction with device 700, electronic device 700 detects a change in the viewpoint of user 704 based on a change in the user gaze direction 718 (e.g., from a first viewpoint to a second viewpoint that is different from the first viewpoint). In some embodiments, the user gaze direction is detected within the context of an XR environment (e.g., via a head-mounted display). User gaze direction 718 optionally indicatives that user 704's gaze is not directed towards login user interface 702 or authorization interface 712. Accordingly, electronic device 700 determines that login user interface 702 and authorization interface 712 are not sufficiently visible from the viewpoint of user 704. For instance, user gaze direction 718 may be directed to a portion of display 700*a* that is not in close proximity to the displayed locations of login user interface 702 and authorization interface 712. In some embodiments, any portion of login user interface 702 or authorization interface 712 that is within a predefined distance (e.g., a predefined number of pixels and/or a predefined length) from the center of user gaze direction 718 is determined to be visible from the viewpoint of user 704. For example, 10% of authorization interface 712 may be determined to be within the predefined distance from the center of user gaze direction 718, and 5% of login user interface 702 is determined to be within the predefined distance from the center of user gaze direction 718. In this example, electronic device 700 determines that less than a threshold amount (e.g., a 75% threshold amount or a 90% threshold amount) of login user interface 702 and/or authorization interface 712 is visible from the viewpoint of the user.

At FIG. 7C, in accordance with a determination that less than a threshold amount of login user interface 702 and/or authorization interface 712 is visible from the viewpoint of the user, electronic device 700 disables and/or forgoes enabling user authorization of the autofill function. In some embodiments, electronic device 700 modifies the appearance of one or more interface objects to indicate that the user cannot request to perform the secure operation (e.g., by graying authorization interface 712). For example, in response to detecting selection of credential option 716*b* and while login user interface 702 and authorization interface 712 are not sufficiently visible from the viewpoint of user 704 (e.g., based at least on user gaze direction 718), electronic device 700 does not automatic populate username field 706 and password field 708.

Figure 7D:
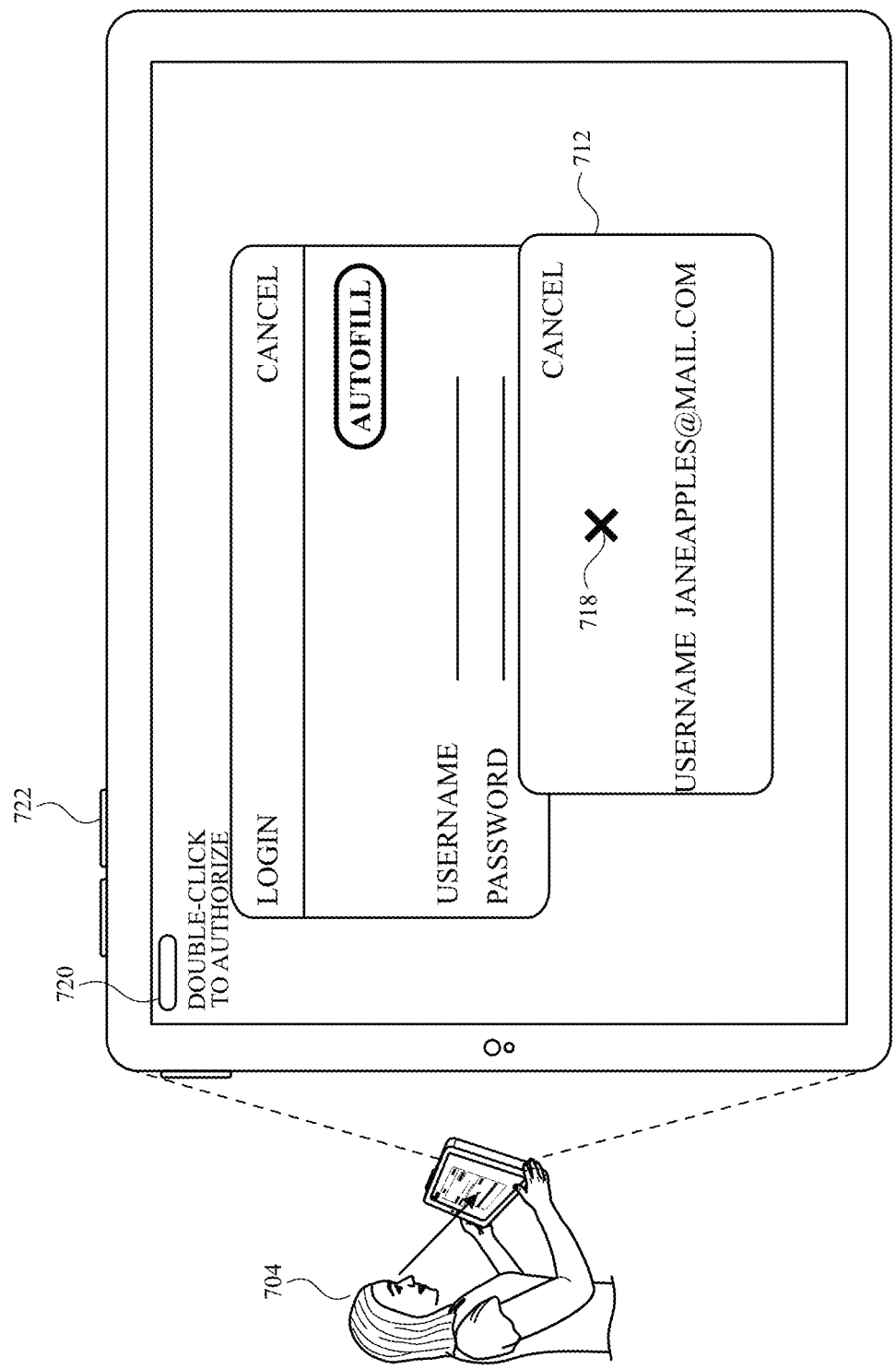

At FIG. 7D, electronic device 700 determines that user 704 is authorized to perform the secure operation, and thus user authorization of the autofill function is enabled. In some examples, user authorization of the secure operation is enabled subject to a determination that user 704 is authorized to perform the secure operation. For instance, electronic device 700 determines that user 704 is authorized to perform the secure operation based on a gaze criterion or other biometric criterion. The gaze criterion is optionally satisfied when user 704 is gazing at a respective interface object, such as login user interface 702 and/or authorization interface 712. Login user interface 702 and/or authorization interface 712 are optionally displayed in a center portion of display 700*a*. In some embodiments, electronic device 700 determines that user 704 is not authorized to perform the secure operation when the user is not gazing at login user interface 702 and/or authorization interface 712 (e.g., the user's eyes are closed or the user is looking at a corner of display 700*a* (away from the interfaces 702 and/or 712)). In some embodiments, user authorization of the secure operation is enabled subject to a determination that the user has or is providing particular movement of a biometric feature. For instance, the particular movements include the user gazing at a particular portion of login user interface 702 (e.g., gazing at affordance 710) or authorization interface 712 (e.g., a specific credential option), the user providing a specific facial rotation, and/or the user moving a finger along a particular path.

In general, electronic device 700 operates in various modes. For instance, electronic device 700 optionally operates in a first mode (as described with respect to FIG. 7D), such as a standard mode with accessibility features not enabled and/or a mode permitting secure operations to be authorized with a default physical input mechanism, such as hardware button 722. In some embodiments, device 700 optionally operates in a second mode, such as an accessibility mode and/or a mode in which an input at the physical input mechanism is not required to authorize a secure operation (described in more detail with respect to FIGS. 7L-7M). Returning to FIG. 7D, in accordance with a determination that a least a threshold amount of login user interface 702 and/or authorization interface 712 is visible from the viewpoint of user 704, electronic device 700 enables user authorization of the autofill function. For example, user gaze direction 718 may be directed towards authorization interface 712. Accordingly, the subject of the user's gaze is determined to be authorization interface 712, resulting in a determination that 95% or 100% of the authorization interface 712 is visible from the viewpoint of user 704. As a result, electronic device 700 determines that at least a threshold amount (e.g., a 75% threshold amount or a 90% threshold amount) of login user interface 702 and/or authorization interface 712 is visible from the viewpoint of the user. In some embodiments, electronic device 700 then enables user authorization of the secure operation and indicates to the user via indication 720 that user authorization of the secure operation is enabled, including an indicator with text "Double-click to authorize." In particular, indication 720 informs the user that a double-press activation of a hardware button, such as hardware button 722, will authorize the autofill function. In some embodiments, user authorization of the autofill function remains enabled for a period of time after the determination that login user interface 702 and/or authorization interface 712 is visible from the viewpoint of the user (e.g., one second after, three seconds after, etc.) and optionally becomes disabled after the period of time. In some embodiments, device 700 visually indicates (e.g., by un-graying the authorization interface 712 and/or a portion of the authorization interface 712, such as a button) that the viewpoint includes the authorization interface 712 and, therefore, the respective authorization is enabled.

Once authorization of the autofill function is enabled, user 704 may then proceed with authorizing the secure operation. In particular, electronic device 700 optionally modifies the appearance of one or more interface objects and/or displays one or more additional interface objects to indicate to the user that the user can request to perform the secure operation. For instance, where electronic device 700 is implemented in an XR environment, electronic device 700 displays an indication, such as directions to perform one or more air gestures (e.g., an instruction to move one or more hands or fingers in a specific motion) and/or to perform one or more inputs on a controller compatible with the XR environment.

At FIG. 7D, electronic device 700 receives user authorization of the autofill function via a double-click of hardware button 722. In response to receiving the user authorization of the autofill function, a determination is optionally made as to whether a set of one or more performance criteria are satisfied. For instance, visibility may be required to be satisfied prior, at the time of, and/or after receiving the user authorization request to perform the secure operation. In some embodiments, the one or more performance criteria optionally also includes a requirement that a least a threshold amount of login user interface 702 and/or authorization interface 712 is visible from the viewpoint of user 704 once user 704 requests to perform the secure operation. In some embodiments, the set of one or more performance criteria includes a user authentication criterion that is met when the user is authenticated (e.g., via password and/or biometric authentication). As discussed in more detail with respect to FIG. 7F, for example, the criterion optionally includes a positive indication of a first level (e.g., complete or high-fidelity) iris features verification, a positive indication of continuous (e.g., a second level) iris features verification since user 704 began interacting with device 700, and/or a positive indication of correct passcode authentication. As a result, in accordance with the determination that the set of one or more performance criteria are satisfied upon receiving the request to perform the secure operation, electronic device 700 initiates performance of the secure operation.

Figure 7E:
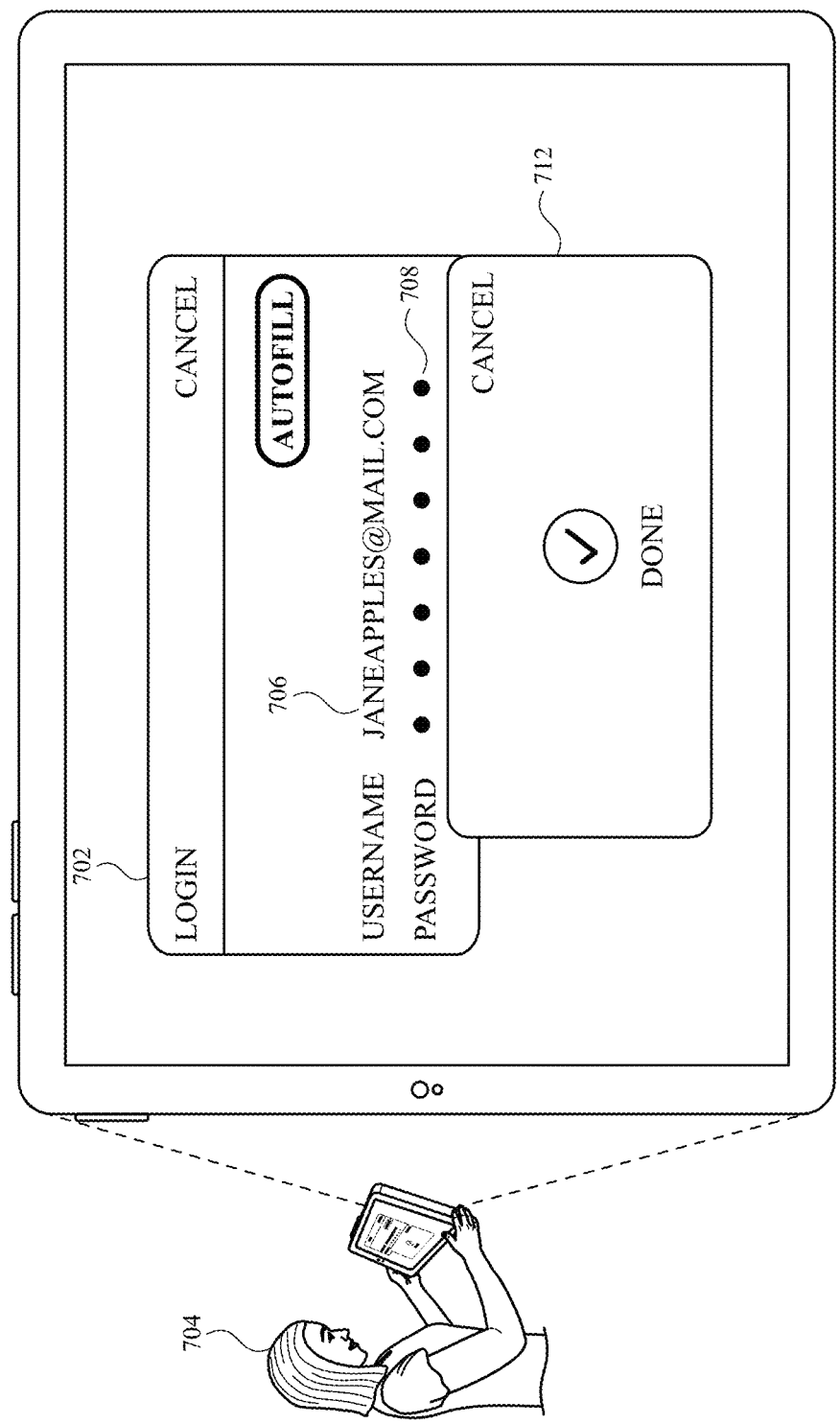

At FIG. 7E, electronic device 700 provides an indication to user 704 that user authorization of the autofill function was successful. In particular, electronic device 700 modifies (or otherwise replaced with an additional interface) authorization interface 712 to include a positive indication that user authorization of the autofill function was successful (e.g., a "check" mark next to text "Done"). In addition, electronic device 700 updates login user interface 702 to indicate that that user authorization of the autofill function was successful by updating username field 706 to include the username for the username corresponding to the selected credential option and updating password field 708 to include redacted characters for the password corresponding to selected credential option. In some embodiments, electronic device 700 updates password field 708 to include unredacted and readable characters for the password corresponding to the selected credential option.

Figure 7F:
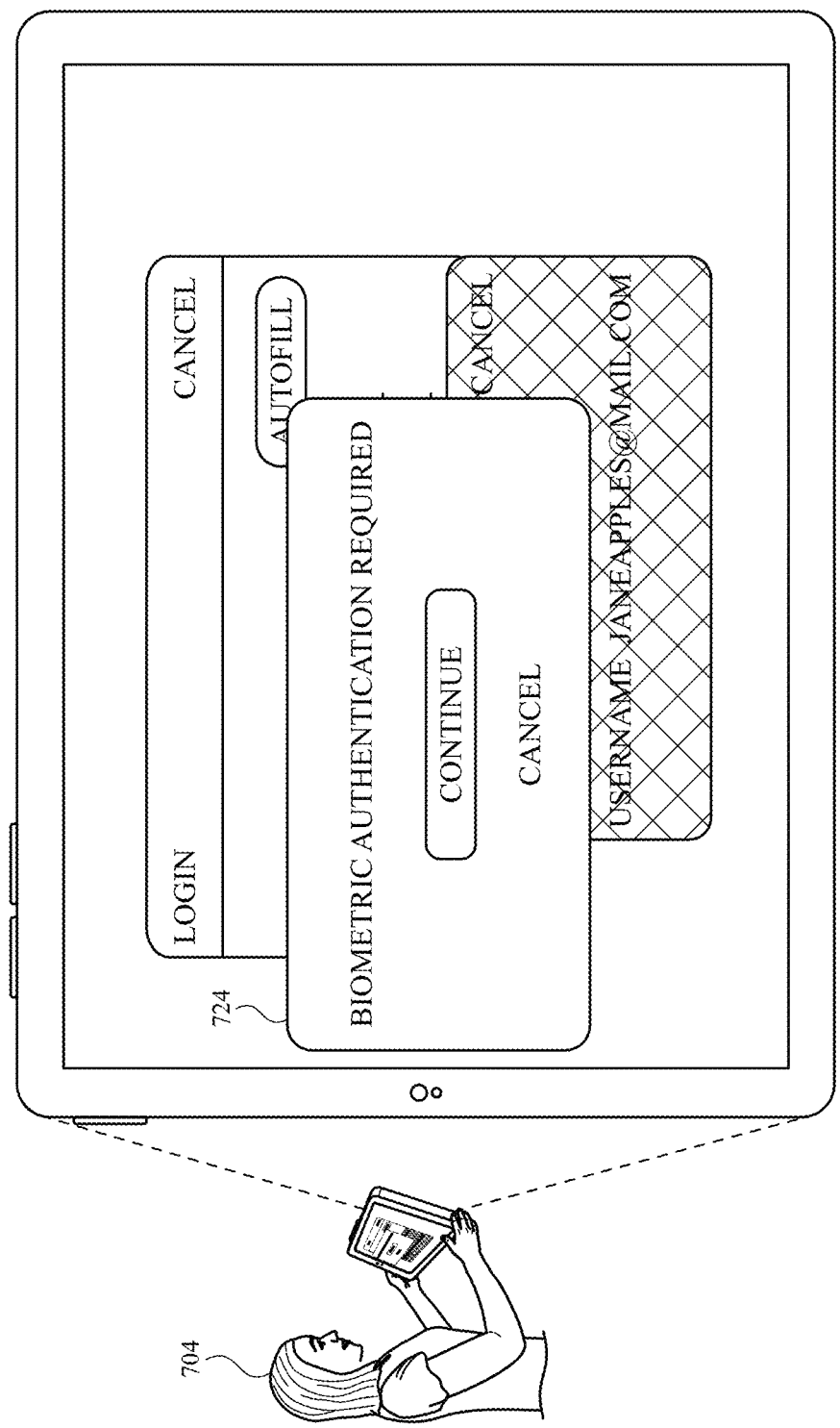

At FIG. 7F, a user authentication process is depicted. In particular, continuing from FIG. 7D, in response to receiving the request to perform the secure operation, a determination is made as to whether user 704 met a user authentication criteria in order to perform the secure operation. In some embodiments, a determination is made that the set of performance criteria is not satisfied. In general, at a first time (e.g., an initial time of device interaction), a first type of biometric authentication is performed, such that electronic device 700 biometrically authenticates user 704 using one or more biometric sensors of device 700. The first time may correspond to an initial time when the user first activates electronic device 700 and/or when the user wears electronic device 700 on a part of the user's body. In embodiments where device 700 corresponds to a head-mounted display, the first time may correspond to a time when user 704 affixes/wears electronic device 700 to/on user 704's head. The first type of biometric authentication may include a first level (e.g., complete or high-fidelity) iris features verification. The first level iris features verification includes a retinal scan in order to obtain one or more images and/or measurements of at least one eye of user 704. In some embodiments, the iris features will be different for different users. The one or more images and/or measurements are then compared to one or more stored images and/or measurements corresponding to an enrolled retinal scan of the user in order to determine a match and/or degree of similarity between the obtained image(s)/measurements and the enrolled image(s)/measurements. To the extent the obtained image(s)/measurements match the enrolled image(s) to a sufficient degree of similarity (e.g., 95% or 99% similarity), electronic device 700 determines that user 704 is authenticated. In some embodiments, the first type of biometric authentication optionally includes (in addition to or instead of an iris features verification), a fingerprint verification, a facial recognition verification, and/or a voiceprint verification.

The user authentication criterion used to determine whether to perform the secure operation is optionally based on sensor measurements taken during a specific timeframe, and specifically, at a plurality of intermediate times after the initial time when user 704 begins interacting with electronic device 700 and/or after user 704 wears electronic device 700. The sensor measurements optionally correspond to measurements taken to detect whether a same user (e.g., user 704) is using device 700 throughout the duration of the interaction. For instance, in embodiments where electronic device 700 corresponds to a head-mounted display, electronic device 700 optionally authenticates user 704 via the first type of biometric authentication (e.g., complete or high-fidelity) when user 704 attaches/wears electronic device 700 to/on user 704's head. Once successfully authenticated via the first type of biometric authentication, electronic device 700 repeatedly takes sensor measurements using a second type of biometric authentication. In some embodiments, the first type of biometric authentication corresponds to a high-fidelity biometric verification, such that electronic device 700 analyzes characteristics associated with user 704's whole eye, or portion of user 704's eye, such as iris features. In some embodiments, the second type of biometric authentication corresponds to one or more sensor measurements that confirm either directly or indirectly a continuity of presence of a biometric feature since a high-fidelity biometric verification was performed for the biometric feature. The second type of biometric authentication optionally analyzes the same (or a similar) amount of biometric characteristics as the first type of biometric authentication, or optionally analyzes fewer biometric characteristics as compared to the first type of biometric authentication. In some embodiments, the second type of biometric authentication may be referred to as a continuity verification since, in some embodiments, the second type of biometric authentication is used to verify that the user authenticated using the first type of biometric authentication has continued to be the user of electronic device 700 since the first type of biometric authentication was performed (e.g., without a break in the continuity of use of the biometric feature).

In some embodiments, while electronic device 700 operates in the first mode (e.g., a standard mode with accessibility features not enabled and/or a mode permitting secure operations to be authorized with a default physical input mechanism), both the first type and second type of biometric authentication are enabled. In some embodiments, while electronic device 700 operates in the second mode (e.g., an accessibility mode and/or a mode in which an input at the physical input mechanism is not required to authorize a secure operation), the first type of biometric authentication is enabled and the second type of biometric authentication is disabled. Thus, in some embodiments, while operating in the second mode (as explained in more detail with respect to FIGS. 7L and 7M), the first type of biometric authentication (e.g., complete or high-fidelity) is optionally required in response to receiving the request to perform the secure operation.

In some embodiments, at least one (e.g., the same or different) biometric sensor is used for performing both the first type of biometric authentication and the second type of biometric authentication (e.g., a retinal scanner, a depth camera, and/or a proximity sensor).

For example, the second type of biometric authentication optionally focuses on detecting features and characteristics of the user 704's pupil, eye glints, iris features (e.g., shape, size, and/or color patterns), and the like. In particular, electronic device 700 captures information about the appearance of a user's eye and records information regarding the detected pupil, eye glints, and/or iris features. At a subsequent time (e.g., one second later, two seconds later), electronic device 700 again captures information about the appearance of the user's eye and stores information regarding the detected pupil, eye glints, and/or iris features. A comparison is made between the information recorded at the first time and the information recorded at the second time to confirm whether the same user (e.g., user 704) was using the device at both times. For instance, to the extent the first detected pupil, eye glints, and/or iris features match (e.g., completely and/or to a sufficient degree of confidence) the second detected pupil, eye glints, and/or iris features, electronic device 700 determines that the same user was using the device at both times, and thus the respective criteria remains satisfied. The process may repeat until a specific time, such as when the user provides the request to perform the secure operation. At this specific time, if there were any determinations (since the first type of biometric authentication) that the same user was not using the device at any given time (e.g., first detected information did not match second detected information), the respective criteria is determined not to be met, which results in forgoing performing the secure operation (e.g., until further authentication is performed). For instance, sensor measurements indicating that no presence of eye, iris features, pupil, and/or eye glints was detected would cause the respective criteria to be determined as not met. Lack of presence of eye features may be based on the user's eyes being closed or the user's eyes otherwise being undetectable from the sensors (e.g., a head-mounted display is fitted improperly). For example, in embodiments where electronic device 700 corresponds to a head-mounted display, the user may have taken off the head mounted display. In embodiments where electronic device 700 corresponds to a tablet device or a smartphone device, user 704 may be holding device 700 such that user 704's eyes are not within the range of the sensors field of view (e.g., electronic device 700 is resting upside down on a surface). In other words, the respective criteria optionally includes an "eyes open" criterion that is satisfied when at least one eye of user 704 does not remain continuously closed for more than a threshold period of time (e.g., a non-zero period of time, such as one second or two seconds).

In some embodiments, the first type of biometric authentication is based on a biometric feature that is different from the second type of biometric authentication. In particular, the first type of biometric authentication optionally corresponds to a full iris features verification, such that electronic device 700 analyzes characteristics associated with user 704's whole eye, or portion of user 704's eye, such as the pupil, eye glints, and/or iris features. The second type of biometric authentication may correspond to a partial facial recognition verification. The partial facial recognition optionally includes analyzing characteristics associated with portions of the user 704's face surrounding the eye (and excluding the eye), such as eyebrows, eyelids, skin surrounding eyes, forehead, cheeks, and/or nose. For instance, electronic device 700 captures the appearance of portions of user 704's face surrounding the eye. At a subsequent time (e.g., one second later or two seconds later), electronic device 700 again captures the appearance of the same portions of user 704's face surrounding the eye. Electronic device 699 compares the information recorded at the first time and the information recorded at the second time in order to confirm whether the same user (e.g., user 704) was using the device at both times. For instance, to the extent the first detected eyebrows, eyelids, skin surrounding eyes, forehead, cheeks, and/or nose match (e.g., fully or to a sufficient degree of confidence) the second detected eyebrows, eyelids, skin surrounding eyes, forehead, cheeks, and/or nose, a determination is made that the same user was using the device at both times, and thus the respective criteria remains satisfied. The process may repeat until a specific time, such as when electronic device 700 receives a request from the user to perform the secure operation. At this specific time, if there were any determinations that the same user was not using the device since the first type of authentication (e.g., first detected information did not match second detected information), the respective criteria is determined not to be met, which results in electronic device 700 forgoing performing the secure operation (e.g., until further authentication is performed). In other words, the respective criteria optionally includes non-eye criteria that can be satisfied even when user 704's eyes are not detectable (e.g., not detectable for a threshold period of time, such as 1, 5, 10, 15, or 60 seconds).

In some embodiments, using a first biometric feature for the first type of biometric authentication and a different biometric feature for the second type of biometric authentication improves authentication. For instance, when analyzing eye characteristics for the first type of biometric authentication, and analyzing facial characteristics for the second type of biometric authentication, authentication is improved in instances where eye characteristics are not always available for analysis. In particular, user 704 is initially authenticated based on eye characteristics, although facial characteristics (e.g., eyebrows, eyelids, skin surrounding eyes, forehead, cheeks, and/or nose) are used for the second type of biometric authentication. In this case, under circumstances when user 704's eyes are undetectable by one or more sensors of electronic device 700, electronic device 700 can still detect the user's facial characteristics and thus can perform the second type of authentication to authorize performance of the secure operation.

Returning to FIG. 7F, in response to receiving the request to perform the secure operation, electronic device 700 determines whether user 704 meets respective authentication criteria in order to perform the secure operation. In some embodiments, user 704 has been biometrically authenticated at a first time, such that the request to perform the secure operation is received at a second time (after the first time). In this case, to the extent a determination is made that user 704 did not meet respective criteria between the first time and the second time, authentication guidance user interface 724 is provided to the user to biometrically authenticate user 704 using the first type of biometric authentication. In other words, when electronic device 700 is unable to verify that the same user was using the device since the initial first type of biometric authentication (or is able to verify that the same user was not using the device since the initial first type of biometric authentication), electronic device 700 again attempts to verify the identity of the user using the first type of biometric authentication. The failure to meet respective authentication criteria may be the result of a variety of factors. For example, user 704's eyes may be undetectable for period of time between the first time and the second time. In some embodiments, the initial authentication is based on a different type of biometric authentication (e.g., fingerprint authentication) or may be based on a non-biometric authentication (e.g., passcode entry). For certain initial authentications such as fingerprint or passcode authentications, the respective authentication criteria is optionally automatically not satisfied, such that user 704 will be required to provide the specific first type of biometric authentication (e.g., complete or high-fidelity iris features verification) in order to authorize the secure operation. In some embodiments, authentication guidance user interface 724 includes directions for performing the first type of biometric authentication, such as directions requesting the user to provide particular movements of a respective biometric feature. For example, authentication guidance user interface 724 may include an initial prompt such as "Biometric Authentication Required," with an option for the user to "Continue" and another option for the user to "Cancel." At FIG. 7F, electronic device 700 detects activation of the "Continue" option.

Figure 7G:
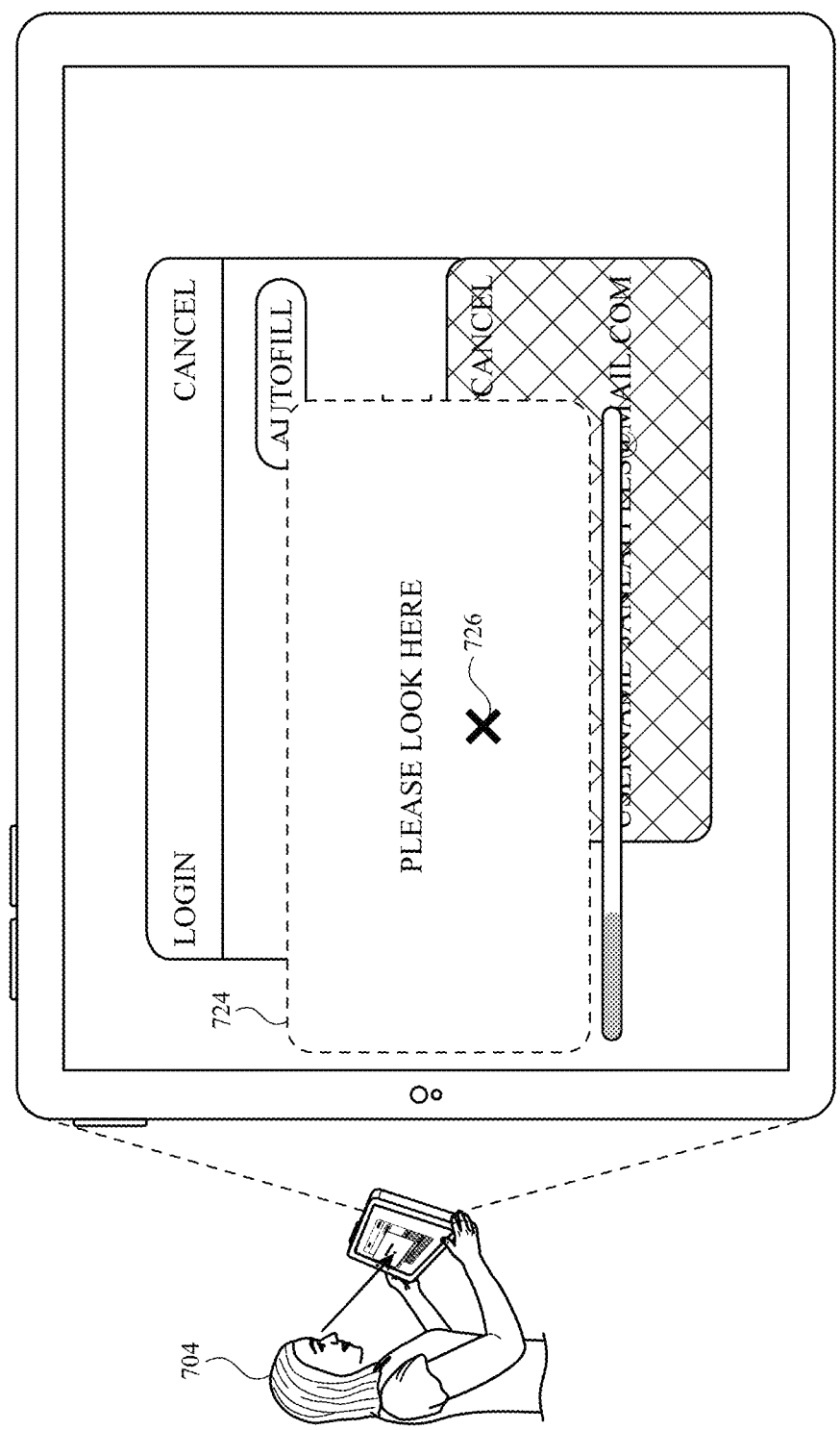

At FIG. 7G, in response to detecting activation of the "Continue" option, electronic device 700 initiates the first type of biometric authentication. When the first type of biometric authentication corresponds to an iris features verification, electronic device 700 instructs the user to look at various portions of the display when the biometric authentication begins (e.g., via prompt "Please look here."). During the first type of biometric authentication, electronic device 700 optionally analyzes gaze 726 corresponding to user 704 to obtain characteristics associated with user 704's whole eye, or portion of user 704's eye, such as the iris features, pupil, and/or glints. Where the first type of biometric authentication corresponds to facial verification, electronic device 700 instructs that user 704's face be rotated at a specific angle or angles. In some embodiments, where the first type of biometric authentication corresponds to fingerprint authentication, electronic device 700 instructs the user to move their finger along a specific path and/or touch their finger in a specific way on a touch-sensitive contact portion of device 700 or another device.

Figure 7H:
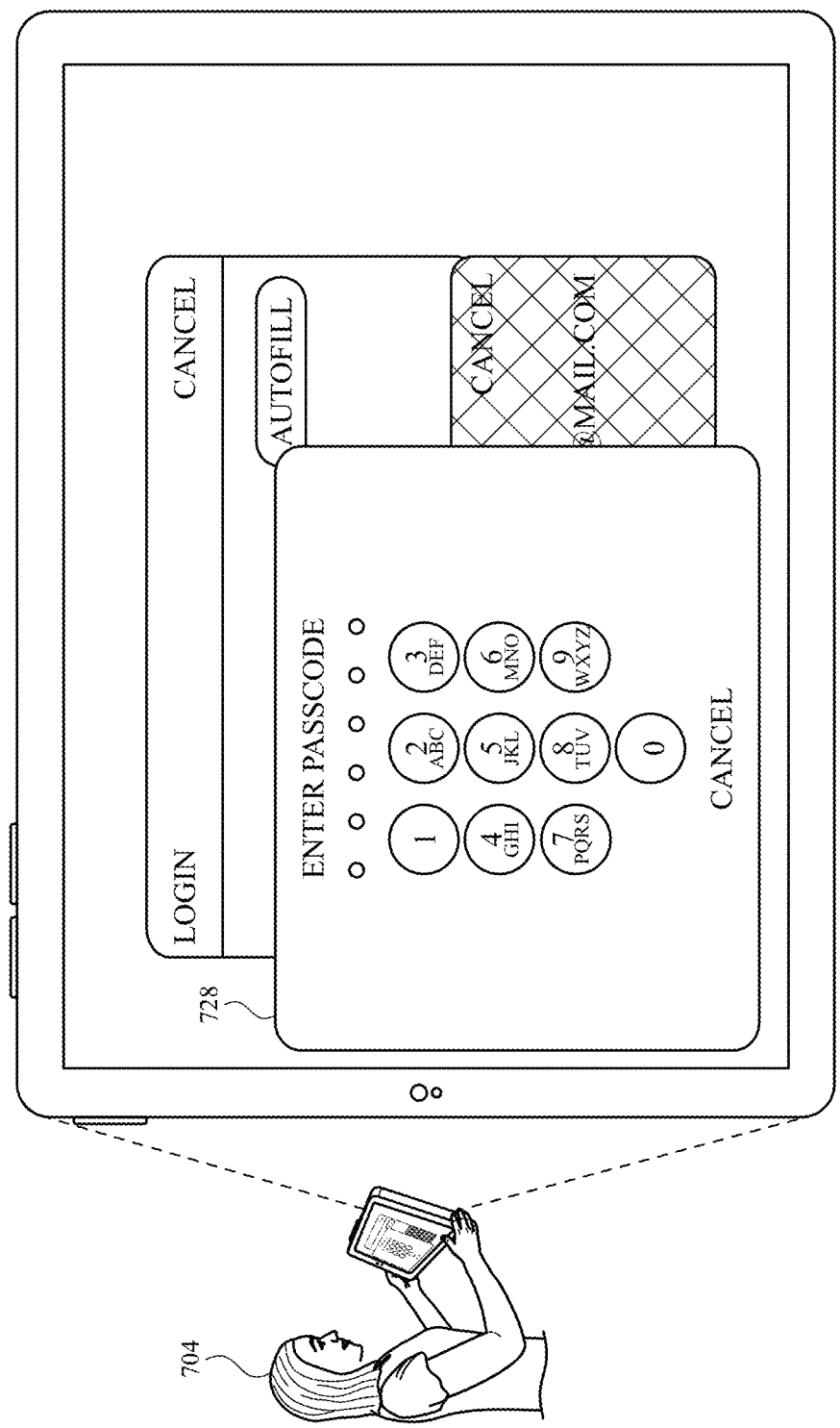

At FIG. 7H, a passcode entry prompt 728 is depicted. In some embodiments, the user authentication criterion is met when a passcode entry matches an enrolled passcode entered via passcode entry prompt 728. For instance, electronic device 700 is optionally configured such that user authentication (or user authentication for performing secure operations) is to occur via passcode or password (e.g., the user has disabled iris features verification, facial verification, and/or other types of biometric authentications). Alternatively, in accordance with a determination that the user authentication criterion is not met based on a failed first type of biometric authentication (e.g., device 700 was unable to successfully complete the first type of biometric authentication), electronic device 700 displays passcode entry prompt 728 to provide an additional attempt to meet the user authentication criterion. In some embodiments, a determination may be made that while the initial first type of biometric authentication was successful (e.g., the user successfully passed biometric authentication when first accessing the device), the second type of biometric authentication for detecting continuity may have failed (e.g., user 704's eyes were undetectable for a period of time after the initial time). In this case, electronic device 700 displays passcode entry prompt 728 to the user to attempt to authenticate the user.

In some embodiments, electronic device 700 first attempts to authenticate the user by means other than passcode verification, prior to attempting passcode verification, when continuity verification fails. For example, electronic device 700 attempts a first type of biometric authentication, such as complete or high-fidelity iris features verification (e.g., as shown in FIG. 7G), or attempts a different type of full or high fidelity biometric authentication, such as fingerprint authentication and/or facial recognition authentication. To the extent the full or high fidelity biometric authentication fails, the passcode verification is optionally used as a default option. In some embodiments, passcode entry prompt 728 includes a passcode entry portion and an affordance to decline passcode entry. To the extent the user selects the option to decline passcode entry, user authorization of the secure operation is forgone.

Figure 7I:
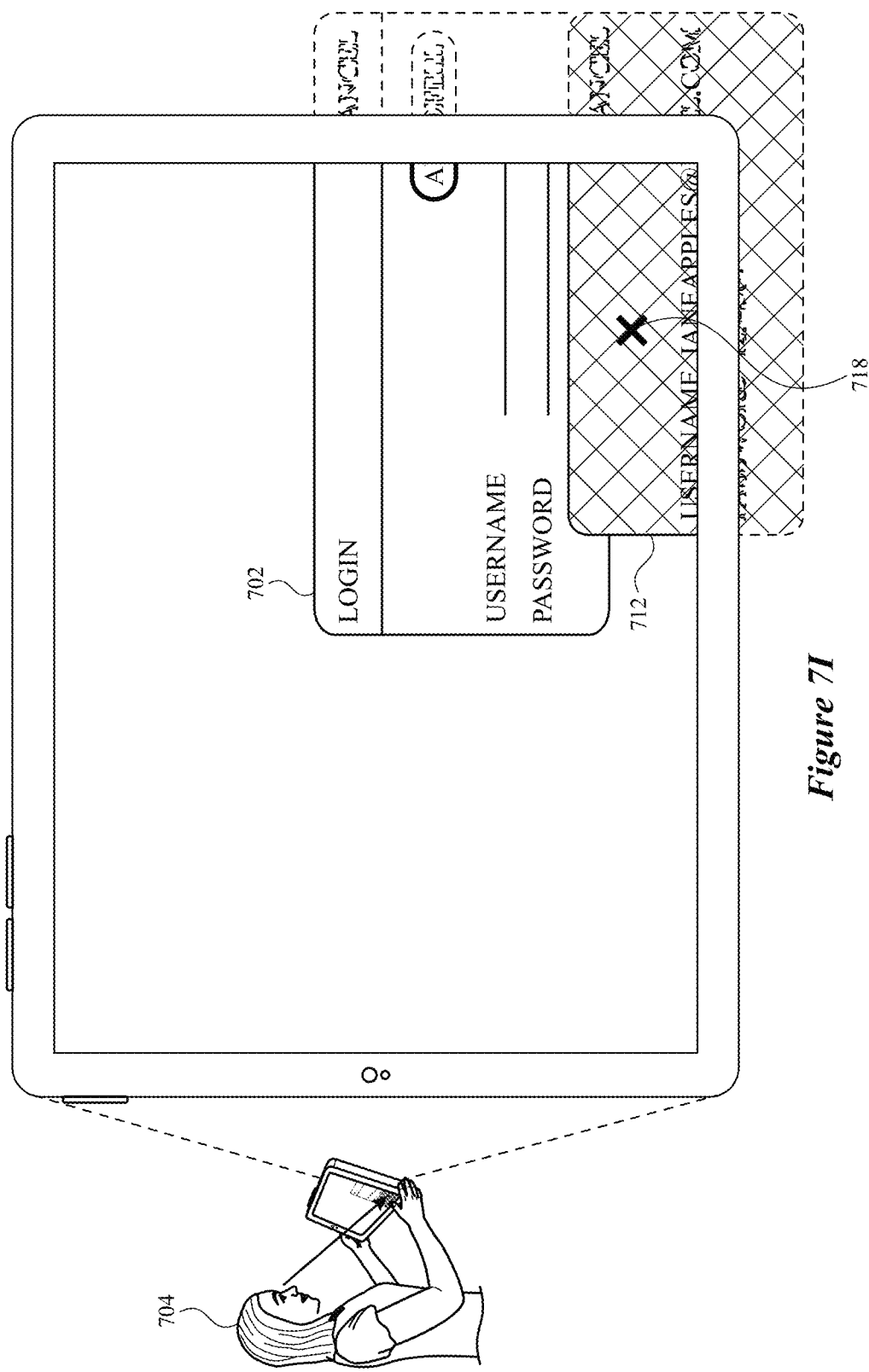

At FIG. 7I, continuing from FIG. 7D, a change in the viewpoint of user 704 is depicted. In general, the visible amount of an interface object may change based on a change in viewpoint of user 704. In some embodiments, at least a portion of login user interface 702 and authorization interface 712 are not be visible to user 704, for example, based on a portion of the login interface and a portion of the authorization interface not being fully displayed on display 700*a*. In some embodiments, where electronic device 700 is implemented in an XR environment, certain user motions optionally cause interface objects to become not visible or partially not visible. For instance, while wearing device 700 (e.g., a head-mounted display), the user turns their head in a specific direction. Login user interface 702 and authorization interface 712 are optionally environment-locked within the environment, such that interfaces remain in the same general location within the environment despite user head movements or other motions. Accordingly, at least a portion of an interface optionally becomes not visible to user 704 based on the interfaces being situated towards the side portion of user 704's field of view (or behind the user within the XR environment). Accordingly, based on user 704's movements, the visible amount of login user interface 702 and authorization interface 712 may be reduced. As a result, determination is made that less than the threshold amount of login user interface 702 and/or authorization interface 712 is visible from user 704's viewpoint. Based on the determination, electronic device 700 modifies the appearance of authorization interface 712 to, for example, indicate that user 704 cannot request to perform the secure operation.

Figure 7J:
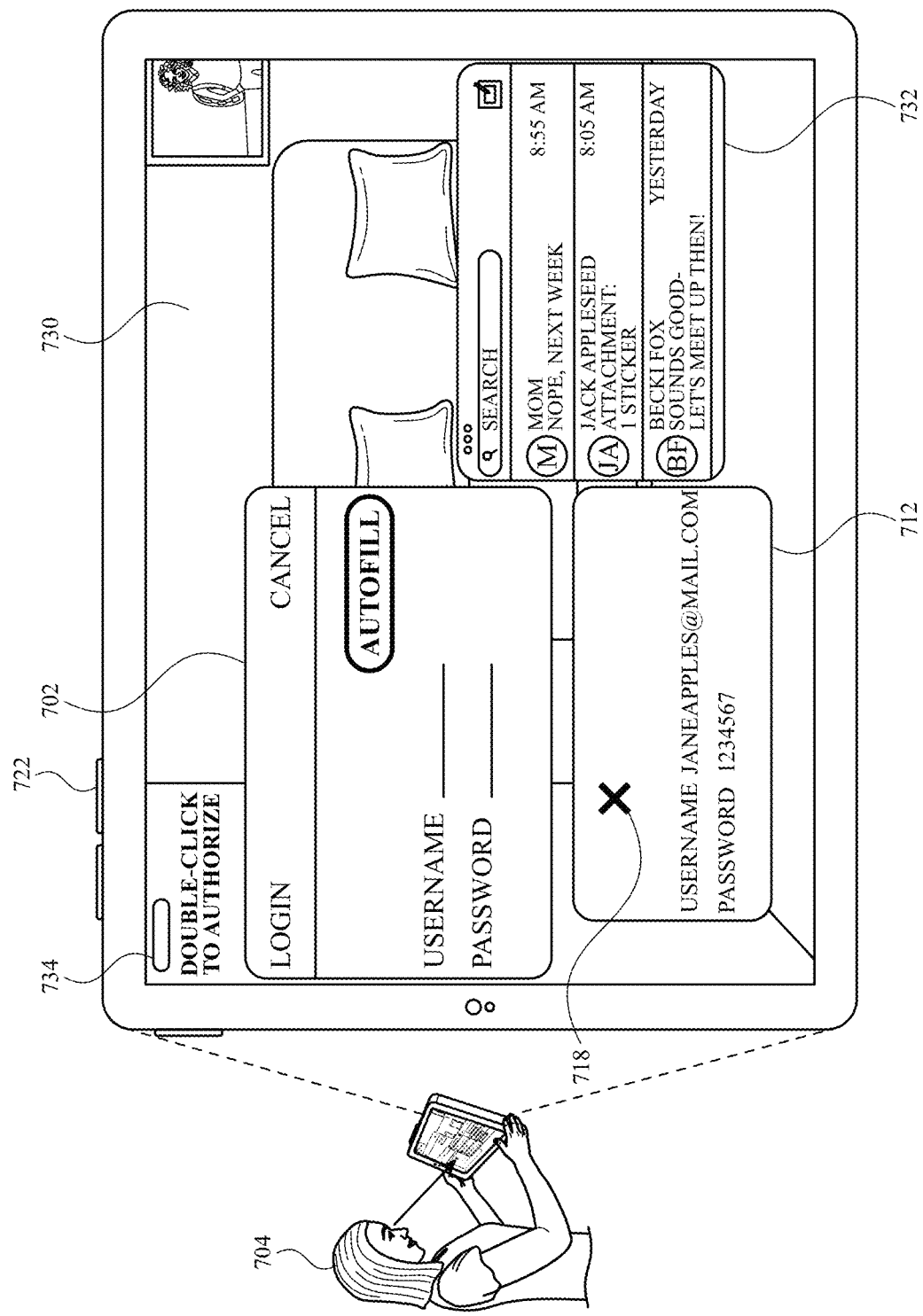

At FIG. 7J, an exemplary environment is depicted, on display 700*a*, including a background region 730. In some embodiments, the environment is implemented in the context of an XR environment, such that electronic device 700 corresponds to a head-mounted display. Background region 730 optionally corresponds to a representation of a physical environment of user 704, a virtual environment, or a combination of a physical environment and a virtual environment. User 704 may interact with various interface objects, virtual objects, or other objects depicted within the environment. For instance, electronic device 700 is displaying messaging interface 732, through which user 704 can receive and send messages. In addition, electronic device 700 also displays login user interface 702 and authorization interface 712. While electronic device 700 detects user 704 interacting with an interface, the interface may be fully visible to user 704, such that no objects or other elements within the environment occlude the interfaces. Electronic device 700 optionally detects user 704 currently looking at authorization interface 712, as depicted by user gaze direction 718. As described herein, user authorization of the secure operation is optionally enabled. Accordingly, the appearance of authorization interface 712 (e.g., not grayed-out) and indication 734 informs the user that the user can authorize the autofill function by, for example, performing a function indicated by indication 734 (e.g., a double-press of button 722).

Figure 7K:
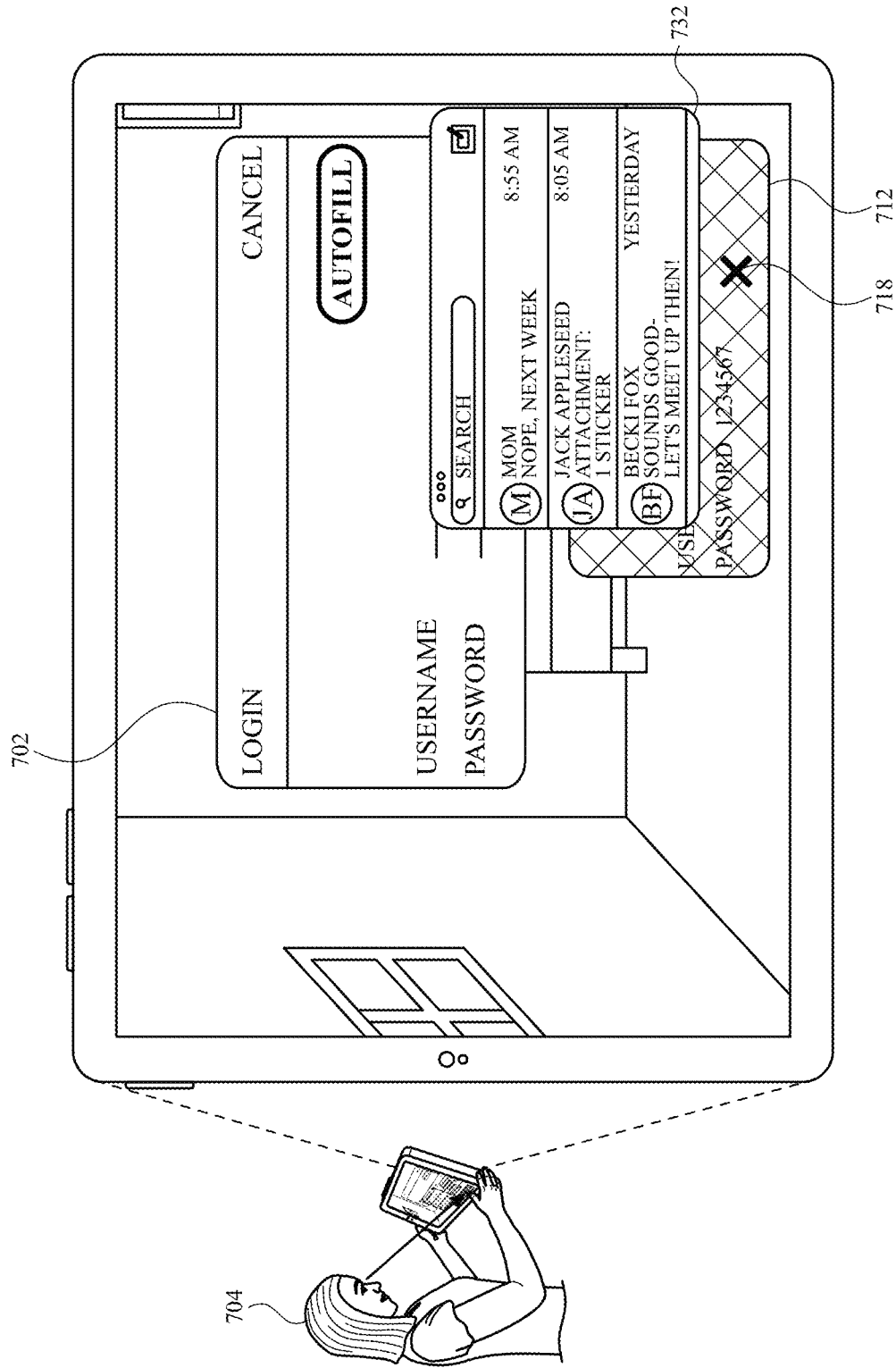

At FIG. 7K, the exemplary environment is depicted including a change in viewpoint of user 704. In some embodiments, the visible amount of objects depicted in the environment change based on occlusion by other objects within the environment. Such occlusion occurs based on movement of the (occluded or occluding) objects themselves or a change in viewpoint of user 704. For instance, relative to FIG. 7J, electronic device 700 has detected that user 704 has turned towards the left within the environment. Specifically, where the environment is implemented in the context of an XR environment, electronic device 700 detects that user 704 has turned their head towards the left while wearing electronic device 700 (e.g., a head-mounted display). Various objects within the environment may be viewpoint-locked or environment-locked. In particular, messaging interface 732 may be viewpoint-locked, such that messaging interface 732 is displayed at the same location and/or position in the viewpoint of user 704, even as user 704's viewpoint changes. Login user interface 702 and authorization interface 712 may instead be environment-locked, such that the login user interface 702 and authorization interface 712 is displayed at a position in the viewpoint of the user that is based on a location in the XR environment (e.g., situated in front of a representation of a couch). Accordingly, as user 704 adjusts their viewpoint to the left (relative to FIG. 7J), messaging interface 732 appears to move over login user interface 702 and authorization interface 712. In other words, login user interface 702 and authorization interface 712 remain in the same general location relative to the background of the XR environment from the perspective of the user, and as a result of the user's viewpoint movement, messaging interface 732 is overlaid upon login user interface 702 and authorization interface 712. Based on the viewpoint change, the visible amount of login user interface 702 and authorization interface 712 is reduced given the overlay by messaging interface 732. Although electronic device 700 detects user gaze direction 718 as still being directed to authorization interface 712, a determination is made that that less than a threshold amount of the login user interface 702 and/or authorization interface 712 is visible from the viewpoint of the user, and thus, the appearance of authorization interface 712 is adjusted (e.g., grayed out) to reflect that user authorization of the secure operation is disabled.

Figure 7L:
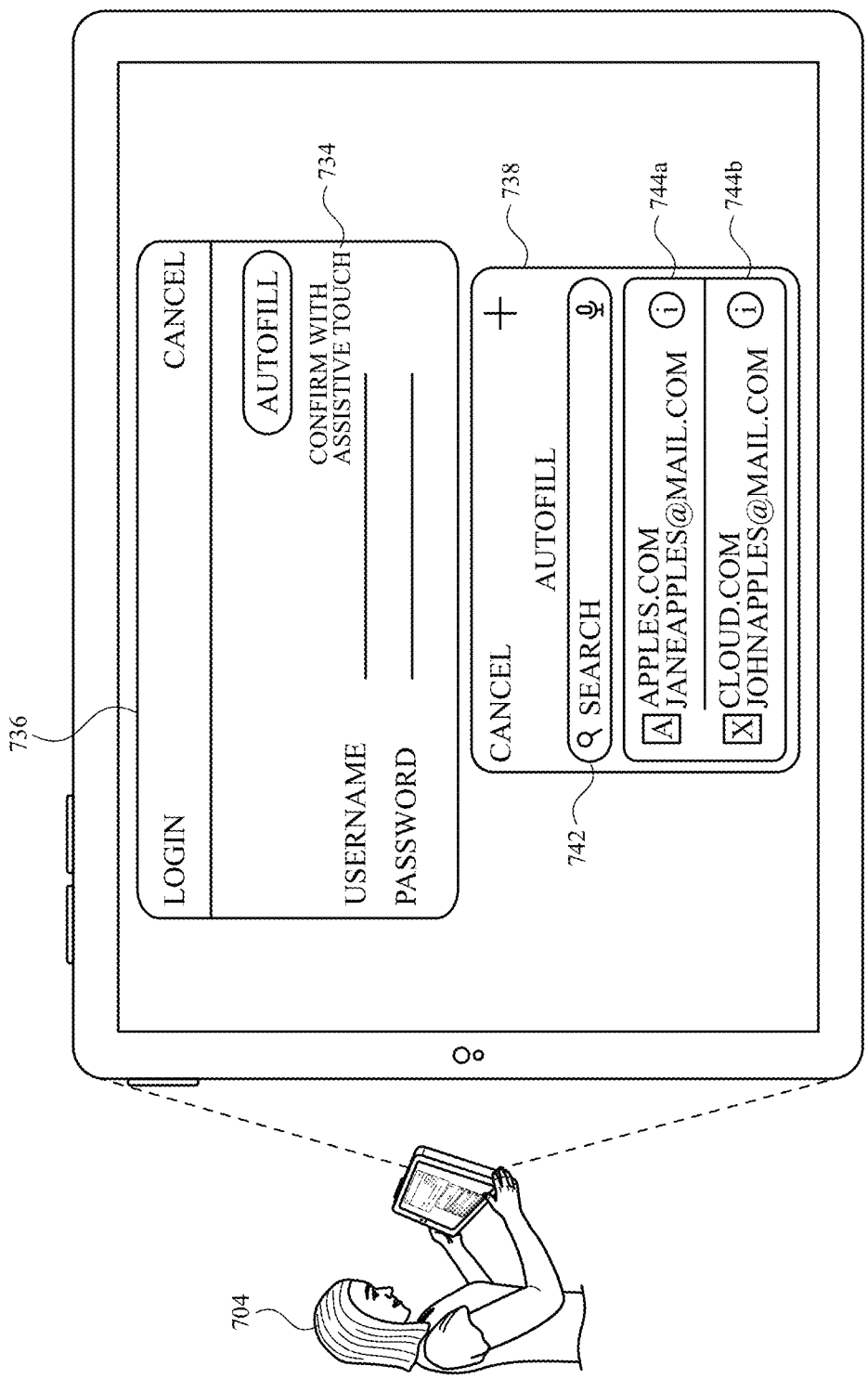

At FIG. 7L, electronic device 700 displays an interface to authorize the secure operation while electronic device 700 operates in a second mode different from the first mode (as described with respect to FIGS. 7A-7K). In some embodiments, electronic device 700 operates in a second mode, such as an accessibility mode and/or a mode in which an input at the physical input mechanism is not required to authorize a secure operation. While in the second mode, electronic device 700 displays login user interface 736. Login user interface 736 corresponds to a login interface, including functionality for facilitating interactions for users with accessibility requirements (e.g., limited fine motor, sight, and/or hearing capabilities). Electronic device 700 optionally also displays authorization interface 738 to facilitate the process for a secure operation, such as the authorization of information into certain displayed fields (e.g., the "autofill" function).

In some embodiments, login user interface 736 and authorization interface 738 correspond to displayed virtual interface objects within an XR environment. Authorization interface 738 includes search function 742 and one or more credential options 744a and 744b. In some embodiments, a credential option is associated with a username and/or a password. In some embodiments, electronic device 700 receives a search query, via search function 742, for additional credential options and provides any result options that are retrieved based on the search. While in the second mode, user 704 may interact with authorization interface 738 (e.g., select either credential option 744a or 744b, or search for additional credential options via search function 742) using an input or a combination of inputs compatible with accessibility features, such as a gaze input, a controller input, and/or a spoken input. In some embodiments, electronic device 700 detects selection of a credential option (e.g., credential option 744a). Once a credential option is selected, user 704 may activate affordance 740 using an input or a combination of inputs compatible with accessibility features, such as a gaze input, controller input, and/or a spoken input. In particular, affordance 740 may be displayed with text "Confirm with Assistive Touch" in order to indicate to the user that the device is operating in the second mode, and accordingly, the physical input mechanism is not required to authorize the autofill operation. At FIG. 7L, electronic device 700 detects selection of affordance 740.

Figure 7M:
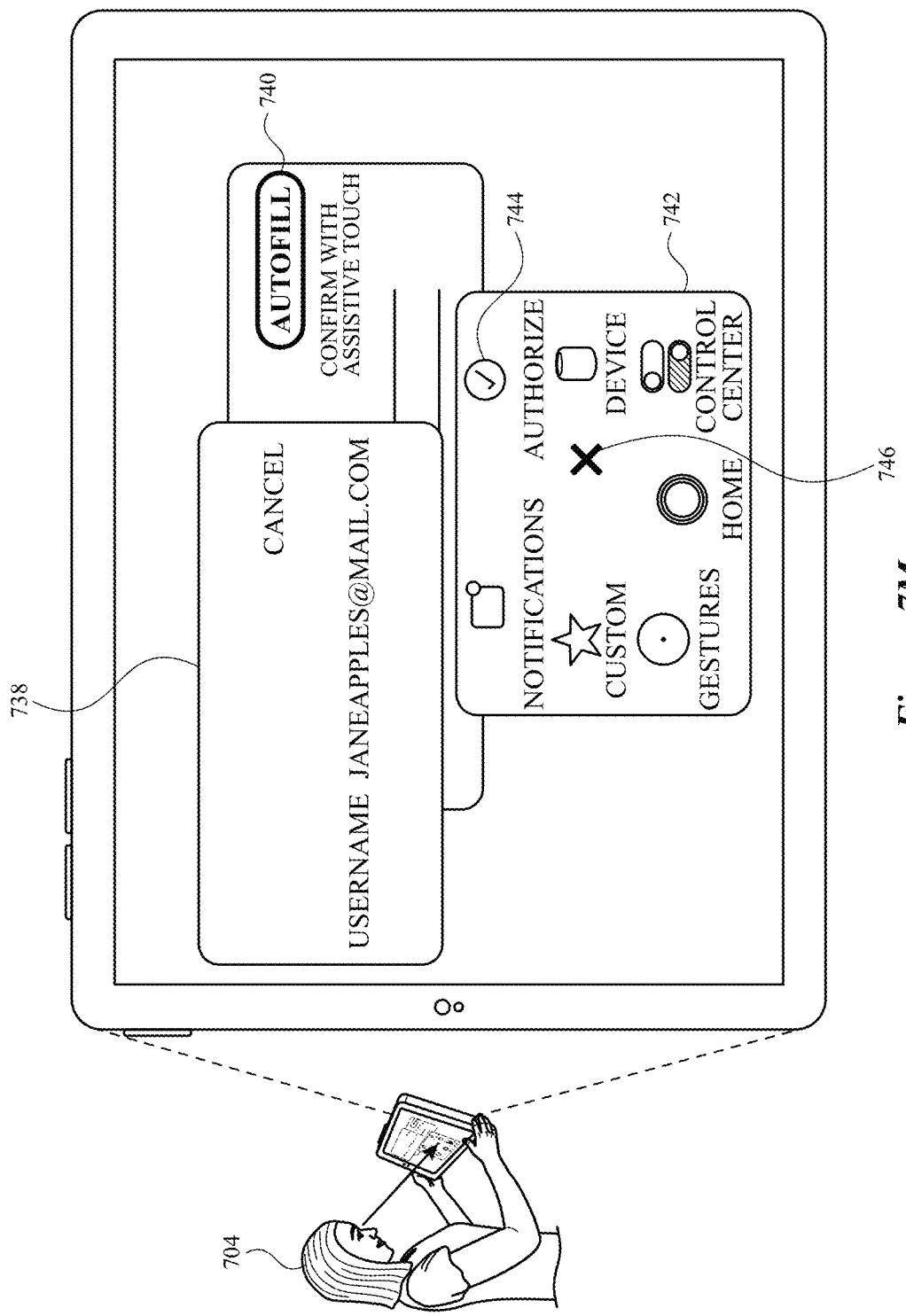
Figure 7N:
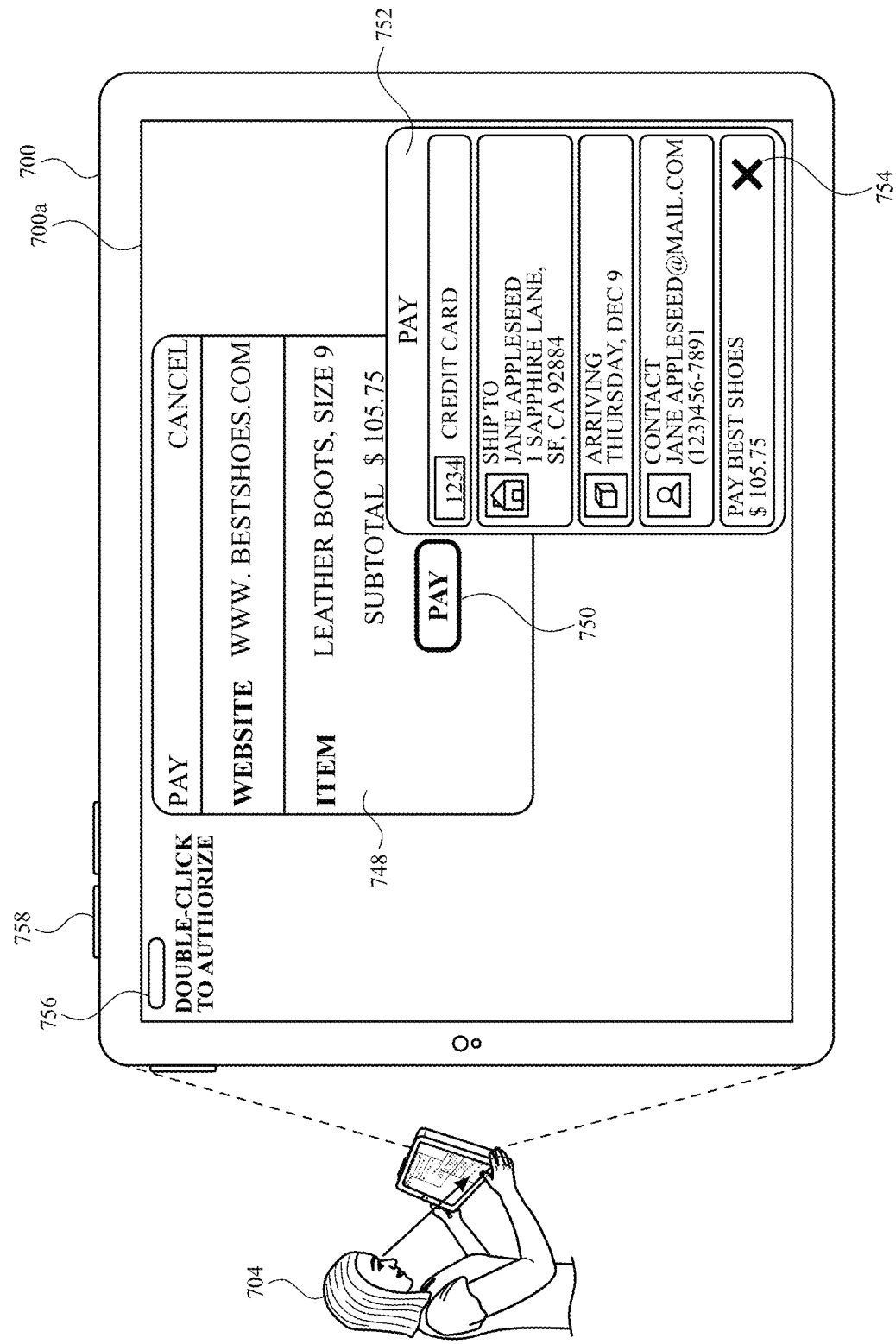

At FIG. 7M, in response to detecting selection of affordance 740, electronic device 700 displays an assistive input interface 742, including representations of a plurality of functions for facilitating various tasks. In some embodiments, user 704 is required gaze at affordance 740 while activating affordance 740 in order to trigger the selection of affordance 740. For instance, user 704 gazes at affordance 740, and while gazing at affordance 740, activates a special input (as discussed further in paragraphs). In addition, in response to the user selection of affordance 740, electronic device 700 also modifies the appearance of authorization interface 738 to indicate that the credential option has been selected by the user. In some embodiments, the position or location of authorization interface 738 is adjusted (e.g., in an XR environment, authorization interface 738 is moved to a side portion of the user's field of view).

The plurality of functions included in assistive input interface 742 include various options. For example, the various options include an option to navigate to a main screen (e.g., a "Home" option), an option to display device notifications (e.g., "Notifications"), and/or an option to display a settings menu (e.g., "Control Menu"). Assistive input interface 742 includes a secure operation authorization affordance 744. The plurality of functions can optionally be invoked using a specific input type, which may be preconfigured by electronic device 700 or a particular user. For instance, while in the first mode, the option to navigate to a main screen is performed in response to electronic device 700 receiving a primary input type (e.g., a "swipe" input at a specific location), whereas, while in the second mode, the option to navigate to a main screen is performed in response to electronic device 700 receiving an accessibility-based input type (e.g., a user gaze on the "Home" icon in combination with a long-press on a controller). In addition, while in the first mode, authorizing the secure operation is performed in response to electronic device 700 receiving a primary input type such as a double-press of a specific hardware button, whereas, while in the second mode, authorizing the secure operation is performed by an accessibility-based input type, such as activating secure operation authorization affordance (e.g., a user gaze on the secure operation authorization affordance 744 in combination with a long-press on a controller).

In some embodiments, in response to receiving the input to authorize the secure operation, electronic device 700 performs user authentication. For example, a first type of biometric authentication is performed, such that user 704 is biometrically authenticated using one or more biometric sensors of device 700. The first type of biometric authentication optionally includes a first level (e.g., complete or high-fidelity) iris features verification. In particular, while operating in the second mode, a second type of biometric authentication (e.g., a passive iris features verification such that electronic device 700 repeatedly analyzes specific characteristics associated with user 704's whole eye, or portion of user 704's eye, while user 704 interacts with device 700) is disabled. Accordingly, the first type of biometric authentication is required when the input to authorize the secure operation is received. In particular, (with reference back to FIG. 7F) electronic device 700 provides an authentication guidance user interface to the user to biometrically authenticate user 704 using the first type of biometric authentication. The authentication guidance user interface includes directions for performing the first type of biometric authentication, such as directions requesting the user to provide particular movements of a respective biometric feature. For example, the authentication guidance user interface includes an initial prompt such as "Biometric Authentication Required," with an option for the user to "Continue" and another option for the user to "Cancel."

Once electronic device 700 detects activation of the option to "Continue," electronic device 700 initiates the first type of biometric authentication. Where the first type of biometric authentication corresponds to an iris features verification, electronic device 700 optionally instructs the user to look at various portions of the display when the biometric authentication begins (e.g., via prompt "Please look here."). During the first type of biometric authentication, electronic device 700 analyzes a gaze corresponding to user 704 to obtain characteristics associated with user 704's whole eye, or portion of user 704's eye, such as the iris features, pupil, and/or glints. Where the first type of biometric authentication corresponds to facial verification, electronic device 700 instructs user 704 to rotate user 704's face at a specific angle or angles. In some embodiments, where the first type of biometric authentication corresponds to fingerprint authentication, electronic device 700 instructs the user to move their finger along a specific path and/or touch their finger in a specific way on a touch-sensitive contact portion of device 700 or another device. In some embodiments, the first type of biometric authentication is based on a different type of biometric authentication (e.g., voice authentication) or is based on a non-biometric authentication (e.g., passcode entry).

At FIG. 7N, an additional exemplary user interface to authorize a secure operation is displayed on display 700a of device 700. Specifically, FIG. 7N depicts a secure operation associated with payment. In some embodiments, the secure operation associated with payment is implemented in the context of an XR environment, such that device 700 corresponds to a head-mounted display. Electronic device 700 receives users inputs and, in response, navigates to an e-commerce website, displayed via web browser 748, in order to purchase an item (e.g., a pair of shoes). In some embodiments, when electronic device 700 is operating in a first mode (e.g., a standard mode with accessibility features not enabled and/or a mode permitting secure operations to be authorized with a default physical input mechanism), electronic device 700 detects selection of affordance 750 to initiate the payment function. For example, display 700a is a touch sensitive display, such that user 704 presses a finger on affordance 750. In some embodiments, when device 700 is implemented in an XR environment, electronic device 700 detects selection of affordance 750 using a controller communicatively coupled to electronic device 700. In addition, electronic device 700 detects selection of affordance 750 using gaze, for example, by detecting user 704 looking at affordance 750 for a predetermined period of time and/or receiving one or more gestures. In some embodiments, electronic device 700 corresponds to a head-mounted display, such that electronic device 700 detects user 704 performing one or more gestures to activate affordance 750, such as an air gesture. Once electronic device 700 detects activation of affordance 750, electronic device 700 displays payment details interface 752. Payment details interface 752 includes details related to information for completing an order for purchasing the item depicted in associated web browser 748. For example, payment details interface 752 includes credit card billing information, shipping information, and/or price information.

In some embodiments, electronic device 700 enables user authorization of the payment operation subject to a determination that user 704 is authorized to perform the payment operation. For instance, the user is determined to be authorized to perform the secure operation based on a gaze criterion with respect to user gaze direction 754. The gaze criterion is satisfied when user 704 is gazing at an interface object, such as web browser 748 and/or payment details interface 752. For example, electronic device 700 optionally displays web browser 748 and/or payment details interface 752 in a center portion of display 700a. In some embodiments, electronic device 700 determines that a user is not authorized to perform the secure operation when the user is not gazing at web browser 748 and/or payment details interface 752 (e.g., the user's eyes are closed or the user is looking at a corner of display 700a (away from the interfaces 748 and 752)). In some embodiments, user authorization of the secure operation is enabled subject to a determination that user 704 has or is providing particular movement of a biometric feature. For instance, the particular movements include the user gazing at a particular portion of web browser 748 (e.g., gazing at affordance 750) or payment details interface 752 (e.g., the displayed price), the user providing a specific facial rotation, or the user moving a finger along a particular path.

Once authorization of the payment function is enabled, the user proceeds with authorizing the payment function. In particular, electronic device 700 modifies the appearance of one or more interface objects and/or displays one or more additional interface objects to indicate to the user that the user can request to perform the payment operation. Indication 756 includes instructions "double-click to authorize," which may be displayed proximate to a hardware button 758. In some embodiments, where electronic device 700 is implemented in an XR environment, electronic device 700 displays an indication such as directions to perform one or more air gestures (e.g., a direction to move one or more hands or fingers in a specific motion) and/or to perform one or more inputs on an XR compatible controller.

In some embodiments, in response to receiving the request to perform the secure operation, electronic device 700 determines whether user 704 has met a user authentication criteria to perform the payment operation, as discussed with respect to FIGS. 7F-7H. To the extent the user did not meet the user authentication criteria, user authorization of the payment operation is disabled. Accordingly, a user authentication process is performed, as discussed with respect to FIGS. 7F-7H. To the extent the user did not met the user authentication criteria, electronic device 700 initiates the payment transaction and provides feedback to the user regarding the payment transaction.

Additional descriptions regarding FIGS. 7A-7N are provided below in reference to method 800 described with respect to FIGS. 7A-7N.

FIG. 8 is a flow diagram of an exemplary method 800 of facilitating user consent for a secure operation, in accordance with some embodiments. In some embodiments, method 800 is performed at a computer system (e.g., computer system 101 in FIG. 1 (e.g., a smart phone, a smart watch, a tablet, and/or a wearable device)) including a display generation component (e.g., display generation component 120 in FIGS. 1, 3, and 4 (e.g., a display controller, a touch-sensitive display system, a display (e.g., integrated and/or connected), a 3D display, a transparent display, a projector, and/or a heads-up display)) (e.g., a heads-up display, a display, a touchscreen, a projector, etc.) and one or more input devices. In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

As described below, method 800 provides an intuitive way for facilitating user consent for a secure operation. The method reduces the cognitive burden on a user while performing a secure operation, thereby creating a more efficient human-machine interface. For battery-operated computing devices, facilitating user consent for a secure operation faster and more efficiently conserves power and increases the time between battery charges.

While a three-dimensional environment (e.g., 730) is visible (802) via the display generation component (e.g., 120 and/or 700a), wherein the three-dimensional environment includes a virtual user interface object (e.g., 702, 712, 736, 738, 748, and/or 752) that includes information about a secure operation (e.g., 706, 708, 710, 716a, 716b, 744a, and/or 744b), a change in a current viewpoint of the user (e.g., user 704) is detected (e.g., from a first viewpoint to a second viewpoint that is different from the first viewpoint) (e.g., receiving a request to autofill entry fields (e.g., with password and/or mailing information) and/or detecting activation of a payment affordance) via the one or more input devices (e.g., 125 and/or 150).

In response to detecting (804) the change in the viewpoint (e.g., 718, 746, and/or 754) of the user (e.g., 704), in accordance with a determination that at least a threshold amount of the virtual user interface object (e.g., 702, 712, 736, 738, 748, and/or 752) is visible from the viewpoint (e.g., 718, 746, and/or 754) of the user (e.g., gaze is directed towards the user interface and/or subject of the user's gaze is the user interface), and that the user (e.g., 704) is authorized to perform the secure operation, user authorization of the secure operation, using the virtual user interface object (e.g., 702, 712, 736, 738, 748, and/or 752), is enabled (e.g., enabling an autofill authorization option to automatically populate fields of a second user interface (e.g., a forms user interface) and/or enabling an activatable purchase authorization option (e.g., double-press procedure of a physical button). In some embodiments, the computer system (e.g., 700) visually indicates (e.g., by un-graying the second user interface (e.g., 702, 712, 736, 738, 748, and/or 752) or a portion of the second user interface (e.g., 702, 712, 736, 738, 748, and/or 752), such as a button (e.g., 710)) that the viewpoint (e.g., 718, 746, and/or 754) includes the user interface (e.g., 702, 712, 736, 738, 748, and/or 752) and, therefore, the respective authorization option is enabled. In some embodiments, the activatable purchase authorization option includes a single press, a long press, a single press followed by a long press, a press followed by a rotation, a rotation followed by a press, and/or a plurality of presses in series (e.g., a double press, a triple press).

In accordance with a determination (806) that less than the threshold amount of the virtual user interface object (e.g., 702, 712, 736, 738, 748, and/or 752) is visible from the viewpoint (e.g., 718, 746, and/or 754) of the user (e.g., 704) (e.g., gaze (e.g., 718, 746, and/or 754) is not directed towards the user interface (e.g., 702, 712, 736, 738, 748, and/or 752) and/or subject of the user's gaze (e.g., 718, 746, and/or 754) is not the user interface (e.g., 702, 712, 736, 738, 748, and/or 752)), user authorization of the secure operation, using the virtual user interface object (e.g., 702, 712, 736, 738, 748, and/or 752), is forgone (e.g., disabling an autofill authorization option for automatically populating fields of a second user interface (e.g., a forms user interface) and/or disabling an activatable purchase authorization option (e.g., double-press procedure of a physical button)). In some embodiments, in accordance with a determination that the viewpoint (e.g., 718, 746, and/or 754) does not include the user interface (e.g., 702, 712, 736, 738, 748, and/or 752), the computer system (e.g., 700) visually indicates (e.g., by graying the second user interface (e.g., 702, 712, 736, 738, 748, and/or 752) or a portion of the second user interface (e.g., 702, 712, 736, 738, 748, and/or 752), such as a button (e.g., 710)) that the viewpoint (e.g., 718, 746, and/or 754) does not include the user interface (e.g., 702, 712, 736, 738, 748, and/or 752) and, therefore, the respective authorization option is not enabled). Enabling user authorization of a secure operation when a respective user interface is visible provides improved security/privacy by confirming that the user has had the opportunity to review the information associated with the secure operation before the user authorizes proceeding with the secure operation.

In some embodiments, an input (e.g., a double-click of a hardware button (e.g., 722 and/or 758) and/or activation of specific affordance) to authorize performance of the secure operation is received from the user (e.g., 704). In some embodiments, the input to authorize includes a single press, a long press, a single press followed by a long press, a press followed by a rotation, a rotation followed by a press, a plurality of presses in series (e.g., a double press, a triple press). In some embodiments, in response to receiving the input to authorize performance of the secure operation, in accordance with the determination that a set of one or more performance criteria is satisfied (e.g., gaze is directed (e.g., 718, 746, and/or 754) towards the user interface (e.g., 702, 712, 736, 738, 748, and/or 752) and/or subject of the user's gaze (e.g., 718, 746, and/or 754) is the user interface (e.g., 702, 712, 736, 738, 748, and/or 752)), performance of the secure operation is initiated (e.g., populate fields of a second user interface (e.g., 702, 712, 736, 738, 748, and/or 752) (e.g., a forms user interface) and/or initiate payment transaction), wherein the set of one or more performance criteria includes a visibility criterion that is met when at least the threshold amount of the virtual user interface object (e.g., 702, 712, 736, 738, 748, and/or 752) is visible from the viewpoint (e.g., 718, 746, and/or 754) of the user (e.g., 704) (e.g., threshold amount corresponds to any portion of the interface object (e.g., 702, 712, 736, 738, 748, and/or 752), a non-zero amount of the interface object (e.g., 702, 712, 736, 738, 748, and/or 752), or the entire interface object (e.g., 702, 712, 736, 738, 748, and/or 752)). In some embodiments, in accordance with the determination that the set of one or more performance criteria is not satisfied (e.g., gaze (e.g., 718, 746, and/or 754) is not directed towards the user interface (e.g., 702, 712, 736, 738, 748, and/or 752) and/or subject of the user's gaze (e.g., 718, 746, and/or 754) is not the user interface (e.g., 702, 712, 736, 738, 748, and/or 752)), performance of the secure operation is not initiated (e.g., forgoing populating fields (e.g., 706 and/or 708) of a second user interface (e.g., 702, 712, 736, 738, 748, and/or 752) (e.g., a forms user interface) and/or forgoing initiating a payment transaction). Initiating performance of a secure operation when a threshold amount of a respective user interface is visible provides improved security/privacy by confirming that the user has had the opportunity to review the information associated with the secure operation before the user authorizes proceeding with the secure operation.

In some embodiments, the set of one or more performance criteria includes a user authentication criterion that is met when the user (e.g., 704) is authenticated (e.g., criteria includes positive indication of continuous iris features verification since user (e.g., 704) engaged device (e.g., 700), positive indication of a first level (e.g., complete or high-fidelity) iris features verification, and/or correct passcode authentication). Requiring user authentication in addition to user authorization for a secure operation provides improved security/privacy by adding an additional layer of verification specific to user requesting authorization.

In some embodiments, biometric information, from the user (e.g., 704), is detected (e.g., a first level (e.g., complete or high-fidelity) iris features verification is performed and/or a second level (e.g., tracking eye information (e.g., detected glint information and/or detected pupil information) for continuity) iris features verification is performed). In some embodiments, detecting biometric information includes receiving an input from a user (e.g., 704) (e.g., image(s) of user's face) in response to a prompt (e.g., 724) to gaze at a particular portion (e.g., 726) of the screen (e.g., 700a). In some embodiments, detecting biometric information includes passively detecting biometric information while the user (e.g., 704) is using the device (e.g., 700) (e.g., wearing a head-mounted display). In some embodiments, detecting biometric information includes detecting the biometric information while a hardware button (e.g., 722 and/or 758) is being activated (e.g., during single press, a long press, a single press followed by a long press, a press followed by a rotation, a rotation followed by a press, a plurality of presses in series (e.g., a double press, a triple press)) or in response a hardware button (e.g., 722 and/or 758) being activated. In some examples, the biometric information is compared to enrolled biometric information (e.g., compare obtained iris scan to stored iris print and/or compare current eye information to eye information from previous frame), wherein a determination whether the user authentication criterion is met is based on the comparison of the biometric information to the enrolled biometric information (e.g., user authentication criterion satisfied if comparison meets sufficient similarity threshold (e.g., 95% similarity)). In some embodiments, a first level (e.g., complete or high-fidelity) iris features verification is performed, and at a later time (e.g., one hour later), a second level (e.g., tracking eye information for continuity) iris features verification is performed in order to link the first level iris features verification to the performance criteria for initiating performance of the secure operation. Requiring biometric authentication in addition to user authorization for a secure operation provides improved security/privacy by adding a layer of biometric verification specific to user requesting authorization.

In some embodiments, a determination that the user authentication criterion is met occurs in response to receiving the input to authorize performance of the secure operation (e.g., in response to activation of a hardware button (e.g., 722 and/or 758) (e.g., a single press, a long press, a single press followed by a long press, a press followed by a rotation, a rotation followed by a press, a plurality of presses in series (e.g., a double press, a triple press)), verification is made whether user authentication criterion is satisfied). Requiring user authentication at the time of a user request for performing a secure operation provides improved security/privacy by verifying the identity of the user requesting the operation.

In some embodiments, a determination whether the user authentication criterion is met includes obtaining stored authentication information, wherein the stored authentication information is indicative of one or more previously performed biometric authentications (e.g., obtain continuity results indicating positive results (e.g., iris features continuity and/or facial continuity has been maintained) or negative results (e.g., iris features continuity and/or facial continuity has not been maintained)). Utilizing stored authentication information in addition to user authorization for a secure operation provides improved security/privacy by creating an efficient and non-interruptive user experience for biometric authentication, encouraging users to use biometric authentication and thus providing a more secure experience.

In some embodiments, a determination whether the user authentication criterion comprises: performing a first type of biometric authentication (e.g., a first level (e.g., complete or high-fidelity) iris features verification is performed), after performing the first type of biometric authentication (e.g., after performing a successful first level (e.g., complete or high-fidelity) iris features verification), repeatedly performing (e.g., performing every 2 frames (e.g., a frame includes a still image or a set of images obtained from a sensor (e.g., biometric sensor) of the device), performing every 3 frames, performing every 4 frames, performing every 5 frames, performing every 6 frames, performing every 7 frames, performing every 8 frames, performing every 9 frames, or performing every 5 10 frames) a second type of biometric authentication (e.g., a second level (e.g., tracking eye information for continuity) iris features verification is performed), wherein the second type of biometric authentication includes: receiving an input from the user (e.g., 704) including first respective biometric information (e.g., obtain eye information from a current frame), and comparing the received input to a previously received input including second respective biometric information (e.g., compare eye information from current frame to eye information from previous frame). Taking a plurality of sensor measurements at a plurality of intermediate times between a first and second time provides improved security/privacy by verifying that a same user has been using the device since an initial authentication.

In some embodiments, performing the first type of biometric authentication includes detecting presence of a first biometric feature type (e.g., the first level (e.g., complete or high-fidelity) verification is based on eye features or the first level (e.g., complete or high-fidelity) verification is based on facial features), and performing the second type of biometric authentication includes detecting presence of a second biometric feature type (e.g., the second level verification is based on eye features (e.g., tracking eye information for continuity) or the second level verification is based on facial features (e.g., tracking eyebrows, eyelids, forehead, and/or nose for continuity)), wherein the first biometric feature type and the second biometric feature type correspond to the same biometric feature type (e.g., the first level verification and/or the second level verification are based on eye features or the first level verification and/or the second level verification are based on facial features). Continuously verifying user presence based on a same biometric feature as an initial authentication, in addition to user authorization for a secure operation, provides improved security/privacy by creating an efficient and non-interruptive user experience for biometric authentication, encouraging users to use biometric authentication and thus providing a more secure experience.

In some embodiments, the user authentication criterion is met when the user (e.g., 704) is authenticated based on eye biometrics (e.g., detecting a first pattern based on a plurality of features corresponding to an eye of the user (e.g., 704) (e.g., pattern formed based on eye filaments, pits, furrows, corona, and/or rings)). In some embodiments, a detected first pattern is compared to a reference pattern, wherein the reference pattern is based on the plurality of features corresponding to an eye of the user (e.g., a stored pattern based on a complete or high-fidelity iris features verification or a stored pattern based on partial iris features verification for continuity). Requiring authentication based on eye biometrics in addition to user authorization for a secure operation provides improved security/privacy by adding a layer of biometric verification specific to user requesting authorization.

In some embodiments, the user authentication criterion is met when a passcode entry matches an enrolled passcode (e.g., receive a plurality of numeric entries (e.g., 0-9) and compare to previously enrolled passcode (e.g., passcode including digits 0-9)). Requiring passcode authentication in addition to user authorization for a secure operation provides improved security/privacy by providing additional methods to verify a user's identity.

In some embodiments, in accordance with a determination that the user authentication criterion is not met (e.g., device is unable to obtain a sufficient iris features scan, first level iris features verification result indicates iris features scan does not match reference scan, or user declines to provide iris features verification), a prompt (e.g., 728) is provided (e.g., displaying, via the display generation component (e.g., 120 and/or 700a)) to enable authentication with a passcode (e.g., a button the user activates to invoke a passcode entry interface). In some embodiments, the prompt (e.g., 704) includes a passcode entry portion and an affordance to decline passcode entry. Requiring passcode authentication after biometric authentication failure provides improved security/privacy by providing backup options for verifying a user's identity.

In some embodiments, user authorization of the secure operation (e.g., initiating a payment operation and/or initiating an autofill operation) using the virtual user interface object (e.g., 702, 712, 736, 738, 748, and/or 752) includes user activation of a hardware user interface element (e.g., 722 and/or 758) (e.g., single-press, long press, a single press followed by a long press, a press followed by a rotation of the hardware user interface element, a rotation followed by a press, a two, three, or more presses in series). Utilizing a hardware element for authorization provides improved security/privacy by reducing the possibility of an erroneous authorization and/or preventing an unauthorized input from malicious software.

In some embodiments, the secure operation is a payment (e.g., providing payment information to a third party service in order to purchase an item, such as providing credit card information to an e-commerce website to purchase a shoe). Enabling user authorization of a payment operation when a respective user interface is visible provides improved security/privacy by confirming that the user has had the opportunity to review the information associated with the secure operation before the user authorizes proceeding with the secure operation.

In some embodiments, the secure operation includes auto-filling user credentials (e.g., providing login information (e.g., 706 and/or 708) (e.g., username and/or password) to access secure information (e.g., banking website, stock trading application, and/or user profile information)). Enabling user authorization of an auto-fill operation when a respective user interface is visible provides improved security/privacy by confirming that the user has had the opportunity to review the information associated with the secure operation before the user authorizes proceeding with the secure operation.

In some embodiments, in response to detecting the change in the viewpoint (e.g., 718, 746, and/or 754) of the user (e.g., 704), the amount of the virtual user interface object (e.g., 702, 712, 736, 738, 748, and/or 752) that is visible to the user (e.g., 704) is changed (e.g., viewpoint movement (e.g., looking to the left or right) results in the virtual user interface object (e.g., 702, 712, 736, 738, 748, and/or 752) being partially (e.g., as shown in FIG. 7I and FIG. 7K) or completed removed from visibility or viewpoint movement results in the virtual user interface object (e.g., 702, 712, 736, 738, 748, and/or 752) being visible after being completed removed from visibility). Enabling user authorization of a secure operation based on changes in a user's viewpoint provides improved security/privacy by verifying whether the user is still viewing the details regarding the secure operation.

In some embodiments, the amount of the virtual user interface object (e.g., 702, 712, 736, 738, 748, and/or 752) that is visible changes based on occlusion by a physical (e.g., real) object. In some embodiments, a visible amount, from the viewpoint (e.g., 718, 746, and/or 754) of the user (e.g., 704), of the virtual user interface object (e.g., 702, 712, 736, 738, 748, and/or 752) is detected, wherein the viewpoint (e.g., 718, 746, and/or 754) of the user (e.g., 704) includes a physical object represented in the three-dimensional environment. In some embodiments, the user (e.g., 704) views a physical object (e.g., a computer monitor) through an additive display or the user (e.g., 704) views a representation of the physical object reproduced on an opaque display, where the physical object is situated closer to the user (e.g., 704) than the representation of the virtual user interface object (e.g., 702, 712, 736, 738, 748, and/or 752). In some embodiments, in response to detecting the change in the viewpoint (e.g., 718, 746, and/or 754) of the user (e.g., 704), a reduction in the visible amount is detected, wherein the detected change in the viewpoint (e.g., 718, 746, and/or 754) of the user (e.g., 704) includes detecting the physical object appearing in front of the virtual user interface (e.g., 702, 712, 736, 738, 748, and/or 752) relative to the viewpoint (e.g., 718, 746, and/or 754) of the user (e.g., 704). In some embodiments, the reduction in the visible amount is based on the detected physical object appearing in front of the virtual user interface (e.g., 702, 712, 736, 738, 748, and/or 752) (e.g., less of the virtual interface object (e.g., 702, 712, 736, 738, 748, and/or 752) is displayed than was displayed prior to the viewpoint change). In some embodiments, a physical object may move in front of the virtual user interface (e.g., 702, 712, 736, 738, 748, and/or 752) (e.g., a physical balloon floats in front of the user's (e.g., 704) center field of view). In some embodiments, the changed viewpoint (e.g., 718, 746, and/or 754) of the user (e.g., 704) now includes a physical object in close proximity to the user (e.g., 704) which occludes the virtual user interface (e.g., 702, 712, 736, 738, 748, and/or 752) (e.g., the user (e.g., 704) turns around towards a tree which is now 1 foot in front of the user (e.g., 704)). When a physical object is described as occluding a virtual object (e.g., 702, 712, 736, 738, 748, and/or 752), this optionally refers to the device (e.g. 700) ceasing to display or obscuring at least a portion of the virtual object (e.g., 702, 712, 736, 738, 748, and/or 752) that is in a same line of sight as the physical object but is at a simulated distance that is further away from the viewpoint (e.g., 718, 746, and/or 754) of the user (e.g., 704) than the physical object, effectively virtually occluding the virtual object (e.g., 702, 712, 736, 738, 748, and/or 752) (or a portion of the object) that would otherwise overlap the physical object. Enabling user authorization of a secure operation based on occlusion of secure operation details by physical objects provides improved security/privacy by verifying whether the user is still viewing the details regarding the secure operation.

In some embodiments, the amount of the virtual user interface object (e.g., 702, 712, 736, 738, 748, and/or 752) that is visible changes based on occlusion by a virtual object (e.g., 732). In some embodiments, in response to detecting a change in the viewpoint (e.g., 718, 746, and/or 754) of the user (e.g., 704), a reduction in the visible amount is detected (e.g., a portion of the interface is no longer visible or the entire interface is no longer visible). In some embodiments, the detected change in the viewpoint (e.g., 718, 746, and/or 754) of the user (e.g., 704) includes detecting the virtual object (e.g., 732) appearing in front of the virtual user interface (e.g., 702, 712, 736, 738, 748, and/or 752) relative to the viewpoint of the user (e.g., 704) (e.g., as shown in FIGS. 7J and 7K). In some embodiments, the reduction in the visible amount is based on the detected virtual object (e.g., 732) appearing in front of the virtual user interface (e.g., 702, 712, 736, 738, 748, and/or 752). Enabling user authorization of a secure operation based on occlusion of secure operation details by virtual objects provides improved security/privacy by verifying whether the user is still viewing the details regarding the secure operation.

In some embodiments, a visible amount of the virtual user interface object (e.g., 702, 712, 736, 738, 748, and/or 752) changes based on the virtual user interface object (e.g., 702, 712, 736, 738, 748, and/or 752) moving out of the field of view of the user (e.g., 704) (e.g., as shown in FIG. 7I). In some embodiments, in response to detecting the change in the viewpoint (e.g., 718, 746, and/or 754) of the user (e.g., 704), the virtual user interface (e.g., 702, 712, 736, 738, 748, and/or 752) is no longer detected within the current viewpoint (e.g., 718, 746, and/or 754) of the user (e.g., 704) (e.g., the user (e.g., 704) looks away from the interface (e.g., 702, 712, 736, 738, 748, and/or 752) further such that the interface is now located "behind" the user in the environment). Enabling user authorization of a secure operation based on secure operation details being outside a user's field of view provides improved security/privacy by verifying whether the user is still viewing the details regarding the secure operation.

In some embodiments, a visible amount of the virtual user interface object (e.g., 702, 712, 736, 738, 748, and/or 752) changes based on the virtual user interface object (e.g., 702, 712, 736, 738, 748, and/or 752) moving beyond a threshold distance from a center of the field of view (e.g., 718, 746, and/or 754) of the user (e.g., 704) (e.g., the user (e.g., 704) looks away from the interface (e.g., 702, 712, 736, 738, 748, and/or 752) such that only a portion of the interface is visible (e.g., visible towards the side of the user's (e.g., 704) field of view) or the interface (e.g., 702, 712, 736, 738, 748, and/or 752) is moved by the user (e.g., 704) or by another user). Enabling user authorization of a secure operation based on secure operation details being too far from a center of a user's field of view provides improved security/privacy by verifying whether the user is still viewing the details regarding the secure operation.

In some embodiments, a visible amount of the virtual user interface object (e.g., 702, 712, 736, 738, 748, and/or 752) changes based on occlusion by a physical object. In some embodiments, movement of a physical object is detected (e.g., balloon floats in front of the user (e.g., 704)), wherein the detected movement includes movement of the physical object in front of the virtual user interface (e.g., 702, 712, 736, 738, 748, and/or 752) relative to the viewpoint (e.g., 718, 746, and/or 754) of the user (e.g., on an additive display (e.g., a display including a transparent portion in which the user (e.g., 704) views the actual surrounding physical environment (e.g., 730) through the display), the balloon movement causes a portion of the virtual user interface object (e.g., 702, 712, 736, 738, 748, and/or 752) to no longer be displayed, or on an opaque display (e.g., a display coupled to sensors and/or cameras in which the user (e.g., 704) views a representation (e.g., 730) of the surrounding physical environment on the display), the balloon movement causes a representation of the balloon to be displayed as obscuring a portion of the virtual interface object (e.g., 702, 712, 736, 738, 748, and/or 752)). Enabling user authorization of a secure operation based on secure operation details being occluded by a physical object provides improved security/privacy by verifying whether the user is still viewing the details regarding the secure operation.

In some embodiments, the determination that the user (e.g., 704) is authorized to perform the secure operation includes a determination whether a gaze criterion is satisfied when the user (e.g., 704) is gazing at the virtual user interface object (e.g., 702, 712, 736, 738, 748, and/or 752). In some embodiments, in accordance with the determination that the user (e.g., 704) is gazing at the virtual user interface object (e.g., 702, 712, 736, 738, 748, and/or 752) (e.g., user (e.g., 704) gazing at selected log-in information (e.g., 716a, 716b, 744a, and/or 744b) or user (e.g., 704) gazing at payment information) while the request to perform the secure operation is received, the secure operation is initiated. Requiring a user to view details regarding a secure operation when requesting authorization provides improved security/privacy by ensuring the user has had an opportunity to read the details regarding the operation.

In some embodiments, the determination that the user (e.g., 704) is authorized to perform the secure operation includes a determination whether an eye criterion is satisfied when the user's (e.g., 704) eyes are open. In some embodiments, in accordance with the determination that the user's (e.g., 704) eyes are open or at least one eye of the user (e.g., 704) is open, while the request to perform the secure operation is received, the secure operation is initiated. Requiring that a user's eyes are open in order to provide authorization for the secure operation provides improved security/privacy by ensuring the user has had an opportunity to read the details regarding the operation.

In some embodiments, in accordance with the determination that at least a threshold amount of the virtual user interface object (e.g., 702, 712, 736, 738, 748, and/or 752) is visible from the viewpoint of the user (e.g., 704) (e.g., gaze (e.g., 718, 746, and/or 754) is directed towards the user interface (e.g., 702, 712, 736, 738, 748, and/or 752) and/or subject of the user's gaze (e.g., 718, 746, and/or 754) is the user interface (e.g., 702, 712, 736, 738, 748, and/or 752)), an appearance of the virtual user interface object (e.g., 702, 712, 736, 738, 748, and/or 752) is modified to indicate (e.g., via indicator 720, 734, and/or 756) to the user (e.g., 704) that the user (e.g., 704) can request to perform the secure operation (e.g., as shown in FIG. 7D) (e.g., user interface (e.g., 702, 712, 736, 738, 748, and/or 752) does not appear grayed-out, button is marked as active, or user interface (e.g., 702, 712, 736, 738, 748, and/or 752) provides text (e.g., "Proceed with request") indicating user (e.g., 704) can request to perform secure operation). In some embodiments, in accordance with the determination that less than the threshold amount of the virtual user interface object (e.g., 702, 712, 736, 738, 748, and/or 752) is visible from the viewpoint (e.g., 718, 746, and/or 754) of the user (e.g., 704) (e.g., gaze (e.g., 718, 746, and/or 754) is not directed towards the user interface (e.g., 702, 712, 736, 738, 748, and/or 752) and/or subject of the user's gaze (e.g., 718, 746, and/or 754) is not the user interface (e.g., 702, 712, 736, 738, 748, and/or 752)), the appearance of the virtual user interface object (e.g., 702, 712, 736, 738, 748, and/or 752) is modified to indicate to the user (e.g., 704) that the user (e.g., 704) cannot request to perform the secure operation (e.g., as shown in FIG. 7C) (e.g., user interface (e.g., 702, 712, 736, 738, 748, and/or 752) appears grayed-out, button is marked as inactive, and/or user interface (e.g., 702, 712, 736, 738, 748, and/or 752) provides text (e.g., "Please view to request") indicating user (e.g., 704) cannot request to perform secure operation). Providing a visual indication that user authorization for the secure operation can be provided provides improved visual feedback by informing the user that the secure operation can be initiated by the user.

In some embodiments, the three-dimensional environment (e.g., 730) includes a virtual object associated with the secure operation (e.g., a virtual representation of a shoe), comprising: attaching, to the virtual object associated with the secure operation, the virtual user interface object (e.g., attaching a virtual representation of a sheet to the shoe, the sheet including payment information regarding the shoe), wherein movement of the virtual object causes the attached virtual user interface object to move with the virtual object (e.g., shoe movement (e.g., setting the shoe on a table) causes the sheet to remain attached to and move with the shoe (e.g., the sheet remains attached to the shoe while the shoe rests on the table)). Attaching a corresponding object to the interface with details regarding the secure operation provides improved visual feedback by informing the user that the secure operation is associated with the corresponding object.

In some embodiments, aspects/operations of methods 800, 900, and 1000 may be interchanged, substituted, and/or added between these methods. For example, the determination of whether to enable user authorization of the secure operation in method 800 is optionally used for determining whether to enable user authorization as part of method 900. For brevity, these details are not repeated here.

Additional descriptions regarding FIGS. 7A-7N are provided below in reference to method 900 described with respect to FIGS. 7A-7N.

FIG. 9 is a flow diagram of an exemplary method 900 of authentication continuity for a secure operation, in accordance with some embodiments. In some embodiments, method 900 is performed at a computer system (e.g., computer system 101 in FIG. 1 (e.g., a smart phone, a smart watch, a tablet, and/or a wearable device)) including a display generation component (e.g., display generation component 120 in FIGS. 1, 3, and 4 (e.g., a display controller, a touch-sensitive display system, a display (e.g., integrated and/or connected), a 3D display, a transparent display, a projector, and/or a heads-up display)), one or more input devices, and a biometric sensor (e.g., facial authentication device, fingerprint authentication device, and/or eye tracking device). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 900 are, optionally, combined and/or the order of some operations is, optionally, changed.

As described below, method 900 provides an intuitive way for facilitating authentication continuity for a secure operation. The method reduces the cognitive burden on a user while performing a secure operation, thereby creating a more efficient human-machine interface. For battery-operated computing devices, facilitating authentication continuity for a secure operation faster and more efficiently conserves power and increases the time between battery charges.

At a first time (902), a user (e.g., 704) of the device is biometrically authenticated using the biometric sensor to perform a first type of biometric authentication (e.g., a first level (e.g., complete or high-fidelity) iris features verification is performed, and/or a first level (e.g., complete or high-fidelity) fingerprint verification is performed). At a second time (904), after the first time, a request to perform a secure operation is received (e.g., receiving a request to autofill entry fields (e.g., 706 and/or 708) (e.g., autofill with password and/or mailing information) and/or detecting activation of a payment affordance).

In some embodiments, in response to receiving the request to perform the secure operation (906): in accordance with a determination that a user (e.g., 704) of the device met respective criteria (e.g., continuity criteria) between the first time and the second time (908), the secure operation is performed (e.g., use autofill to populate fields (e.g., 706 and/or 708) of user interface (e.g., 702, 712, 736, 738, 748, and/or 752) with predefined values and/or initiate payment transaction) without performing, after receiving the request to perform the secure operation, the first type of biometric authentication (e.g., a first level (e.g., complete or high-fidelity) iris features verification is not performed between the secure operation request and performance of secure operation, and/or a first level (e.g., complete or high-fidelity) fingerprint verification is not performed between the secure operation request and performance of secure operation). In some embodiments, the respective criteria is based on sensor measurements taken at a plurality of intermediate times between the first time and the second time, including sensor measurements taken at a first intermediate time and sensor measurements taken at a second intermediate time that detect that a same user was using the device (e.g., 700) between the first time and the second time (e.g., eye tracking continuity policy has not had a false result since the user (e.g., 704) previously performed a first level (e.g., complete or high-fidelity) iris features verification and/or fingerprint continuity policy has not had a false result since the user (e.g., 704) previously performed a first level (complete or high-fidelity) fingerprint verification).

In some embodiments, in accordance with a determination that the user (e.g., 704) of the device (e.g., 700) did not meet respective criteria between the first time and the second time (910) (e.g., eye tracking continuity policy evaluates to false (e.g., eyes were undetectable for period of time, the user (e.g., 704) previously authenticated by passcode only, and/or the user (e.g., 704) previously authenticated by fingerprint only), and/or fingerprint tracking continuity policy evaluates to false), performing the secure operation is forgone. Ensuring biometric continuity conditions are met when a user requests to perform a secure operation provides improved security/privacy by verifying that a same user has been using the device since an initial authentication.

In some embodiments, in response to receiving the request to perform the secure operation: in accordance with a determination that a user (e.g., 704) of the device did not meet respective criteria between the first time and the second time (e.g., eye tracking continuity policy evaluates to false (e.g., eyes were undetectable for period of time, user (e.g., 704) previously authenticated by passcode only, and/or user (e.g., 704) previously authenticated by fingerprint only), and/or fingerprint tracking continuity policy evaluates to false), the user (e.g., 704) of the device is biometrically authenticated using the biometric sensor to perform the first type of biometric authentication (e.g., first level (e.g., complete or high-fidelity) iris features verification is performed, and/or a first level (e.g., complete or high-fidelity) fingerprint verification is performed). Authenticating a user when biometric continuity conditions are not met provides improved security/privacy by verifying that an authorized user is interacting with the device.

In some embodiments, the first type of biometric authentication is based on a biometric feature of an eye (e.g., the whole eye or a portion of the eye, such as iris features) and the second type of biometric authentication is based on a biometric feature of an eye (e.g., the whole eye or a portion of the eye, such as iris features). Ensuring biometric continuity conditions are met based on eye features provides improved security/privacy by verifying that a same user has been using the device since an initial authentication.

In some embodiments, the first type of biometric authentication is based on a biometric feature of a face (e.g., eyebrows, eyelids, skin surrounding eyes, forehead, nose) and the second type of biometric authentication is based on a biometric feature of a face (e.g., eyebrows, eyelids, skin surrounding eyes, forehead, nose). Ensuring biometric continuity conditions are met based on facial features provides improved security/privacy by verifying that a same user has been using the device since an initial authentication.

In some embodiments, a user (e.g., 704) of the device meeting respective criteria includes repeatedly performing, using one or more sensors of the computer system (e.g., 101 and/or 700), a second type of biometric authentication (e.g., a second level (e.g., tracking eye information for continuity) iris features verification is performed), wherein the second type of biometric authentication includes: receiving an input from the user (e.g., 704) including first respective biometric information (e.g., obtain eye information from a current frame); and comparing the received input to a previously received input including second respective biometric information (e.g., compare eye information from current frame to eye information from previous frame). Taking a plurality of sensor measurements at a plurality of intermediate times between a first and second time provides improved security/privacy by verifying that a same user has been using the device since an initial authentication.

In some embodiments, the one or more sensors used to perform the second type of biometric authentication include the biometric sensor used to perform the first type of biometric authentication (e.g., the one or more sensors include the biometric sensor that is used to obtain the fresh biometric authentication). Taking a plurality of sensor measurements at a plurality of intermediate times between a first and second time provides improved security/privacy by verifying that a same user has been using the device since the initial authentication.

In some embodiments, the first type of biometric authentication is based on a first biometric feature (e.g., the eye and/or iris features of the user (e.g., 704)) and the second type of biometric authentication is based on a second type of biometric feature (e.g., a continuous wearing of the computer system and/or a fingerprint of the user (e.g., 704)), wherein the first biometric feature is different from the second biometric feature (e.g., iris features verification is performed for initial authentication, whereas facial features are monitored for continuity). In some embodiments, at the first time, the user (e.g., 704) of the device is biometrically authenticated based on a first biometric feature of the user (e.g., 704) (e.g., a first level (e.g., complete or high-fidelity) iris features verification is performed, including detecting details associated with presence of eye, iris features, pupil, and/or eye glints). In some embodiments, a second biometric feature of the user (e.g., 704) is periodically detected (e.g., detect user's (e.g., 704) eyebrows, eyelids, skin surrounding eyes, forehead, nose, mouth, and/or cheeks), wherein the respective criteria is based on the periodic detection of the second biometric feature of the user (e.g., 704) (e.g., continuity criteria depends on detected details associated with presence of eyebrows, eyelids, skin surrounding eyes, forehead, nose, mouth, and/or cheeks). Utilizing a respective biometric feature for an initial authentication and a different biometric feature for biometric continuity verification provides improved security/privacy by improving authentication when the feature used for initial authentication is unavailable for continuity verification.

In some embodiments, the first type of biometric authentication is based on a first biometric feature (e.g., the eye and/or iris features of the user (e.g., 704), such that iris features verification is performed for initial authentication) and the second type of biometric authentication is based on the first type of biometric feature (e.g., the eye and/or iris features of the user (e.g., 704), such that iris features verification is performed for continuity). In some embodiments, at the first time, the user (e.g., 704) of the device is biometrically authenticated based on a first biometric feature of the user (e.g., 704) (e.g., a first level (e.g., complete or high-fidelity) iris features verification is performed, including detecting details associated with presence of eye, iris features, pupil, and/or eye glints). In some embodiments, the first biometric feature of the user (e.g., 704) is periodically detected (e.g., detecting details associated with presence of eye, iris features, pupil, and/or eye glints,), wherein the respective criteria is based on the periodic detection of the first biometric feature of the user (e.g., 704) (e.g., continuity criteria depends on detected details associated with presence of eye, iris features, pupil, and/or eye glints). Utilizing a respective biometric feature for both initial authentication and a biometric continuity verification provides improved security/privacy by reducing required sensor types for authentication.

In some embodiments, biometrically authenticating, at the first time, the user (e.g., 704) of the device is based on a first biometric feature of the user (e.g., 704) (e.g., a first level (e.g., complete or high-fidelity) iris features verification is performed, including detecting details associated with presence of eye, iris features, pupil, and/or eye glints), comprises: obtaining sensor measurements at the plurality of intermediate times between the first time and the second time (e.g., detecting details associated with presence of eye, iris features, pupil, and/or eye glints), wherein the obtained sensor measurements include at least one sensor measurement indicating that the first biometric feature of the user (e.g., 704) was not detected at a respective intermediate time of the plurality of intermediate times (e.g., sensor measurements indicate no presence of eye, iris features, pupil, and/or eye glints (e.g., based on user's (e.g., 704) eyes being closed)). Utilizing a respective biometric feature for an initial authentication that is hidden from view when biometric continuity verification occurs based on a different feature provides improved security/privacy by ensuring continuity verification occurs despite the hidden feature.

In some embodiments, biometrically authenticating, at the first time, the user (e.g., 704) of the device is based on a first biometric feature of the user (e.g., 704) (e.g., a first level (e.g., complete or high-fidelity) iris features verification is performed, including detecting details associated with presence of eye, iris features, pupil, and/or eye glints), comprises: periodically obtaining sensor measurements, at the plurality of intermediate times between the first time and the second time, of a second biometric feature of the user (e.g., 704) (e.g., detect user's (e.g., 704) eyebrows, eyelids, skin surrounding eyes, forehead, nose, mouth, and/or cheeks), wherein the obtained sensor measurements include at least one sensor measurement indicating that the first biometric feature of the user (e.g., 704) was not detected at a respective intermediate time (e.g., sensor measurements indicate no presence of eye, iris features, pupil, and/or eye glints (e.g., based on user's (e.g., 704) eyes being closed)), the obtained sensor measurements include at least one sensor measurement indicating that the second biometric feature of the user (e.g., 704) was detected at the respective intermediate time (e.g., sensor measurements indicate presence of user's (e.g., 704) eyebrows, eyelids, skin surrounding eyes, forehead, nose, mouth, cheeks, while there was no detected presence of eye, iris features, pupil, and/or eye glints)), and the first biometric feature is different from the second biometric feature (e.g., iris features verification is performed for initial authentication, whereas facial features are monitored for continuity). Utilizing a respective biometric feature for an initial authentication that is hidden from view when biometric continuity verification occurs based on a different visible feature provides improved security/privacy by creating an efficient and non-interruptive user experience for biometric authentication, encouraging users to use biometric authentication and thus providing a more secure experience.

In some embodiments, the respective criteria (e.g., continuity criteria) between the first time and the second time includes a continuity criterion that is met when the biometric feature (e.g., the user's (e.g., 704) eye, and/or the user's (e.g., 704) fingerprint) is repeatedly (e.g., continuously or periodically) detected between the first time and the second time (e.g., without determining that the biometric feature is not detected between the first time and the second time). Taking a plurality of sensor measurements at a plurality of intermediate times between a first and second time provides improved security/privacy by verifying that a same user has been using the device since an initial authentication.

In some embodiments, biometrically authenticating the user (e.g., 704) of the device using the biometric sensor to perform a first type of biometric authentication comprises: providing (e.g., displaying, via the display generation component (e.g., 120 and/or 700*a*)), to the user (e.g., 704), an authentication guidance user interface (e.g., 724 including instructions for performing the first type of biometric authentication, wherein the instructions request the user (e.g., 704) to provide particular movements of the biometric feature (e.g., instructions to gaze at a particular portion (e.g., 726) of the authentication guidance user interface, rotate face (for facial authentication) along a particular path, and/or move finger along a particular path). Displaying an authentication guidance user interface to facilitate user authentication provides improved security/privacy by reducing the chances of failed authentication attempts.

In some embodiments, the secure operation includes providing payment information (e.g., as shown in FIG. 7N) (e.g., providing payment information in order to purchase an item and/or a service (e.g., providing credit card information to an e-commerce website to purchase a shoe)). In some embodiments, the electronic device (e.g., 700) participates in a transaction. For example, upon detecting that input at a hardware user interface element (e.g., 722 and/or 758) has been received and that other criteria are satisfied, a secure element in the computer system (e.g., 700) releases payment information to allow an application on the computer system (e.g., 700) to access the information (e.g., and to transmit the information to a server associated with the application). In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device (e.g., 700) receiving authorization, such as a user authentication (e.g., fingerprint authentication; passcode authentication; detecting double-press of a hardware button (e.g., 722 and/or 758) when the device (e.g., 700) is in an unlocked state, and optionally, while the device (e.g., 700) has been continuously on a user's (e.g., 704) wrist since the device (e.g., 700) was unlocked by providing authentication credentials to the device (e.g., 700), where the continuous presence of the device on the user's (e.g., 704) wrist is determined by periodically checking that the device (e.g., 700) is in contact with the user's (e.g., 704) skin). In some embodiments, the secure element provides (or releases) the payment information in response to continuity criteria (e.g., a second level (e.g., continuity) iris features verification is performed) and/or gaze criteria (e.g., gaze is directed towards the user interface and/or subject of the user's gaze is the user interface) being satisfied. Enabling user authorization of a payment operation using biometric continuity verification provides improved security/privacy by ensuring the same user has been using the device since an initial authentication.

In some embodiments, the secure operation includes providing access credentials for accessing an application (e.g., an application associated with a third party service (e.g., providing facial recognition data to access a stock trading application or a password storage application)). In some embodiments, the secure operation includes providing access credentials for accessing an application (e.g., an application associated with a third party service (e.g., providing facial recognition data to access a stock trading application or a password storage application)). Enabling user authorization for application authentication using biometric continuity verification provides improved security/privacy by ensuring the same user has been using the device since an initial authentication.

In some embodiments, the secure operation includes auto-filling user credentials (e.g., username and/or password information for accessing secure information (e.g., providing login information (e.g., 706 and/or 708) to access a banking website)). Enabling user authorization of an auto-fill operation using biometric continuity verification provides improved security/privacy by ensuring the same user has been using the device since an initial authentication.

In some embodiments, receiving the request to perform the secure operation includes detecting a physical input to activate a hardware button (e.g., 722 and/or 758) (e.g., user (e.g., 704) engaging double-press of hardware button initiates payment operation and/or user (e.g., 704) engaging double-click of hardware button initiates autofill operation). In some embodiments, the hardware button (e.g., 722 and/or 758), when activated using various inputs, performs various respective functions, such as navigating to a home user interface, powering down the device, displaying a system user interface for powering down the device, and/or activating a voice assistant. In some embodiments, the physical input includes a single press, a long press, a single press followed by a long press, a press followed by a rotation, a rotation followed by a press, and/or a plurality of presses in series (e.g., a double press, a triple press). Utilizing a hardware element for authorization provides improved security/privacy by reducing the possibility of an erroneous authorization and/or preventing an unauthorized input from malicious software.

In some embodiments, a system user interface (e.g., 702, 712, 736, 738, 748, and/or 752) is provided (e.g., displaying, via the display generation component (e.g., 120 and/or 700*a*)) to the user (e.g., 704), the system user interface including an affordance associated with the secure operation (e.g., an affordance labeled "Pay" or an affordance labeled "Autofill"), wherein receiving the request to perform the secure operation includes detecting activation of the affordance (e.g., 710 and/or 750) associated with the secure operation (e.g., user (e.g., 704) activates affordance with gaze, gaze and hardware button, or hardware button only). In some embodiments, the user gazes at the affordance (e.g., 710 and/or 750), and in accordance with a determination that the user has gazed at the affordance for a threshold period of time, the affordance (e.g., 710 and/or 750) is activated. In some embodiments, the user (e.g., 704) activates the affordance (e.g., 710 and/or 750) by activating a hardware button (e.g., 722 and/or 758) (e.g., a double press of the hardware button and/or a long press of a hardware button). In some embodiments, the user (e.g., 704) activates the affordance by activating a hardware button (e.g., 722 and/or 758) (e.g., a double press of the hardware button and/or a long press of a hardware button), and in accordance with a determination that the user (e.g., 704) is gazing at the affordance (e.g., 710 and/or 750) while the user (e.g., 704) activates the hardware button, the affordance (e.g., 710 and/or 750) is activated. In some embodiments, the user (e.g., 704) activates the affordance (e.g., 710 and/or 750) by controlling a secondary device (e.g., a controller) in order to select the affordance (e.g., 710 and/or 750) (e.g., moving a cursor over the affordance while activating a hardware button and/or using a pointing device while activating a hardware button (e.g., 722 and/or 758)). Utilizing an affordance in a system user interface for authorization provides improved security/privacy when the device is utilized with one or more alternative input devices.

In some embodiments, receiving the request to perform the secure operation comprises: while providing (e.g., displaying, via the display generation component (e.g., 120 and/or 700*a*)), to the user (e.g., 704), a virtual user interface object (e.g., 702, 712, 736, 738, 748, and/or 752) that includes information about a secure operation (e.g., 706, 708, 710, 716*a*, 716*b*, 744*a*, and/or 744*b*), detecting a user activation of an affordance (e.g., 710 and/or 750) within the virtual user interface object (e.g., 702, 712, 736, 738, 748, and/or 752) (e.g., user (e.g., 704) activates an affordance labeled "Authorize Payment" or user (e.g., 704) activates an affordance labeled "Authorize Autofill"). Displaying information regarding the secure operation when requesting authorization provides improved security/privacy by confirming that the user has had the opportunity to review the information associated with the secure operation before the user authorizes proceeding with the secure operation.

In some embodiments, the respective criteria includes an eyes open criterion that is satisfied when one or more eyes (e.g., one eye and/or both eyes) of the user (e.g., 704) do not remain continuously closed for more than a (e.g., non-zero) threshold period of time (e.g., the continuity criteria is not met when the user's (e.g., 704) eyes are closed for more than the threshold period of time), and wherein the eyes open criterion is not satisfied when one or more eyes (e.g., one eye and/or both eyes) of the user (e.g., 704) remain continuously closed for more than the (e.g., non-zero) threshold period of time (e.g., the continuity criteria is not met when the user's (e.g., 704) eyes are closed for more than the threshold period of time). Determining biometric continuity is not met when eyes are detected as closed provides improved security/privacy by ensuring informed consent regarding the operation.

In some embodiments, the respective criteria are based on biometric features that are available for analysis without regard to whether or not the user's (e.g., 704) eyes are closed (e.g., and without regard to a duration for which the user's (e.g., 704) eyes are closed) (e.g., continuity criteria can be satisfied even when the user (e.g., 704) closes their eyes for an extended period of time). Determining biometric continuity is met when eyes are detected as closed provides improved security/privacy by improving authentication when the feature used for initial authentication is unavailable for continuity verification.

In some embodiments, aspects/operations of methods 800, 900, and 1000 may be interchanged, substituted, and/or added between these methods. For example, the determination of whether to the user met respective (e.g., continuity) criteria in method 900 is optionally used for determining whether to enable user authorization as part of method 800. For brevity, these details are not repeated here.

Additional descriptions regarding FIGS. 7A-7N are provided below in reference to method 1000 described with respect to FIGS. 7A-7N.

FIG. 10 is a flow diagram of an exemplary method 1000 of authentication continuity for a secure operation, in accordance with some embodiments. In some embodiments, method 1000 is performed at a computer system (e.g., computer system 101 in FIG. 1 (e.g., a smart phone, a smart watch, a tablet, and/or a wearable device)) including a display generation component (e.g., display generation component 120 in FIGS. 1, 3, and 4 (e.g., a display controller, a touch-sensitive display system, a display (e.g., integrated and/or connected), a 3D display, a transparent display, a projector, and/or a heads-up display)) (e.g., a heads-up display, a display, a touchscreen, a projector, etc.), and one or more input devices. In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

As described below, method 1000 provides an intuitive way for authorizing a secure operation via an accessibility interface. The method reduces the cognitive burden on a user while performing a secure operation via an accessibility interface, thereby creating a more efficient human-machine interface. For battery-operated computing devices, authorizing a secure operation via an accessibility interface faster and more efficiently conserves power and increases the time between battery charges.

A request to display a user interface (e.g., 702, 712, 736, 738, 748, and/or 752) associated with performing a secure operation (1002) (e.g., a request to perform an autofill procedure and/or a request to perform a payment transaction) is received via the one or more input devices (e.g., 125 and/or 150). In response to the request to display the user interface (e.g., 702, 712, 736, 738, 748, and/or 752) associated with performing the secure operation (1004), a first user interface (e.g., 702, 712, 736, 738, 748, and/or 752) including a respective prompt (e.g., 720, 734, and/or 756) to provide additional input to authorize the device to perform the secure operation (e.g., login details, account details, and/or information associated with pending purchase) is displayed via the display generation component (e.g., 120 and/or 700*a*) (e.g., interface displayed in response to receiving request to perform autofill procedure and/or interface displayed in response to receiving request to perform payment transaction).

In accordance with a determination that the computer system (e.g., 700) is operating in a first mode (1006) (e.g., standard mode with accessibility features not enabled and/or mode permitting secure operations to be authorized with a physical input mechanism (e.g., 722 and/or 758)), the respective prompt is a first prompt (e.g., 720, 734, and/or 756) to provide a physical input (e.g., 722 and/or 758) (e.g., the first user interface (e.g., 702, 712, 736, 738, 748, and/or 752) prompts the user (e.g., 704) that the user should provide a physical input (e.g., 722 and/or 758) (e.g., an input using a physical input mechanism (e.g., a depressible button (e.g., 722 and/or 758)), a press, and/or plurality of presses of a button (e.g., 722 and/or 758))) to authorize the secure operation (e.g., the prompt (e.g., 720, 734, and/or 756) indicates that user (e.g., 704) should provide the physical input (e.g., 722 and/or 758)) if the user (e.g., 704) intends to authorize the autofill procedure and/or the prompt (e.g., 720, 734, and/or 756) indicates that user (e.g., 704) should provide the physical input (e.g., 722 and/or 758) if the user (e.g., 704) intends to authorize a purchase).

In accordance with a determination that the computer system (e.g., 700) is operating in a second mode different from the first mode (1008) (e.g., an accessibility mode and/or a mode in which an input at the physical input mechanism (e.g., 722 and/or 758) is not required to authorize a secure operation), the respective prompt (e.g., 720, 734, and/or 756) is a second prompt to display a second user interface (e.g., 742) (e.g., the first user interface (e.g., 702, 712, 736, 738, 748, and/or 752) does not prompt the user (e.g., 704) that the user should provide a physical input (e.g., 722 and/or 758) if the user (e.g., 704) intends to authorize the autofill procedure and/or the first user interface (e.g., 702, 712, 736, 738, 748, and/or 752) does not prompt the user (e.g., 704) that the user should provide a physical input (e.g., 722 and/or 758) if the user (e.g., 704) intends to authorize purchase), wherein the second user interface (e.g., 742) enables user authorization of the secure operation without using the physical input (e.g., 722 and/or 758) (e.g., enable authorization of secure operation using first level (complete or high-fidelity) iris features verification (e.g., first level iris features verification performed while user (e.g., 704) activates an affordance (e.g., 744) and/or perform first level iris features verification while user (e.g., 704) gazes at an affordance (e.g., 744)) and/or enable authorization of secure operation using first level (complete or high-fidelity) fingerprint verification). Allowing the secure operation to be authorized without a physical input provides improved security/privacy when the device is utilized with one or more alternative input devices.

In some embodiments, a first respective affordance (e.g., 740 and/or 750) (e.g., affordance includes an indication (e.g., 734) that authorizing the secure operation may be performed using a secondary input type different from a primary input type (e.g., "Autofill" is displayed next to text "Confirm with Assistive Touch" or affordance for "Pay" is displayed next to text "Confirm with Assistive Touch")) is provided (e.g., displayed, via the display generation component (e.g., 120 and/or 700*a*)) within the second prompt (e.g., 736 and/or 738) and a user selection of the affordance (e.g., 740 and/or 750) is received (e.g., user (e.g., 704) selects affordance (e.g., 740) for "Autofill" using gaze, gaze and adaptive accessory input, and/or adaptive accessory input or user (e.g., 704) selects affordance (e.g., 750) for "Pay" using gaze, gaze and adaptive accessory input, and/or adaptive accessory input). In some embodiments, the user (e.g., 704) gazes at the affordance (e.g., 740 and/or 750), and in accordance with a determination that the user (e.g., 704) has gazed at the affordance (e.g., 740 and/or 750) for a threshold period of time, the affordance (e.g., 740 and/or 750) is activated. In some embodiments, the user (e.g., 704) activates the affordance (e.g., 740 and/or 750) by controlling an adaptive accessory (e.g., a switch control) in order to select the affordance (e.g., 740 and/or 750) (e.g., the user (e.g., 704) taps the switch control a first time to initiate the display of a sliding vertical line which slides back and forth across the display (e.g., 700*a*), the user (e.g., 704) taps the switch control a second time when the vertical line appears over the affordance (e.g., 740 and/or 750), in response to the second tap a horizontal line is displayed which slides up and down across the display (e.g., 700*a*), and the user (e.g., 704) taps the switch control a third time when the horizontal line appears over the affordance (e.g., 740 and/or 750)). In some embodiments, the user (e.g., 704) controls an adaptive accessory in order to select the affordance (e.g., 740 and/or 750), and in accordance with a determination that the user (e.g., 704) is gazing at the affordance (e.g., 740 and/or 750) while the user (e.g., 704) selects the affordance (e.g., 740 and/or 750), the affordance (e.g., 740 and/or 750) is activated. An adaptive accessory is an accessory that enables a user (e.g., 704) to provide input through alternative means as compared to a typical use scenario for the device, one example of an adaptive accessory is a switch control which provides a limited number of selection (e.g., between one and five) states that are used to select between options provided by the device (e.g., 700). An example of a switch control is a device that can be activated with a press, pull, blink, squeeze, and/or breath via a sip/puff on a straw, such devices enable users with cognitive or physical accessibility needs to interact with a device (e.g., 700) when the user (e.g., 704) is unable to easily interact with the device (e.g., 700) using the standard input scheme (e.g., using a touch screen, physical buttons/knobs, and/or air gestures).

In some embodiments, in accordance with receiving the user selection of the affordance, the second user interface (e.g., 742) is displayed, wherein the second user interface (e.g., 742) includes a representation of a plurality of functions (e.g., display accessibility menu (e.g., 742) including a plurality of affordances representing device functions) including a first respective function of the plurality of functions that is invoked in response to a secondary input type different from the primary input type (e.g., accessibility menu (e.g., 742) includes options such as "Home," "Control Center, "Device," "Notifications," or "Custom"), and a second respective function (e.g., 744) of the plurality of functions that is invoked in response to a tertiary input type different from the primary input type and the secondary input type (e.g., accessibility menu (e.g., 742) includes new option "Authorize Autofill" or new option "Pay"). In some embodiments, the accessibility menu (e.g., 742) includes a grid of affordances and an outline surrounding one of the affordances (e.g., 744), such that the outline moves periodically (e.g., every 2 seconds or every 5 seconds) to surround a different affordance (e.g., 744), wherein the user (e.g., 704) may provide an input (e.g., an input to a switch control and/or a gaze input directed towards the surrounded affordance) to select a currently outlined affordance (e.g., 744). Displaying an accessibility interface with alternative input options provides improved security/privacy when the device is utilized with one or more alternative input devices.

In some embodiments, the secondary input type simulates an input of the primary input type (e.g., invoke "Home" in response to swipe up from button of screen) and the tertiary input type simulates an input of the primary input type (e.g., invoke "Home" in response to custom input (e.g., long press) via accessibility menu (e.g., 742)). Enabling simulated inputs for traditional input types provides improved security/privacy when the device is utilized with one or more alternative input devices.

In some embodiments, while the computer system (e.g., 700) is operating in the second mode: an affordance (e.g., 740 and/or 750) associated with the respective prompt is displayed (e.g., display affordance for "Autofill" with text "Confirm with Assistive Touch" or display affordance for "Pay" with text "Confirm with Assistive Touch"), and in accordance with receiving a user input associated with the respective prompt (e.g., user (e.g., 704) selects affordance (e.g., 740) for "Autofill" using gaze, gaze and adaptive accessory input, and/or adaptive accessory input or user (e.g., 704) selects affordance (e.g., 750) for "Pay" using gaze, gaze and adaptive accessory input, and/or adaptive accessory input), the second user interface (e.g., 742), is displayed, wherein the second user interface (e.g., 742) includes an affordance (e.g., 744) to authorize the secure operation (e.g., display accessibility menu (e.g., 742) including a new option "Authorize Autofill" or a new option "Pay"), wherein the affordance (e.g., 744) to authorize the secure operation is invoked in response to a secondary input type different from a primary input type (e.g., option "Authorize Autofill" is invoked in response to custom input via accessibility menu (e.g., 742) (e.g., long press) instead of primary input type (e.g., double-press side button (e.g., 722 and/or 758)) or option "Pay" is invoked in response to custom input via accessibility menu (e.g., 742) (e.g., long press) instead of primary input type (e.g., double-press side button (e.g., 722 and/or 758))). Displaying an accessibility interface including a secure operation authorization affordance provides improved security/privacy when the device is utilized with one or more alternative input devices.

In some embodiments, details associated with the performance of the secure operation (e.g., interface includes details for performing autofill procedure (e.g., username field and password field) or interface includes details for performing payment transaction (e.g., item name, item description, item price) are displayed within the user interface (e.g., 702, 712, 736, 738, 748, and/or 752) associated with performing the secure operation. In some embodiments, while the computer system (e.g., 700) is operating in the second mode (e.g., an accessibility mode and/or a mode in which an input at the physical input mechanism (e.g., 722 and/or 758) is not required to authorize a secure operation), an affordance (e.g., 740 and/or 750) associated with the respective prompt is displayed (e.g., display affordance for "Autofill" with text "Confirm with Assistive Touch" or display affordance for "Pay" with text "Confirm with Assistive Touch"). In some embodiments, a user input associated with the respective prompt (e.g., user (e.g., 704) selects affordance (e.g., 740) for "Autofill" using gaze, gaze+ adaptive accessory input, and/or adaptive accessory input or user (e.g., 704) selects affordance (e.g., 750) for "Pay" using gaze, gaze and adaptive accessory input, and/or adaptive accessory input) is received, and in accordance with a determination that the user (e.g., 704) is gazing at the user interface associated with performing the secure operation while the user input associated with the respective prompt is received (e.g., user (e.g., 704) selects affordance (e.g., 740) for "Autofill" while gazing at interface including details for performing autofill procedure or user (e.g., 704) selects affordance (e.g., 750) for "Pay" while gazing at interface includes details for performing payment transaction), the second user interface (e.g., 742) is displayed, wherein the second user (e.g., 742) interface includes an affordance (e.g., 744) to authorize the secure operation (e.g., display accessibility menu (e.g., 742) including a new option "Authorize Autofill" or a new option "Pay"), and the affordance (e.g., 744) to authorize the secure operation is displayed in response to a secondary input type different from a primary input type (e.g., option "Authorize Autofill" is invoked in response to custom input (e.g. long press) via accessibility menu (e.g., 742) (instead of primary input type (e.g., double-press side button (e.g., 722 and/or 758)) or option "Pay" is invoked in response to custom input (e.g., long press) via accessibility menu (e.g., 742) instead of primary input type (e.g., double-press side button (e.g., 722 and/or 758))). Displaying the accessibility interface in response to a combination of gaze and affordance activation provides improved security/privacy when the device is utilized with one or more alternative input devices.

In some embodiments, while the computer system (e.g., 700) is operating in the first mode (e.g., standard mode with accessibility features not enabled and/or mode permitting secure operations to be authorized with a physical input mechanism), user activation of the physical input (e.g., 722 and/or 758) is received while the first prompt (e.g., 720, 734, and/or 756) is displayed (e.g., user (e.g., 704) performs a predetermined activation pattern of a hardware input affordance such as a double-click of hardware button (e.g., 722 and/or 758)). In some embodiments, the predetermined activation pattern includes a single press, a long press, a single press followed by a long press, a press followed by a rotation, a rotation followed by a press, and/or a plurality of presses in series (e.g., a double press, or a triple press). In some embodiments, in response to receiving user activation of the physical input (e.g., 722 and/or 758) while the first prompt (e.g., 720, 734, and/or 756) is displayed: in accordance with a determination that user authentication criteria is satisfied (e.g., user (e.g., 704) is gazing at prompt (e.g., 720, 734, and/or 756)), the secure operation is authorized (e.g., authorize Autofill procedure in response to activation of a hardware button (e.g., 722 and/or 758) or authorize payment procedure in response to activation of a hardware button (e.g., 722 and/or 758)). In some embodiments, in accordance with a determination that user authentication criteria is not satisfied (e.g., user (e.g., 704) is not gazing at prompt (e.g., 720, 734, and/or 756)), authorizing the secure operation is foregone (e.g., prevent Autofill procedure in response to double-click of hardware button (e.g., 722 and/or 758) or prevent payment procedure in response to double-click of hardware button (e.g., 722 and/or 758)). Utilizing accessible and non-accessible modes of operation provides improved security/privacy when the device is utilized with one or more alternative input devices.

In some embodiments, the authentication criteria includes a criterion that is met when the user (e.g., 704) provides particular movements of a biometric feature (e.g., gaze at a particular portion of the authentication guidance user interface (e.g., 724), provide facial rotations along a particular path, and/or move finger along a particular path). Requiring particular movements of a biometric feature while a physical input mechanism activated provides improved security/privacy by ensuring informed consent of the secure operation.

In some embodiments, an input to authorize the secure operation (e.g., while in standard mode, user (e.g., 704) performs activation of hardware button (e.g., 722 and/or 758) is received from the user (e.g., 704) (e.g., a single press, a long press, a single press followed by a long press, a press followed by a rotation, a rotation followed by a press, a plurality of presses in series (e.g., a double press, a triple press) or while in accessibility mode, option "Authorize Autofill" is invoked in response to custom input via accessibility menu (e.g., 742) or option "Pay" is invoked in response to custom input via accessibility menu (e.g., 742)), and in response to receiving the input to authorize the secure operation: user authentication is performed (e.g., a first level (e.g., complete or high-fidelity) iris features verification is performed, a second level (e.g., continuity) iris features verification is performed, or a passcode verification is performed); and in accordance with a determination that the user (e.g., 704) is authenticated, the secure operation is authorized (e.g., determine whether authentication continuity has been true since last full or high fidelity biometric authentication, perform full or high fidelity biometric authentication, and/or perform passcode authentication). In some embodiments, in accordance with a determination that the user (e.g., 704) is not authenticated, the secure operation is not authorized (e.g., the device forgoes authorizing the secure operation). Requiring user authentication in addition to user authorization for a secure operation provides improved security/privacy by adding an additional layer of verification specific to user requesting authorization.

In some embodiments, performing user authentication includes performing a second type of biometric authentication (e.g., a second level (e.g., tracking eye information for continuity) iris features verification is performed) (e.g., performing includes repeatedly performing authentication every 2 frames (e.g., a frame includes a still image or a set of images obtained from a sensor (e.g., biometric sensor) of the device), performing every 3 frames, performing every 4 frames, performing every 5 frames, performing every 6 frames, performing every 7 frames, performing every 8 frames, performing every 9 frames, or performing every 10 frames), wherein the second type of biometric authentication includes: receiving an input from the user (e.g., 704) including first respective biometric information (e.g., obtain eye information from a current frame); and comparing the received input to a previously received input including second respective biometric information (e.g., compare eye information from current frame to eye information from a previous frame). Utilizing stored authentication information in addition to user authorization for a secure operation provides improved security/privacy by verifying that a same user has been using the device since an initial authentication.

In some embodiments, performing user authentication includes performing a first type of biometric authentication, wherein the first type of biometric authentication includes detecting presence of a first biometric feature type (e.g., the first level (e.g., complete or high-fidelity) verification is based on eye features or the first level (e.g., complete or high-fidelity) verification is based on facial features). Requiring a complete or high-fidelity biometric authentication in addition to user authorization for a secure operation provides improved security/privacy by verifying that an authorized user is requesting the secure operation.

In some embodiments, performing user authentication includes: providing a prompt (e.g., 728) requesting a passcode from the user (e.g., 704); receiving a passcode from the user (e.g., 704) responsive to the prompt (e.g., 728) (e.g., receive a plurality of numeric entries (e.g., 0-9)); in accordance with a determination that the received passcode matches a stored passcode: determining that the user (e.g., 704) is authenticated; and authorizing the secure operation in accordance with a determination that the user (e.g., 704) is authenticated (e.g., user interface does not appear grayed-out, button is marked as active, or user interface provides text (e.g., "Proceed with request") indicating user (e.g., 704) can request to perform secure operation). In some embodiments, in accordance with a determination that the received passcode does not match the stored passcode, determination is made that the user (e.g., 704) is not authenticated, and the secure operation is not authorized. Requiring passcode authentication in addition to user authorization for a secure operation provides improved security/privacy by providing additional methods to verify a user's identity.

In some embodiments, an input to authorize the secure operation is detected, and in response to detecting the input to authorize the secure operation: in accordance with a determination that the input is a physical input (e.g., 722 and/or 758) to authorize the secure operation (e.g., activation procedure of a physical button (e.g., 722 and/or 758) to authorize autofill or activation procedure of a physical button (e.g., 722 and/or 758) to authorize payment): In some embodiments, the activation procedure includes a single press, a long press, a single press followed by a long press, a press followed by a rotation, a rotation followed by a press, a plurality of presses in series (e.g., a double press, a triple press). In some embodiments, authentication information is retrieved, the authentication information associated with a repeatedly performed second type of biometric authentication (e.g., retrieve continuity information regarding a second level (e.g., tracking eye information for continuity) iris features verification which has previously been performed). In some embodiments, in accordance with a determination that the input is not a physical input to authorize the secure operation, determination is made whether the input is associated with a second user interface (e.g., 742). In some embodiments, in accordance with a determination that the user (e.g., 704) is authenticated based on a second type of biometric authentication, the secure operation is authorized (e.g., authorize autofill if second level (e.g., tracking eye information for continuity) iris features verification is successful or authorize payment if second level (e.g., tracking eye information for continuity) iris features verification is successful); In some embodiments, in accordance with a determination that the user (e.g., 704) is not authenticated based on a second type of biometric authentication (e.g., tracked eye information indicates user's (e.g., 704) eyes were closed for a period of time (e.g., 5 seconds, 7 seconds, or 10 seconds) during device interaction), the secure operation is not authorized.

In some embodiments, in accordance with a determination that the input is an input associated with the second user interface (e.g., 742) (e.g., detect input via accessibility menu), wherein the input associated with the second user interface (e.g., 742) enables user authorization of the secure operation without using the physical input (e.g., detected input is associated with option "Autofill" or a new option "Pay"): performing a first type of biometric authentication; and (e.g., a first level (e.g., complete or high-fidelity) iris features verification is performed) in accordance with a determination that the user (e.g., 704) is authenticated based on the first type of biometric authentication, the secure operation is authorized (e.g., authorize autofill if first level (e.g., complete or high-fidelity) iris features verification is successful or authorize payment if first level (e.g., complete or high-fidelity) iris features verification is successful). In some embodiments, in accordance with a determination that the user (e.g., 704) is not authenticated based on the first type of biometric authentication, the secure operation is not authorized. In some embodiments, in accordance with a determination that the input is not an input associated with the second user interface (e.g., 742), a determination is made whether the input is an additional input not associated with the physical input (e.g., 722 and/or 758) to authorize the secure operation. Requiring a complete or high-fidelity biometric authentication when the device operates in an accessible mode provides improved security/privacy by verifying that an authorized user is requesting the secure operation.

In some embodiments, aspects/operations of methods 800, 900, and 1000 may be interchanged, substituted, and/or added between these methods. For example, the determination of whether to the user met respective (e.g., continuity) criteria in method 900 is optionally used for authorizing a secure operation via an accessibility interface as part of method 1000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve authorizing a secure operation. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's (e.g., 704) health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve authorizing a secure operation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of authorizing secure operations, the present technology can be configured to allow users to select to "opt in" or "opt out" of participation in the collection of personal information data during registration for services or anytime thereafter. In another example, users can select not to provide data for customization secure operations, such as payment and autofill. In yet another example, users can select to limit the length of time data is maintained or entirely prohibit the development of a customized service for facilitating a secure operation such as payment or autofill. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, authorizing a secure operation can be facilitated based on non-personal information data or a bare minimum amount of personal information, such as the content being requested by the device associated with a user, other non-personal information available to the service, or publicly available information.

What is claimed is:

1. A computer system that is in communication with a display generation component and one or more input devices, the computer system comprising:
    one or more processors; and
    memory storing one or more programs configured to be executed by the one or more processors, the one or more programs including instructions for:
        while a three-dimensional environment is visible via the display generation component, wherein the three-dimensional environment includes a virtual user interface object that includes information about a secure operation, detecting, via the one or more input devices, a change in a current viewpoint of a user; and
        in response to detecting the change in the viewpoint of the user:
            in accordance with a determination that at least a threshold amount of the virtual user interface object is visible from the viewpoint of the user, and that the user is authorized to perform the secure operation, enabling user authorization of the secure operation using the virtual user interface object; and
            in accordance with a determination that less than the threshold amount of the virtual user interface object is visible from the viewpoint of the user, forgoing enabling user authorization of the secure operation using the virtual user interface object.

2. The computer system of claim 1, the one or more programs including instructions for:
    receiving, from the user, an input to authorize performance of the secure operation; and in response to receiving the input to authorize performance of the secure operation:
        in accordance with a determination that a set of one or more performance criteria is satisfied, initiating performance of the secure operation, wherein the set of one or more performance criteria includes a visibility criterion that is met when at least the threshold amount of the virtual user interface object is visible from the viewpoint of the user; and
        in accordance with the determination that the set of one or more performance criteria is not satisfied, forgoing initiating performance of the secure operation.

3. The computer system of claim 1, wherein user authorization of the secure operation using the virtual user interface object includes user activation of a hardware user interface element.

4. The computer system of claim 1, the one or more programs including instruction for:
    in response to detecting the change in the viewpoint of the user, changing an amount of the virtual user interface object that is visible to the user.

5. The computer system of claim 4, wherein the amount of the virtual user interface object that is visible changes based on occlusion by a physical object.

6. The computer system of claim 4, wherein the amount of the virtual user interface object that is visible changes based on occlusion by a virtual object.

7. The computer system of claim 1, wherein a visible amount of the virtual user interface object changes based on the virtual user interface object moving out of the field of view of the user.

8. The computer system of claim 1, wherein a visible amount of the virtual user interface object changes based on the virtual user interface object moving beyond a threshold distance from a center of the field of view of the user.

9. The computer system of claim 1, wherein a visible amount of the virtual user interface object changes based on occlusion by a physical object.

10. The computer system of claim 1, wherein the determination that the user is authorized to perform the secure operation includes a determination whether an eye criterion is satisfied when the user's eyes are open.

11. The computer system of claim 1, the one or more programs including instructions for:
    in accordance with the determination that at least a threshold amount of the virtual user interface object is visible from the viewpoint of the user, modifying an appearance of the virtual user interface object to indicate to the user that the user can request to perform the secure operation; and
    in accordance with the determination that less than the threshold amount of the virtual user interface object is visible from the viewpoint of the user, modifying the appearance of the virtual user interface object to indicate to the user that the user cannot request to perform the secure operation.

12. A non-transitory computer-readable storage medium storing one or more programs configured to be executed by one or more processors of a computer system that is in communication with a display generation component and one or more input devices, the one or more programs including instructions for:
    while a three-dimensional environment is visible via the display generation component, wherein the three-dimensional environment includes a virtual user interface object that includes information about a secure operation, detecting, via the one or more input devices, a change in a current viewpoint of a user; and in response to detecting the change in the viewpoint of the user:

in accordance with a determination that at least a threshold amount of the virtual user interface object is visible from the viewpoint of the user, and that the user is authorized to perform the secure operation, enabling user authorization of the secure operation using the virtual user interface object; and in accordance with a determination that less than the threshold amount of the virtual user interface object is visible from the viewpoint of the user, forgoing enabling user authorization of the secure operation using the virtual user interface object.

13. The computer-readable storage medium of claim 12, the one or more programs including instructions for:

receiving, from the user, an input to authorize performance of the secure operation; and in response to receiving the input to authorize performance of the secure operation:

in accordance with a determination that a set of one or more performance criteria is satisfied, initiating performance of the secure operation, wherein the set of one or more performance criteria includes a visibility criterion that is met when at least the threshold amount of the virtual user interface object is visible from the viewpoint of the user; and in accordance with the determination that the set of one or more performance criteria is not satisfied, forgoing initiating performance of the secure operation.

14. The computer-readable storage medium of claim 12, wherein user authorization of the secure operation using the virtual user interface object includes user activation of a hardware user interface element.

15. The computer-readable storage medium of claim 12, the one or more programs including instructions for:

in response to detecting the change in the viewpoint of the user, changing an amount of the virtual user interface object that is visible to the user.

16. The computer-readable storage medium of claim 15, wherein the amount of the virtual user interface object that is visible changes based on occlusion by a physical object.

17. The computer-readable storage medium of claim 15, wherein the amount of the virtual user interface object that is visible changes based on occlusion by a virtual object.

18. The computer-readable storage medium of claim 12, wherein a visible amount of the virtual user interface object changes based on the virtual user interface object moving out of the field of view of the user.

19. The computer-readable storage medium of claim 12, wherein a visible amount of the virtual user interface object changes based on the virtual user interface object moving beyond a threshold distance from a center of the field of view of the user.

20. The computer-readable storage medium of claim 12, wherein a visible amount of the virtual user interface object changes based on occlusion by a physical object.

21. The computer-readable storage medium of claim 12, wherein the determination that the user is authorized to perform the secure operation includes a determination whether an eye criterion is satisfied when the user's eyes are open.

22. The computer-readable storage medium of claim 12, the one or more programs including instructions for:

in accordance with the determination that at least a threshold amount of the virtual user interface object is visible from the viewpoint of the user, modifying an appearance of the virtual user interface object to indicate to the user that the user can request to perform the secure operation; and in accordance with the determination that less than the threshold amount of the virtual user interface object is visible from the viewpoint of the user, modifying the appearance of the virtual user interface object to indicate to the user that the user cannot request to perform the secure operation.

23. A method, comprising:

at a computer system that is in communication with one or more input devices and a display generation component:

while a three-dimensional environment is visible via the display generation component, wherein the three-dimensional environment includes a virtual user interface object that includes information about a secure operation, detecting, via the one or more input devices, a change in a current viewpoint of a user; and in response to detecting the change in the viewpoint of the user:

in accordance with a determination that at least a threshold amount of the virtual user interface object is visible from the viewpoint of the user, and that the user is authorized to perform the secure operation, enabling user authorization of the secure operation using the virtual user interface object; and in accordance with a determination that less than the threshold amount of the virtual user interface object is visible from the viewpoint of the user, forgoing enabling user authorization of the secure operation using the virtual user interface object.

24. The method of claim 23, comprising:

receiving, from the user, an input to authorize performance of the secure operation; and in response to receiving the input to authorize performance of the secure operation:

in accordance with a determination that a set of one or more performance criteria is satisfied, initiating performance of the secure operation, wherein the set of one or more performance criteria includes a visibility criterion that is met when at least the threshold amount of the virtual user interface object is visible from the viewpoint of the user; and in accordance with the determination that the set of one or more performance criteria is not satisfied, forgoing initiating performance of the secure operation.

25. The method of claim 23, wherein user authorization of the secure operation using the virtual user interface object includes user activation of a hardware user interface element.

26. The method of claim 23, comprising:

in response to detecting the change in the viewpoint of the user, changing an amount of the virtual user interface object that is visible to the user.

27. The method of claim 26, wherein the amount of the virtual user interface object that is visible changes based on occlusion by a physical object.

28. The method of claim 26, wherein the amount of the virtual user interface object that is visible changes based on occlusion by a virtual object.

29. The method of claim 23, wherein a visible amount of the virtual user interface object changes based on the virtual user interface object moving out of the field of view of the user.

30. The method of claim 23, wherein a visible amount of the virtual user interface object changes based on the virtual user interface object moving beyond a threshold distance from a center of the field of view of the user.

31. The method of claim 23, wherein a visible amount of the virtual user interface object changes based on occlusion by a physical object.

32. The method of claim 23, wherein the determination that the user is authorized to perform the secure operation includes a determination whether an eye criterion is satisfied when the user's eyes are open.

33. The method of claim 23, comprising:
- in accordance with the determination that at least a threshold amount of the virtual user interface object is visible from the viewpoint of the user, modifying an appearance of the virtual user interface object to indicate to the user that the user can request to perform the secure operation; and
- in accordance with the determination that less than the threshold amount of the virtual user interface object is visible from the viewpoint of the user, modifying the appearance of the virtual user interface object to indicate to the user that the user cannot request to perform the secure operation.

\* \* \* \* \*